US010228187B2

(12) United States Patent
Kim et al.

(10) Patent No.: US 10,228,187 B2
(45) Date of Patent: Mar. 12, 2019

(54) REFRIGERATOR WITH CAMERA AND CONTROL METHOD FOR THE SAME

(71) Applicant: LG Electronics Inc., Seoul (KR)

(72) Inventors: Kwanhyung Kim, Seoul (KR); Samnyol Hong, Seoul (KR); Sungdu Kwon, Seoul (KR); Ikkyu Lee, Seoul (KR); Myoungju Lee, Seoul (KR); Jeonghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/721,140

(22) Filed: Sep. 29, 2017

(65) Prior Publication Data
US 2018/0135910 A1 May 17, 2018

Related U.S. Application Data

(63) Continuation of application No. 14/930,012, filed on Nov. 2, 2015, now Pat. No. 9,920,980, which is a
(Continued)

(30) Foreign Application Priority Data

Apr. 23, 2013 (KR) .................. 10-2013-0044528
Oct. 18, 2013 (KR) .................. 10-2013-0124739
(Continued)

(51) Int. Cl.
F25D 29/00 (2006.01)
G06K 9/00 (2006.01)
(Continued)

(52) U.S. Cl.
CPC ............ F25D 29/005 (2013.01); F25D 11/00 (2013.01); F25D 23/00 (2013.01); F25D 23/02 (2013.01);
(Continued)

(58) Field of Classification Search
CPC .. F25D 29/00; F25D 2400/36; F25D 2500/06; F25D 2700/06; F25D 2400/361
See application file for complete search history.

(56) References Cited

U.S. PATENT DOCUMENTS 6,178,763 B1 1/2001 Brancheau
6,303,225 B1 10/2001 Veerasamy
(Continued)

FOREIGN PATENT DOCUMENTS

CN 1128972 11/2003
CN 1519524 8/2004
(Continued)

OTHER PUBLICATIONS

Chinese Office Action in Chinese Application No. 201610127539.2, dated Oct. 24, 2017, 16 pages (with English translation).
(Continued)

Primary Examiner — Jonathan Bradford
(74) Attorney, Agent, or Firm — Fish & Richardson P.C.

(57) ABSTRACT

A refrigerator includes a storage compartment formed in a cabinet of the refrigerator by a fixed insulation wall, the storage compartment being provided with an access opening. The refrigerator also includes a door rotatably provided to the cabinet to open and close the access opening, a drawer provided in the storage compartment, a camera fixed to a ceiling of the storage compartment to photograph both a first region for storing of food arranged in an external space of the drawer and a second region for storing of food arranged in an internal space of the drawer, and a controller configured to separate, through a capturing time of a picture containing both the first region and the second region, a first region picture and a second region picture from the picture to individually divide and store the first region picture and the second region picture.

20 Claims, 65 Drawing Sheets

Related U.S. Application Data continuation of application No. 14/786,719, filed as application No. PCT/KR2014/003523 on Apr. 22, 2014, now Pat. No. 9,915,471.

(30) Foreign Application Priority Data

| Apr. 15, 2014 | (KR) | ............ | 10-2014-0045066 |
| Apr. 15, 2014 | (KR) | ............ | 10-2014-0045067 |
| Apr. 15, 2014 | (KR) | ............ | 10-2014-0045068 |

(51) Int. Cl.

| G06K 9/46 | (2006.01) |
| G06K 9/52 | (2006.01) |
| G06K 9/62 | (2006.01) |
| G06T 7/20 | (2017.01) |
| G06T 7/60 | (2017.01) |
| H04N 7/18 | (2006.01) |
| F25D 27/00 | (2006.01) |
| F25D 11/00 | (2006.01) |
| F25D 23/00 | (2006.01) |
| F25D 23/02 | (2006.01) |
| F25D 23/06 | (2006.01) |
| H04N 5/225 | (2006.01) |
| H04N 5/262 | (2006.01) |
| F25D 23/04 | (2006.01) |
| G02B 27/00 | (2006.01) |
| G03B 29/00 | (2006.01) |
| H04N 5/232 | (2006.01) |
| F25D 23/12 | (2006.01) |
| F25D 25/02 | (2006.01) |
| G06T 7/11 | (2017.01) |
| G06T 7/90 | (2017.01) |
| G06T 7/246 | (2017.01) |
| G06T 7/73 | (2017.01) |
| G06T 7/33 | (2017.01) |
| G06T 7/254 | (2017.01) |

(52) U.S. Cl.
CPC ........... *F25D 23/028* (2013.01); *F25D 23/04* (2013.01); *F25D 23/062* (2013.01); *F25D 23/067* (2013.01); *F25D 23/12* (2013.01); *F25D 25/025* (2013.01); *F25D 27/00* (2013.01); *F25D 29/00* (2013.01); *G02B 27/0006* (2013.01); *G03B 29/00* (2013.01); *G06K 9/00335* (2013.01); *G06K 9/4652* (2013.01); *G06K 9/52* (2013.01); *G06K 9/6201* (2013.01); *G06T 7/11* (2017.01); *G06T 7/20* (2013.01); *G06T 7/246* (2017.01); *G06T 7/254* (2017.01); *G06T 7/33* (2017.01); *G06T 7/60* (2013.01); *G06T 7/73* (2017.01); *G06T 7/90* (2017.01); *H04N 5/2252* (2013.01); *H04N 5/2253* (2013.01); *H04N 5/2257* (2013.01); *H04N 5/23293* (2013.01); *H04N 5/2621* (2013.01); *H04N 5/2624* (2013.01); *H04N 7/18* (2013.01); *F25D 2201/10* (2013.01); *F25D 2300/00* (2013.01); *F25D 2323/021* (2013.01); *F25D 2400/02* (2013.01); *F25D 2400/361* (2013.01); *F25D 2500/06* (2013.01); *F25D 2600/00* (2013.01); *F25D 2700/02* (2013.01); *F25D 2700/06* (2013.01); *G06T 2207/30204* (2013.01)

(56) References Cited

U.S. PATENT DOCUMENTS

| 8,810,397 | B2 | 8/2014 | Wieser |
| 2003/0046887 | A1 | 3/2003 | Chubb |
| 2003/0131541 | A1 | 7/2003 | Lee |
| 2004/0050076 | A1 | 3/2004 | Palfy |
| 2006/0096303 | A1 | 5/2006 | Kavounas |
| 2008/0103939 | A1 | 5/2008 | Gibb |
| 2010/0170289 | A1 | 7/2010 | Graziano |
| 2011/0005255 | A1 | 1/2011 | Tanihata |
| 2011/0314859 | A1 | 12/2011 | Higami et al. |
| 2012/0014487 | A1 | 1/2012 | Dabiri et al. |
| 2012/0023971 | A1 | 2/2012 | Min et al. |
| 2012/0144847 | A1 | 6/2012 | Lee |
| 2012/0227423 | A1 | 9/2012 | Johnson |
| 2013/0015753 | A1 | 1/2013 | Son et al. |
| 2013/0129166 | A1 | 5/2013 | Muller et al. |
| 2014/0137587 | A1 | 5/2014 | Hitzelberger |
| 2014/0168396 | A1 | 6/2014 | Kempiak |
| 2014/0293060 | A1* | 10/2014 | Ryu ............ H04N 5/2252 348/159 |
| 2014/0300265 | A1 | 10/2014 | Lee |
| 2014/0333598 | A1 | 11/2014 | Shi |
| 2016/0057394 | A1 | 2/2016 | Marutani et al. |

FOREIGN PATENT DOCUMENTS

| CN | 1683860 | 10/2005 |
| CN | 101068344 | 11/2007 |
| CN | 101196980 | 6/2008 |
| CN | 101202935 | 6/2008 |
| CN | 201623800 | 11/2010 |
| CN | 102032740 | 4/2011 |
| CN | 102165469 | 8/2011 |
| CN | 202281453 | 6/2012 |
| CN | 102741633 | 10/2012 |
| CN | 103017475 | 4/2013 |
| CN | 202885429 | 4/2013 |
| CN | 202993741 | 6/2013 |
| EP | 2541174 | 1/2013 |
| JP | 05-045041 | 2/1993 |
| JP | 11-083282 | 3/1999 |
| JP | 2001-294308 | 10/2001 |
| JP | 2002243335 | 8/2002 |
| JP | 2002-267337 | 9/2002 |
| JP | 2002-295959 | 10/2002 |
| JP | 2003-042626 | 2/2003 |
| JP | 2003-090673 | 3/2003 |
| JP | 2003-207258 | 7/2003 |
| JP | 03-450907 | 9/2003 |
| JP | 2003-321107 | 11/2003 |
| JP | 2004-183987 | 7/2004 |
| JP | 2005-030607 | 2/2005 |
| JP | 2010-121784 | 6/2010 |
| JP | 2012-168666 | 9/2012 |
| JP | 2012-193873 | 10/2012 |
| JP | 2012-251722 | 12/2012 |
| JP | 2012-251724 | 12/2012 |
| JP | 2014-070796 | 4/2014 |
| KR | 10-1997-0028356 | 6/1997 |
| KR | 20-0374125 | 1/2005 |
| KR | 10-2006-0099985 | 9/2006 |
| KR | 10-2012-0003036 | 1/2012 |
| WO | 2005-015510 | 2/2005 |
| WO | 2008029159 | 3/2008 |
| WO | 2015/029824 | 3/2015 |

OTHER PUBLICATIONS

International Search Report dated Aug. 4, 2014 for PCT/KR2014/003523, 4 pages.

Extended European Search Report issued in European Application No. 14788514.9 dated Nov. 2, 2015, 6 pages.

Extended European Search Report issued in European Application No. 15189491.2 dated Mar. 9, 2016, 6 pages.

(56) References Cited

OTHER PUBLICATIONS

Extended European Search Report issued in European Application No. 15185839.6 dated Mar. 10, 2016, 7 pages.
Extended European Search Report issued in European Application No. 15185971.7 dated Mar. 18, 2016, 7 pages.
Extended European Search Report issued in European Application No. 15201309.0 dated Apr. 7, 2016, 7 pages.
Office Action issued in U.S. Appl. No. 14/929,845 dated Apr. 21, 2016, 17 pages.
Office Action issued in U.S. Appl. No. 14/950,419 dated Apr. 26, 2016, 17 pages.
Extended European Search Report issued in European Application No. 15201331.4 dated Apr. 20, 2016, 7 pages.
Office Action issued in U.S. Appl. No. 14/786,719 dated May 10, 2016, 9 pages.
Office Action issued in U.S. Appl. No. 14/950,520 dated May 20, 2016, 19 pages.
Office Action issued in U.S. Appl. No. 14/929,978 dated Apr. 20, 2016, 10 pages.
Office Action issued in U.S. Appl. No. 14/930,057 dated Apr. 20, 2016, 10 pages.
Office Action issued in U.S. Appl. No. 14/929,888 dated May 2, 2016, 11 pages.
Office Action issued in U.S. Appl. No. 14/930,012 dated May 10, 2016, 15 pages.
Office Action issued in U.S. Appl. No. 14/930,444 dated Apr. 20, 2016, 10 pages.
Office Action issued in U.S. Appl. No. 14/950,466 dated May 10, 2016, 18 pages.
Office Action issued in Chinese Application No. 201480011747.5 dated Jul. 1, 2016, 10 pages (with English translation).
Notice of Allowance issued in U.S. Appl. No. 14/929,888 dated Sep. 6, 2016, 10 pages.
Notice of Allowance issued in Korean Application No. 10-2015-0150363 dated Sep. 13, 2016, 3 pages (with English translation).
"WP-DC44 Waterproof Case for PowerShot G1." N.p., Mar. 19, 2012. Web. Jan. 30, 2017. <https://www.bhphotovideo.com/c/product/839525-REG/Canon_5969B001_WP_DC44_WATERPROOF_CASE_FOR.html>. 4 pages.
United States Office Action in U.S. Appl. No. 14/930,012, dated Mar. 23, 2017, 10 pages.
United States Office Action in U.S. Appl. No. 14/929,845, dated Feb. 6, 2017, 14 pages.
Chinese Office Action in Chinese Application No. 201510795232.5, dated Apr. 5, 2017, 14 pages (with English translation).
Chinese Office Action in Chinese Application No. 201510796450.0, dated Apr. 5, 2017, 16 pages (with English translation).
Chinese Office Action in Chinese Application No. 201510796557.5, dated Apr. 17, 2017, 21 pages (with English translation).
Chinese Office Action in Chinese Application No. 201510796498.1, dated Apr. 19, 2017, 10 pages (with English translation).
Chinese Office Action in Chinese Application No. 2017052701460220, dated Jun. 2, 2017, 19 pages (with English translation).
Office Action issued in U.S. Appl. No. 14/930,012, dated Jul. 13, 2017, 12 pages.
Chinese Office Action in Chinese Application No. 201610127404.6, dated Aug. 25, 2017, 13 pages (with English translation).
United States Office Action in U.S. Appl. No. 15/720,989, dated Mar. 29, 2018, 13 pages.
Google.com [online], "Definition of Between," retrieved on May 29, 2018, retrieved from: URL: <https://www.google.com/search?q=Dictionary>, 1 page.

\* cited by examiner

[Fig. 1]
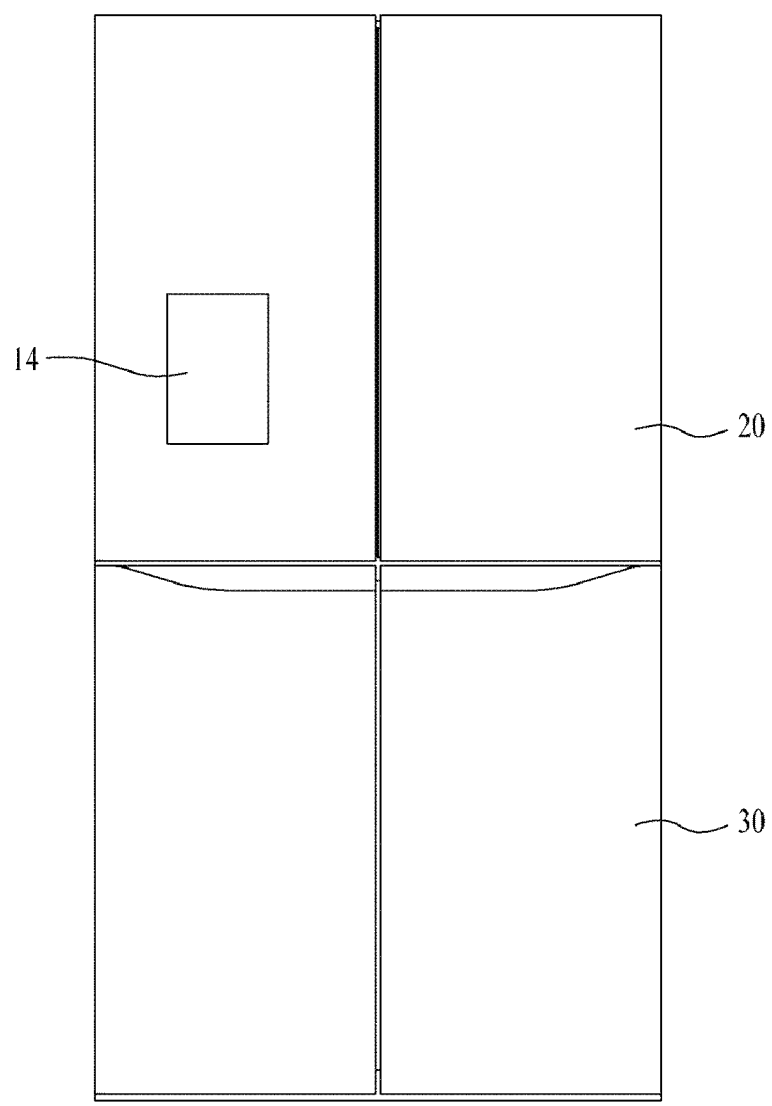

[Fig. 2]
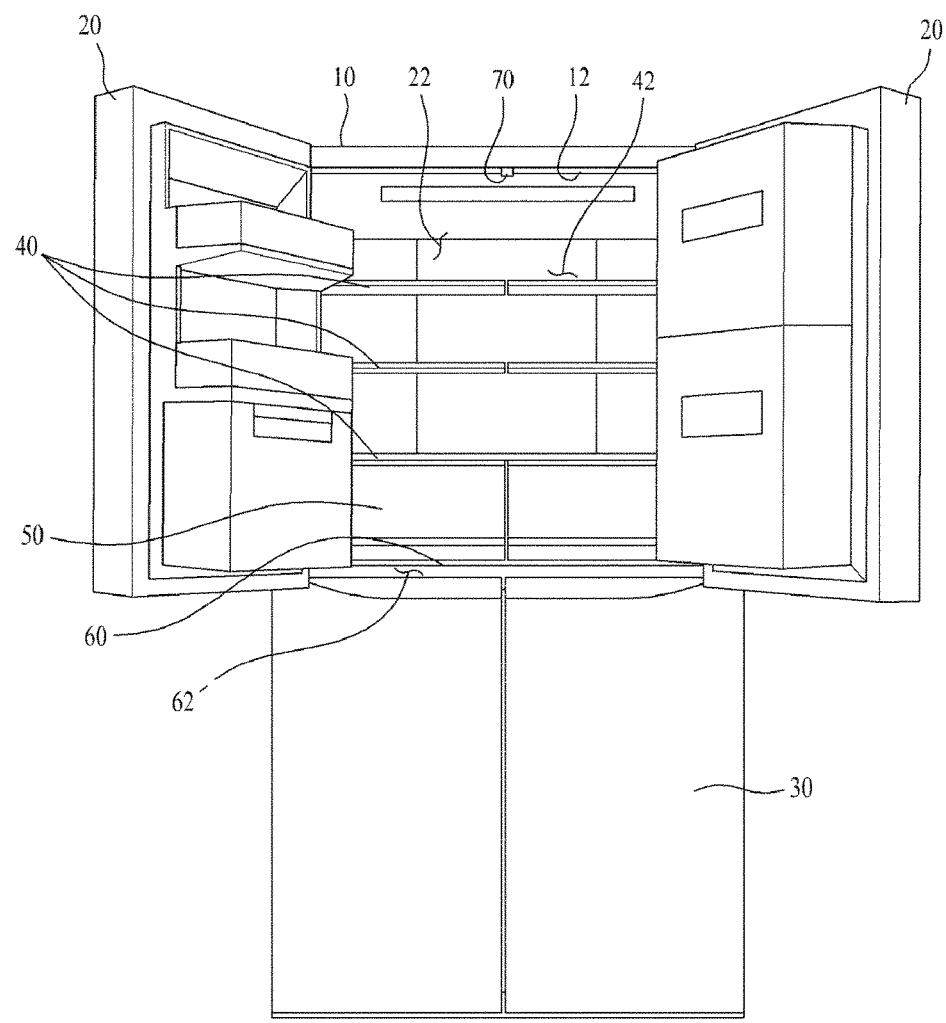

[Fig. 3]
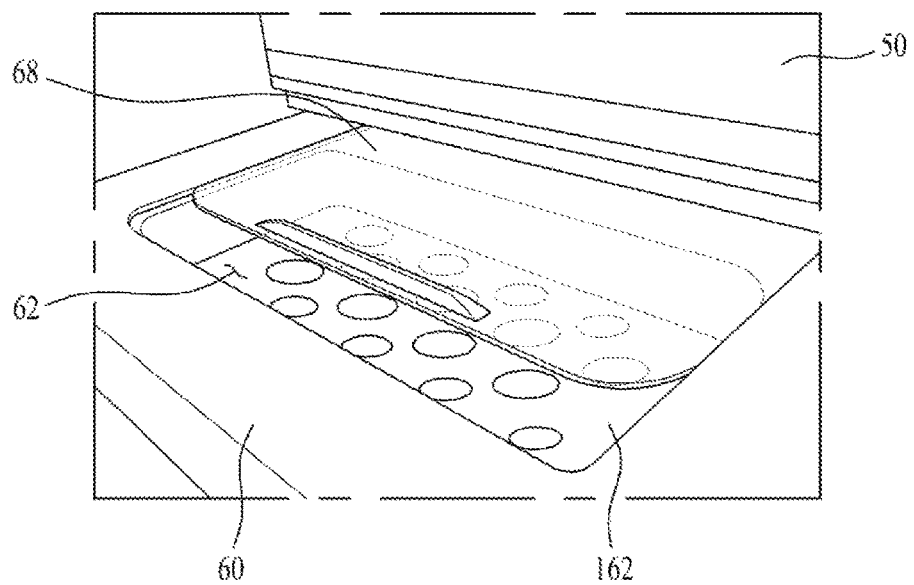

[Fig. 4A]
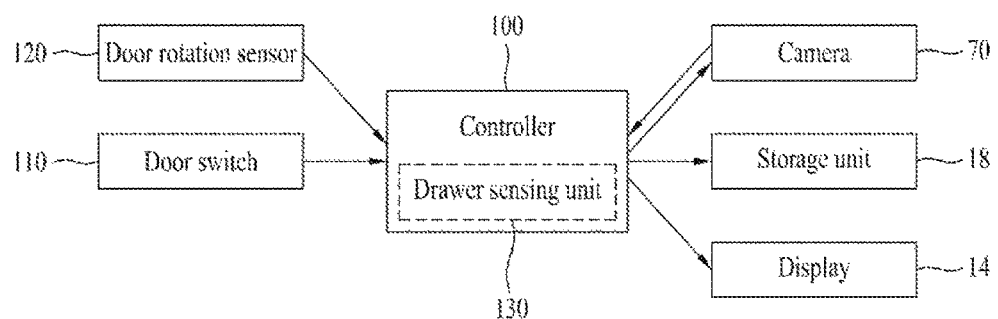
[Fig. 4B]
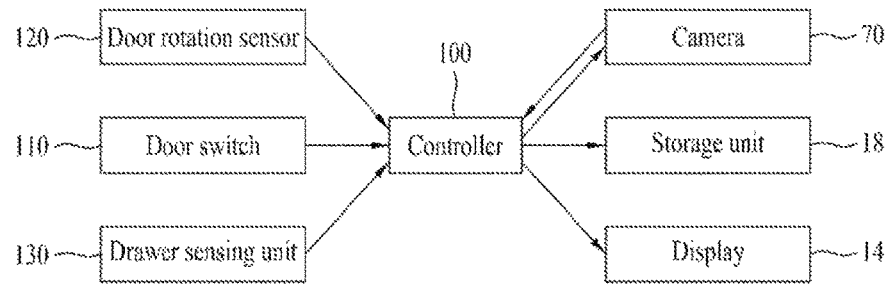

[Fig. 5]
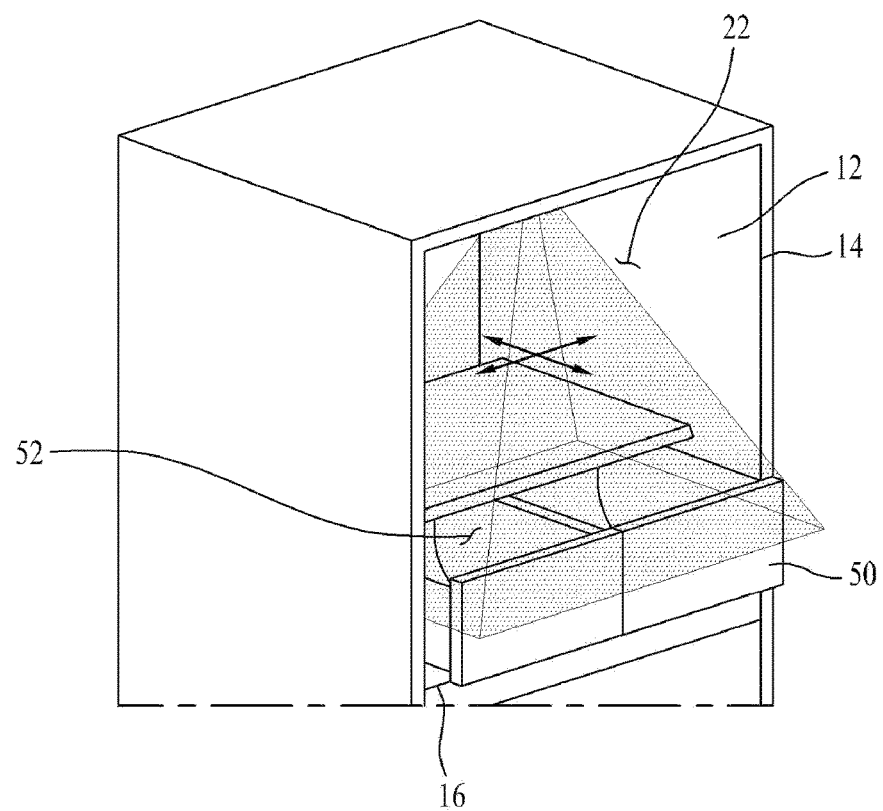

[Fig. 6]
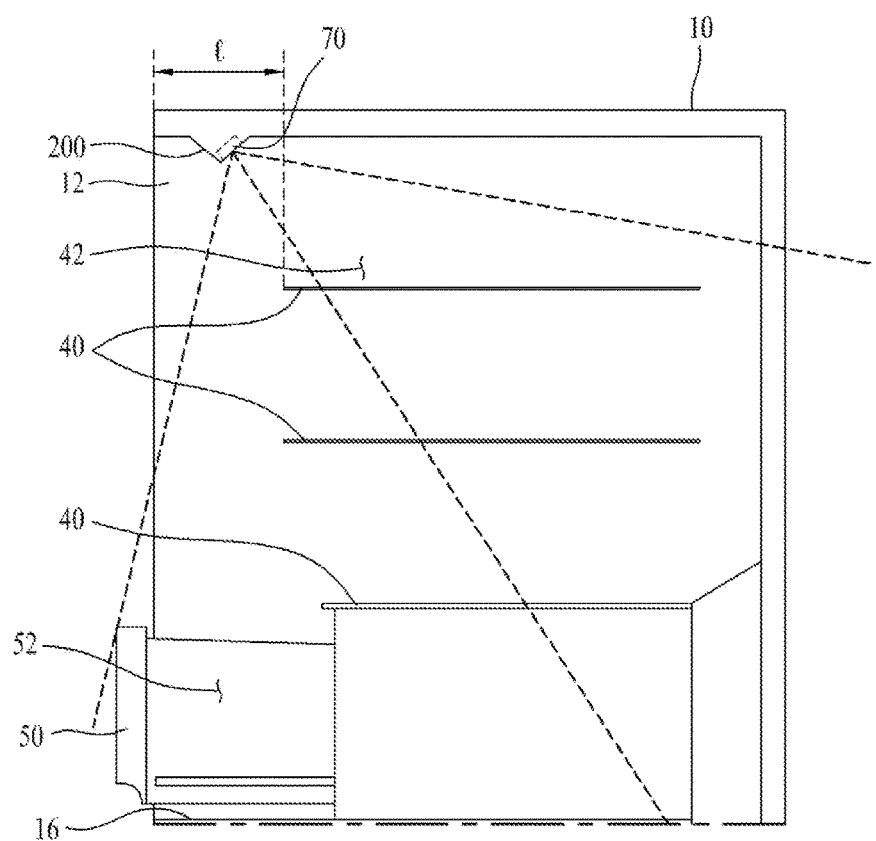

[Fig. 7]
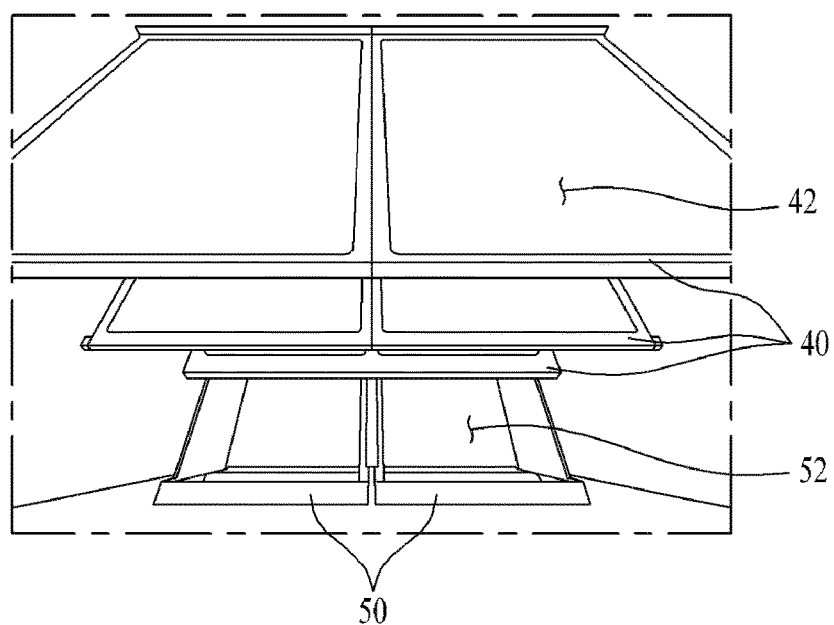

[Fig. 8]
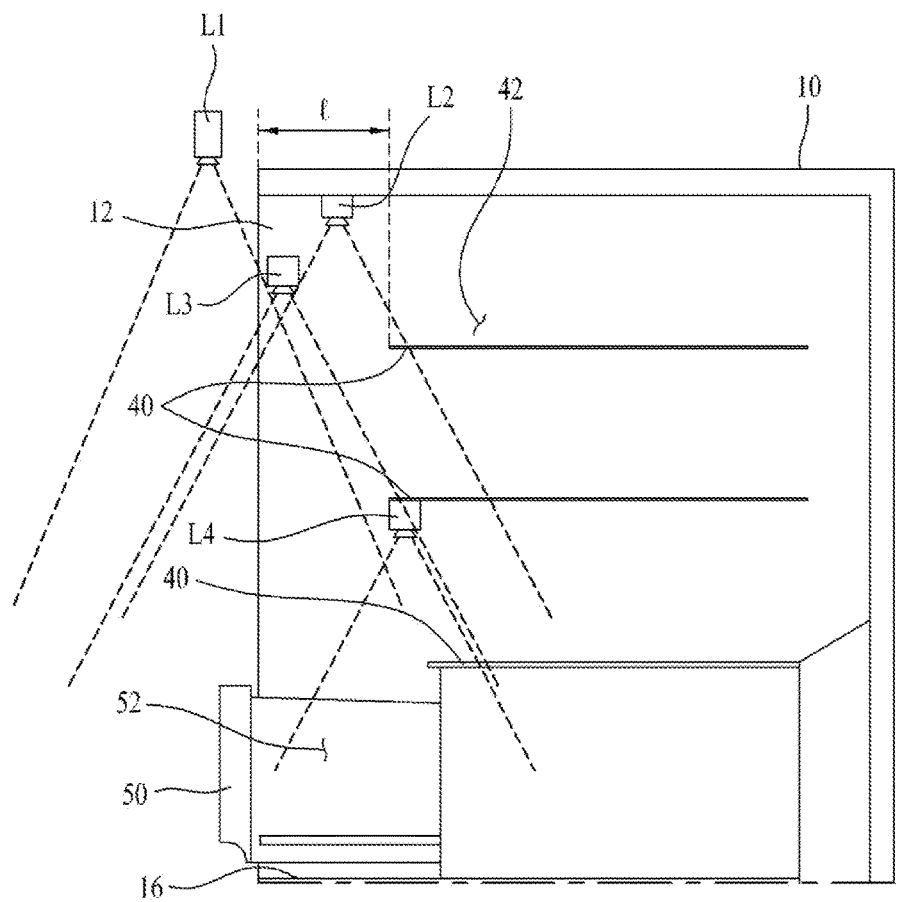

[Fig. 9]
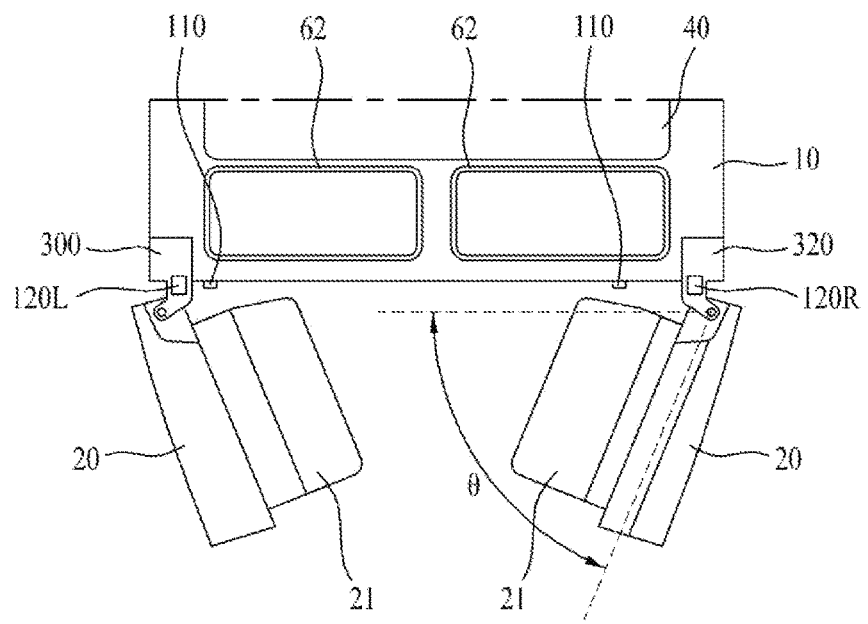

[Fig. 10]
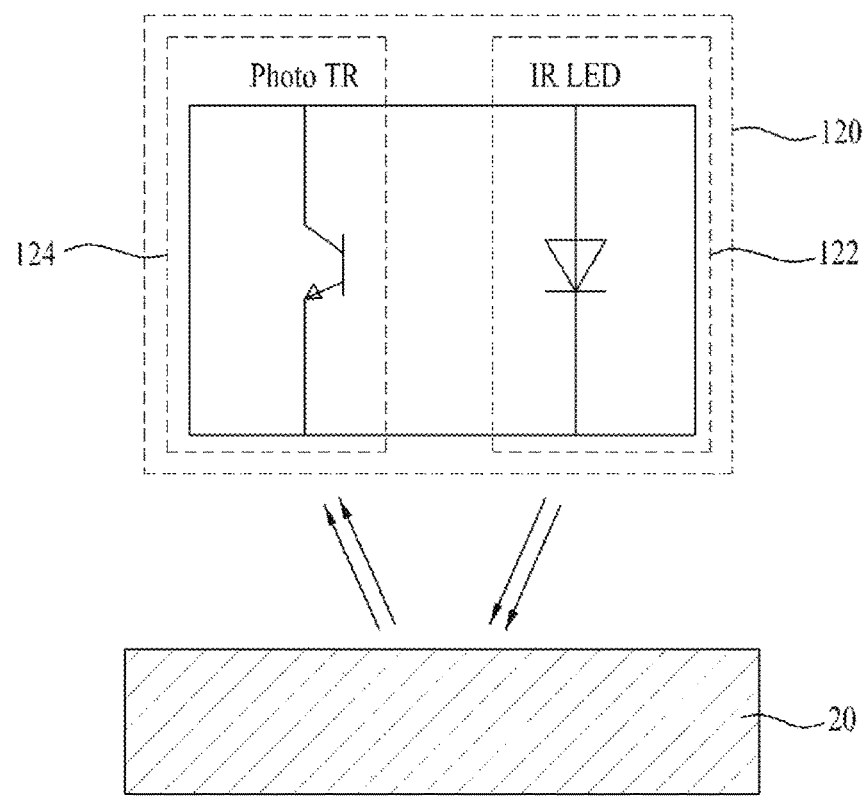

[Fig. 11]
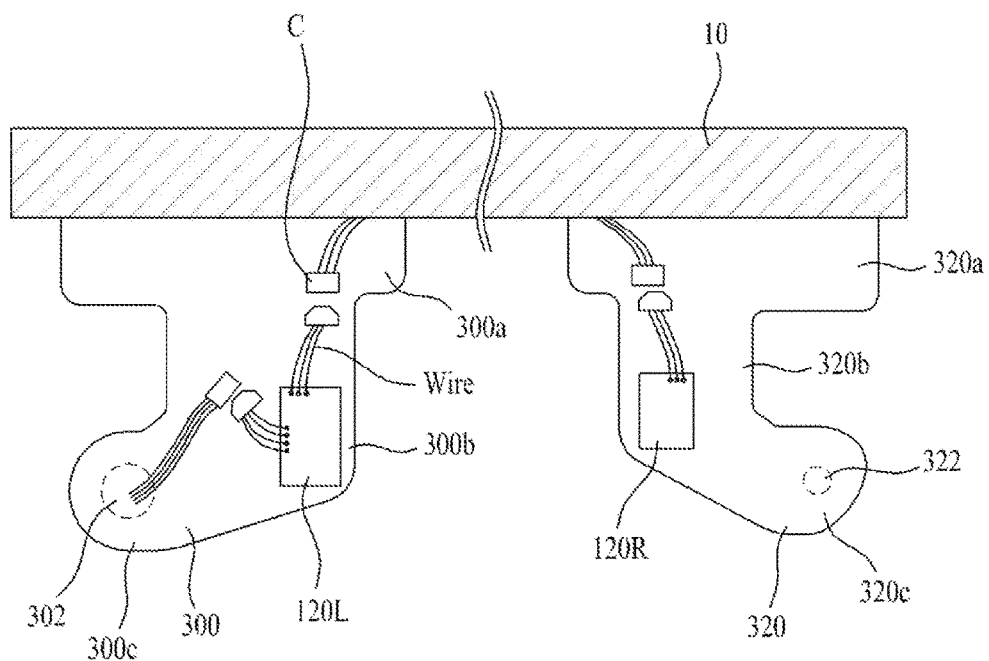

[Fig. 12A]
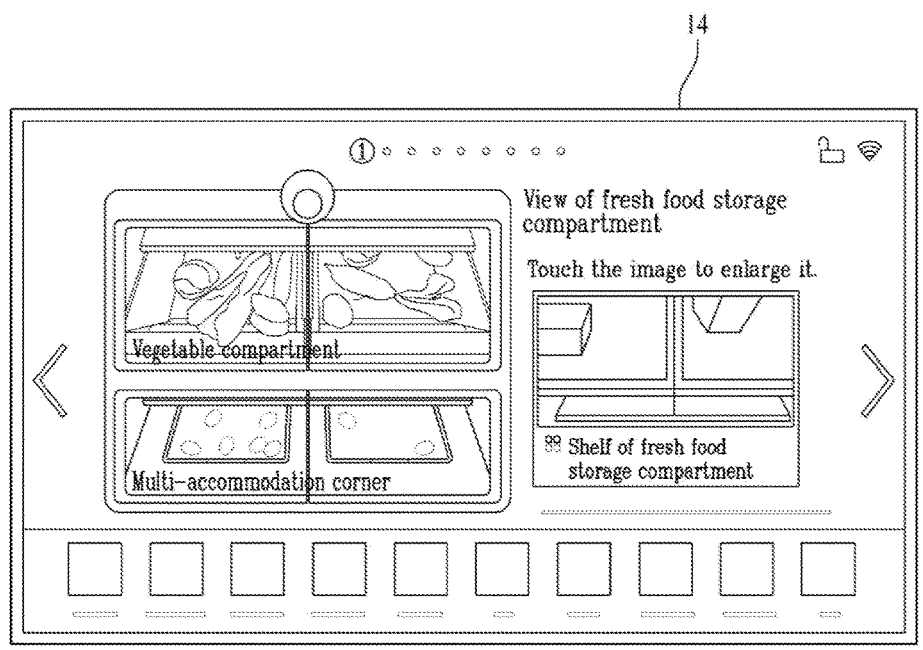

[Fig. 12B]
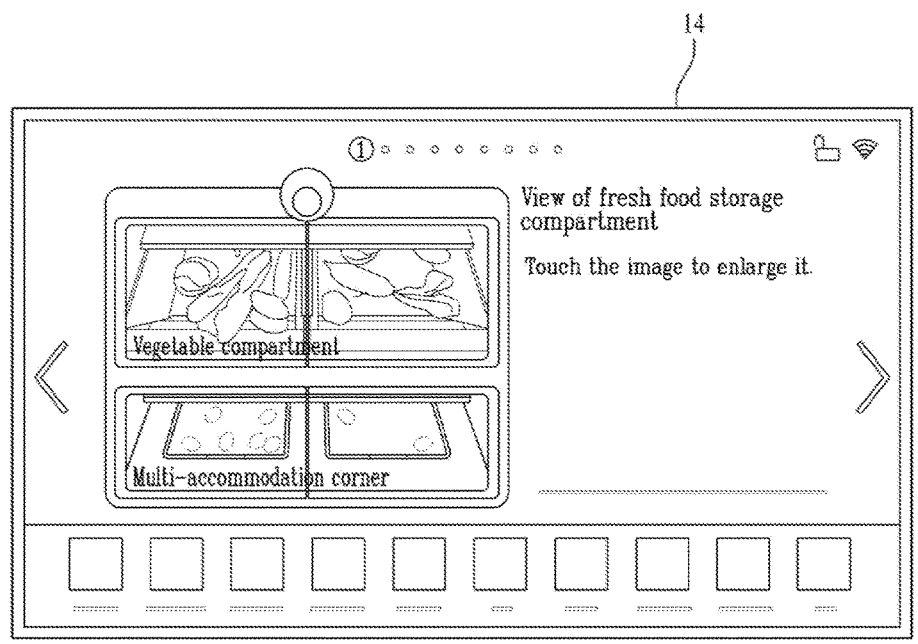

[Fig. 12C]
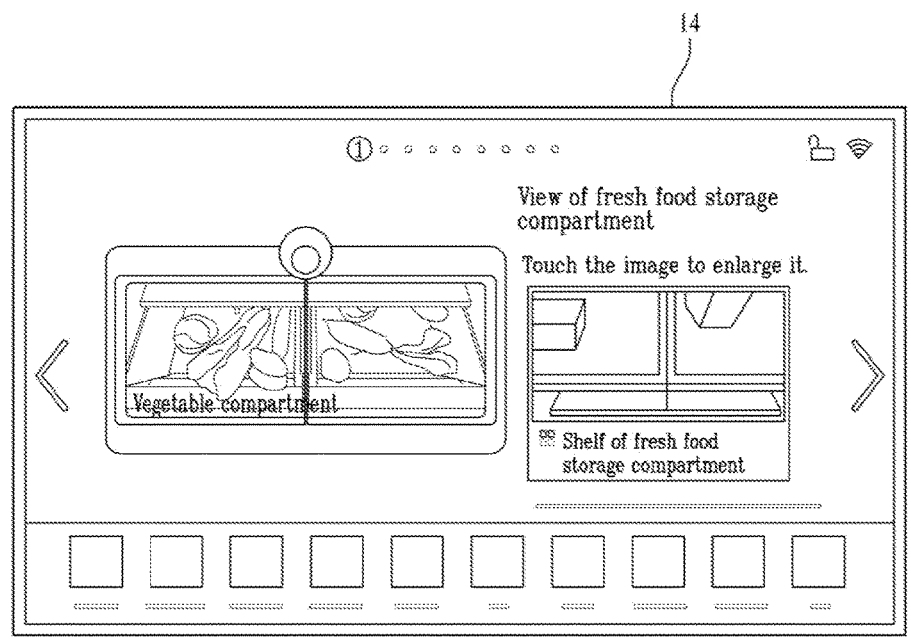

[Fig. 13]
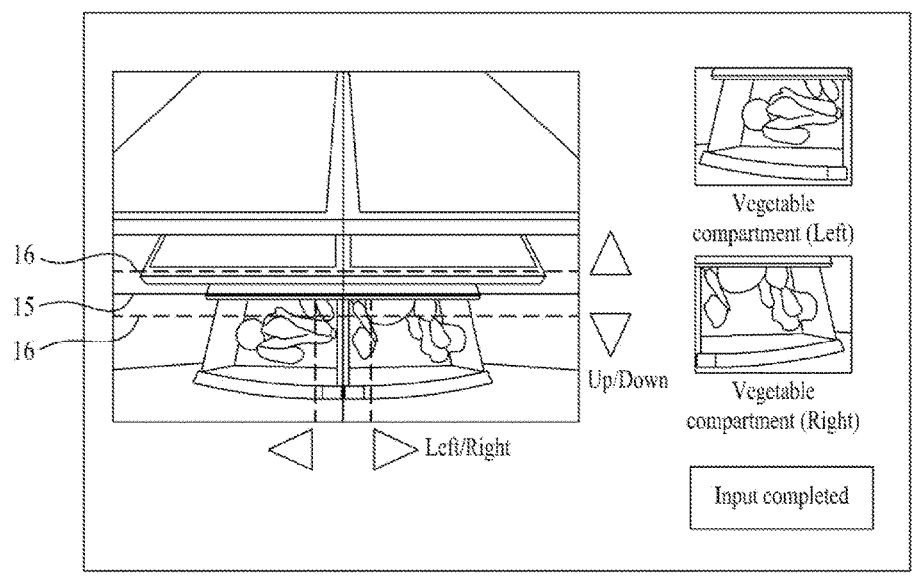

[Fig. 14]
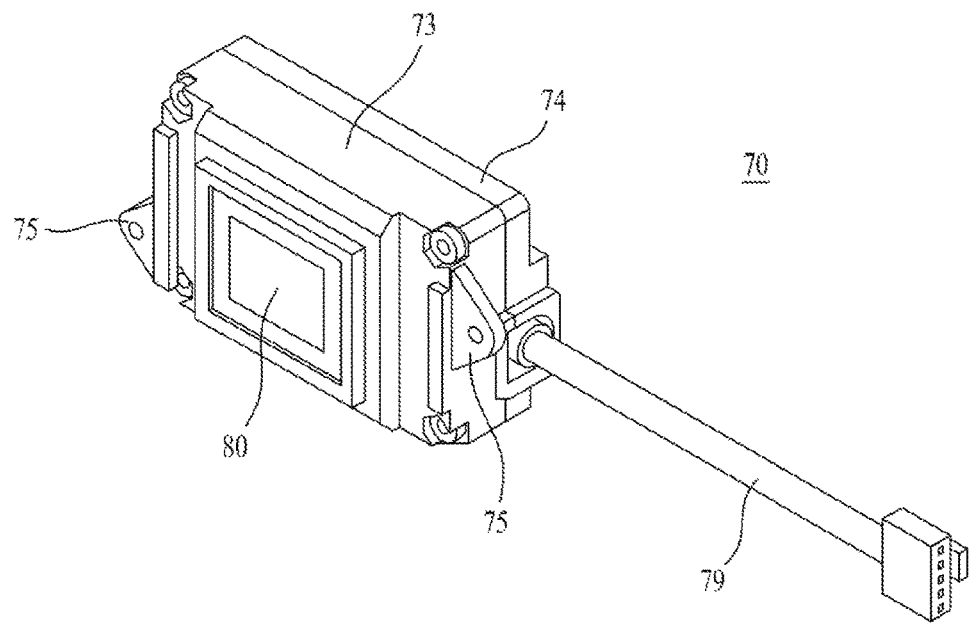

[Fig. 15]
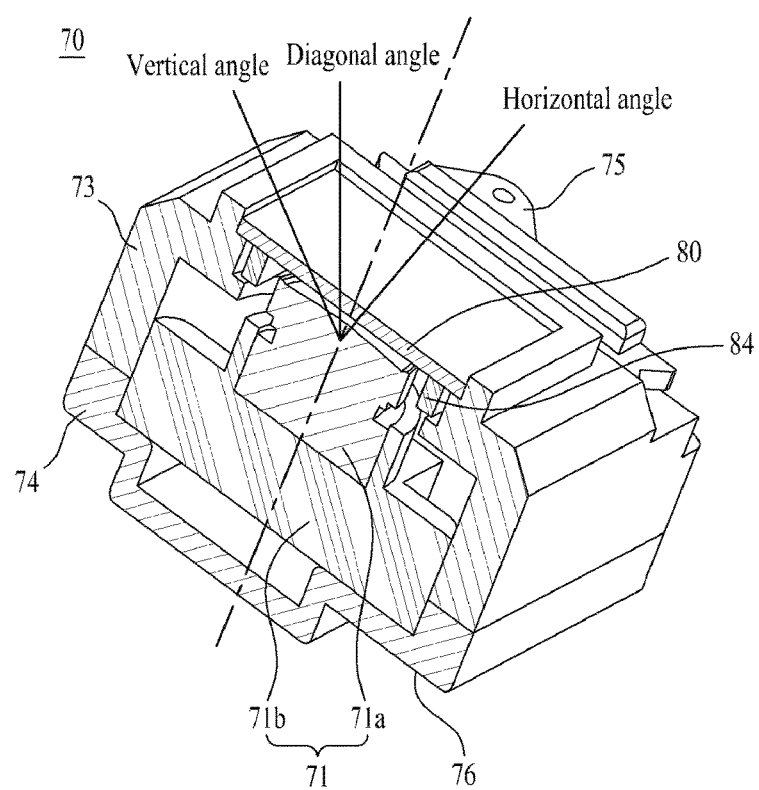

[Fig. 16]
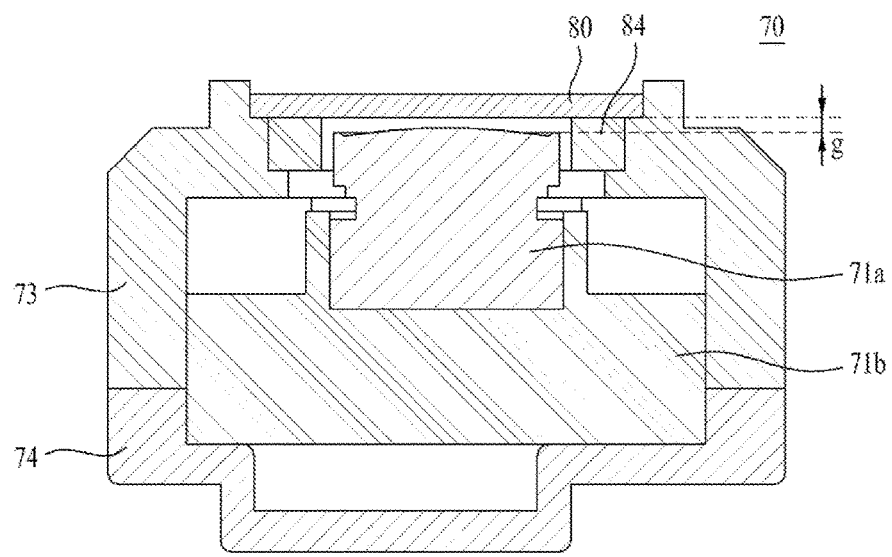

[Fig. 17]
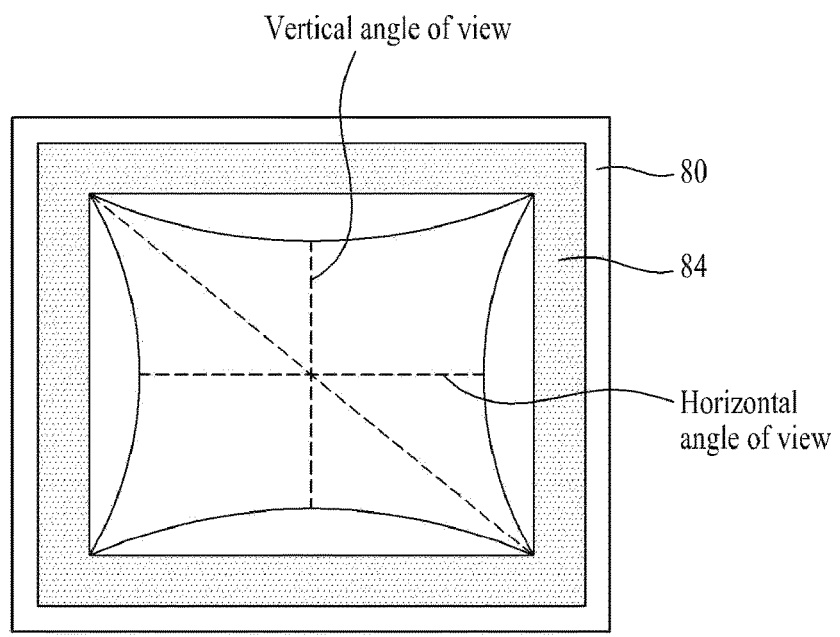

[Fig. 18A]
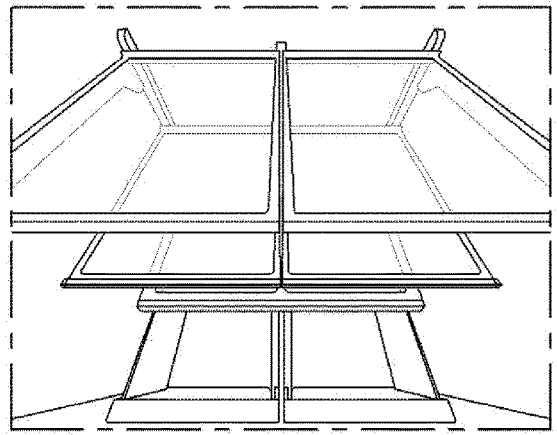
[Fig. 18B]
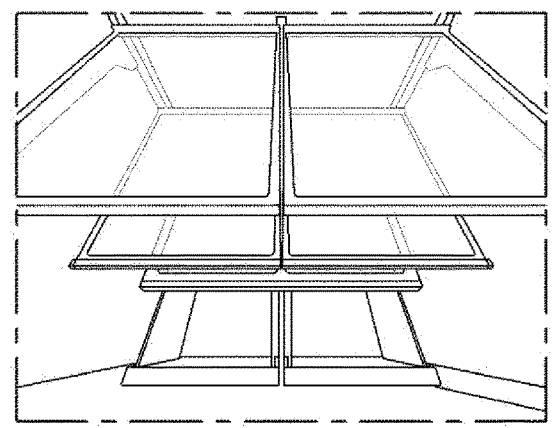
[Fig. 18C]
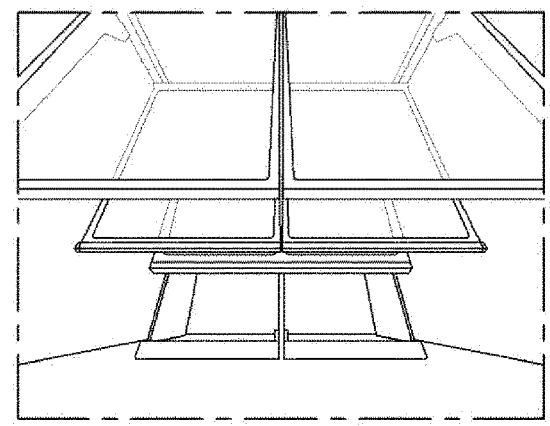

[Fig. 19A]
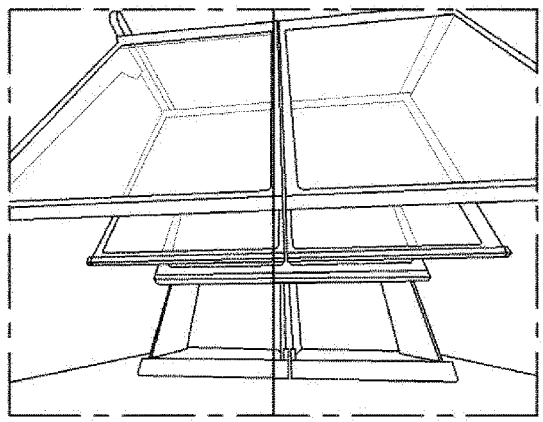
[Fig. 19B]
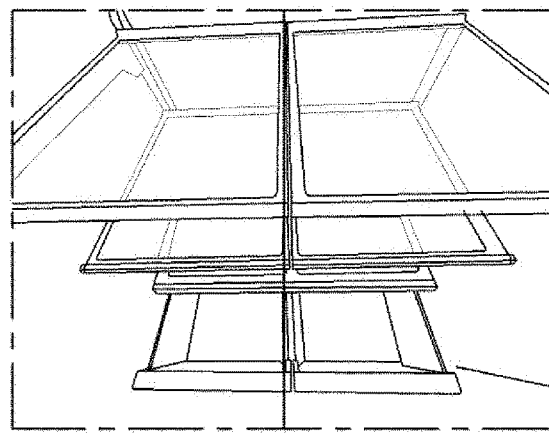
[Fig. 19C]
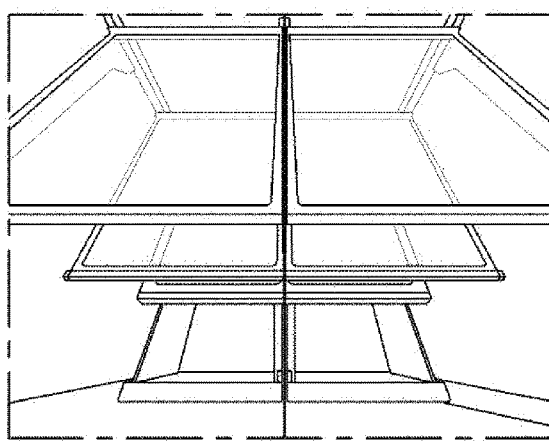

[Fig. 20]
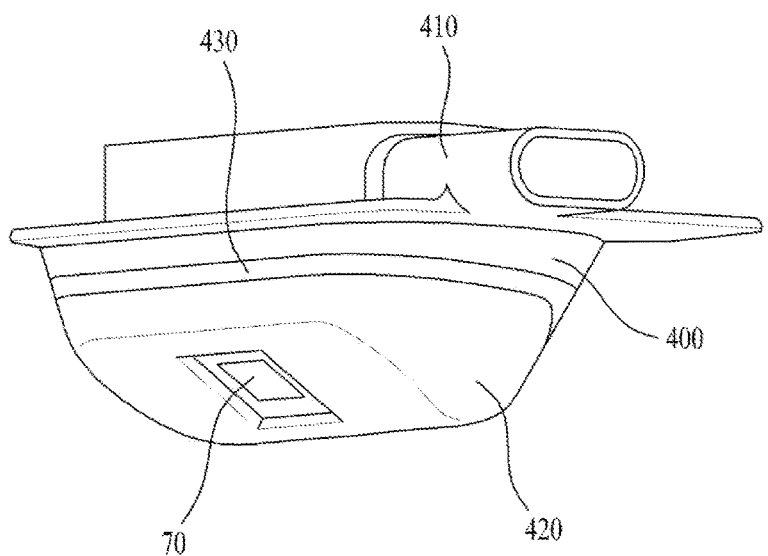

[Fig. 21]
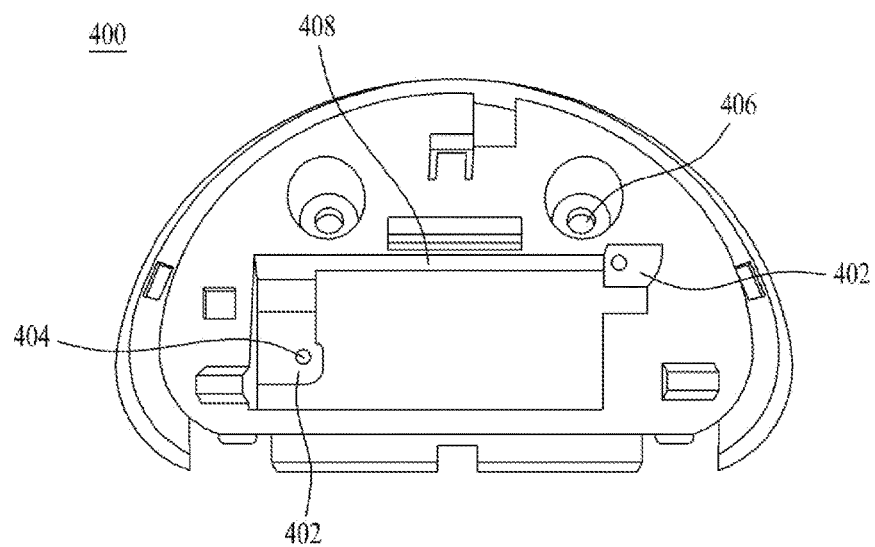

[Fig. 22]
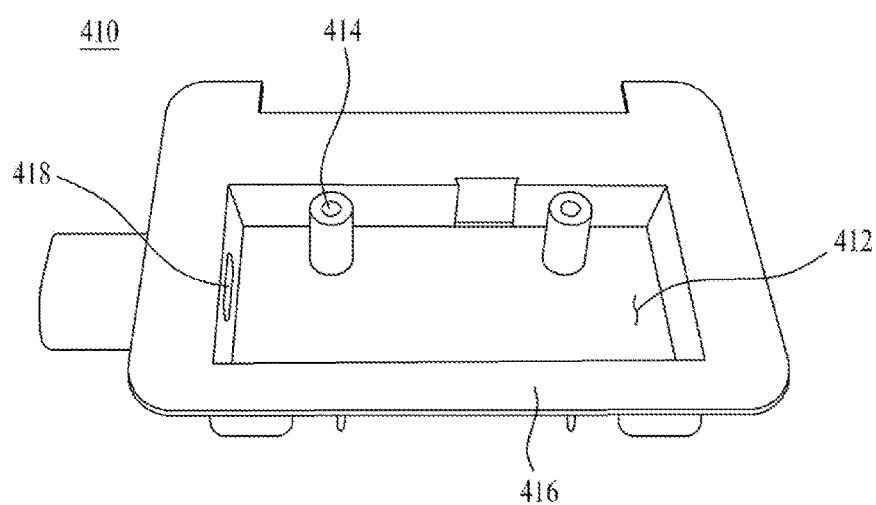

[Fig. 23]
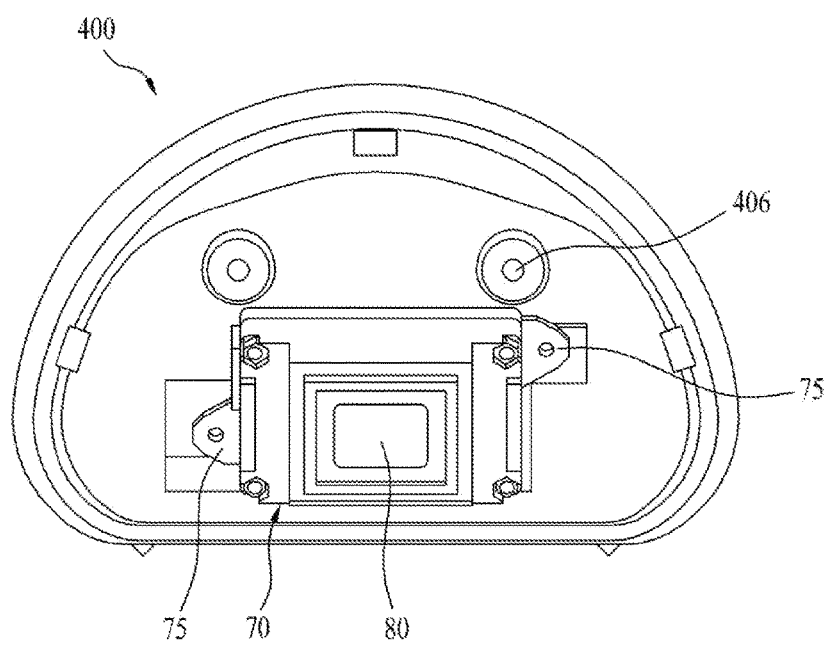

[Fig. 24]
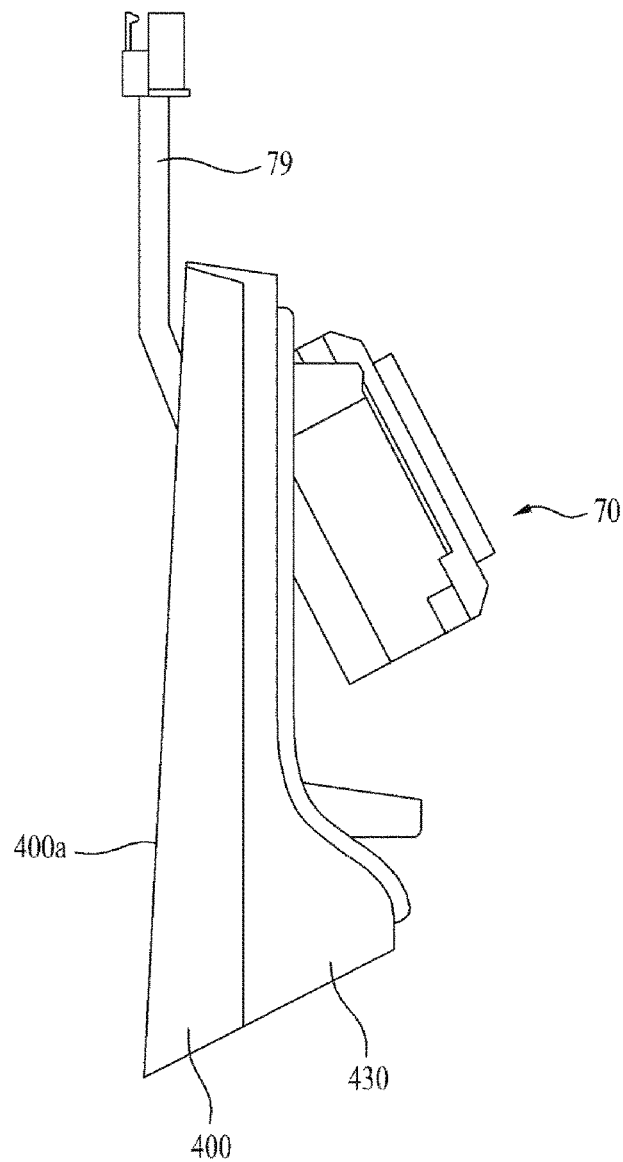

[Fig. 25]
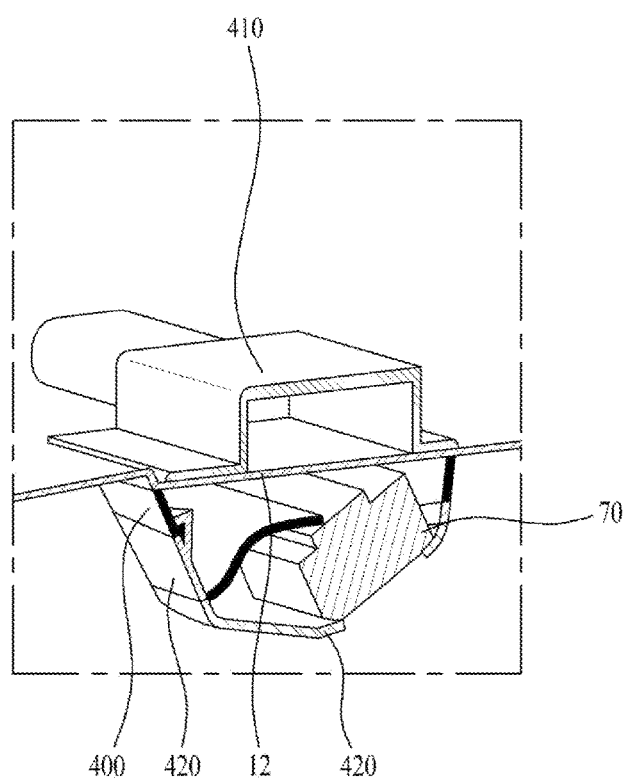

[Fig. 26]

| | | Current consumption[mA] | | Monthly power consumption[Wh] | |
|---|---|---|---|---|---|
| | Item | Normally | Door Open(20sec/times) | 25 Open/day | 50 Open/day |
| Conventional example | Camera | 70 | 50 | 253 | 254 |
| Present invention | Camera | 20 | 100 | 74 | 76 |

[Fig. 27B]
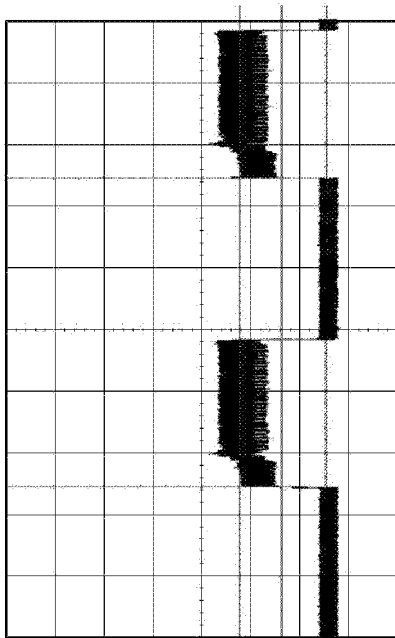
[Fig. 27A]
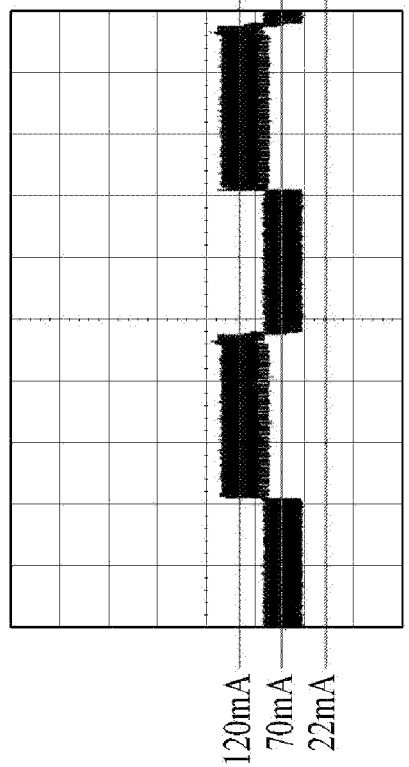
120mA
70mA
22mA

[Fig. 28]
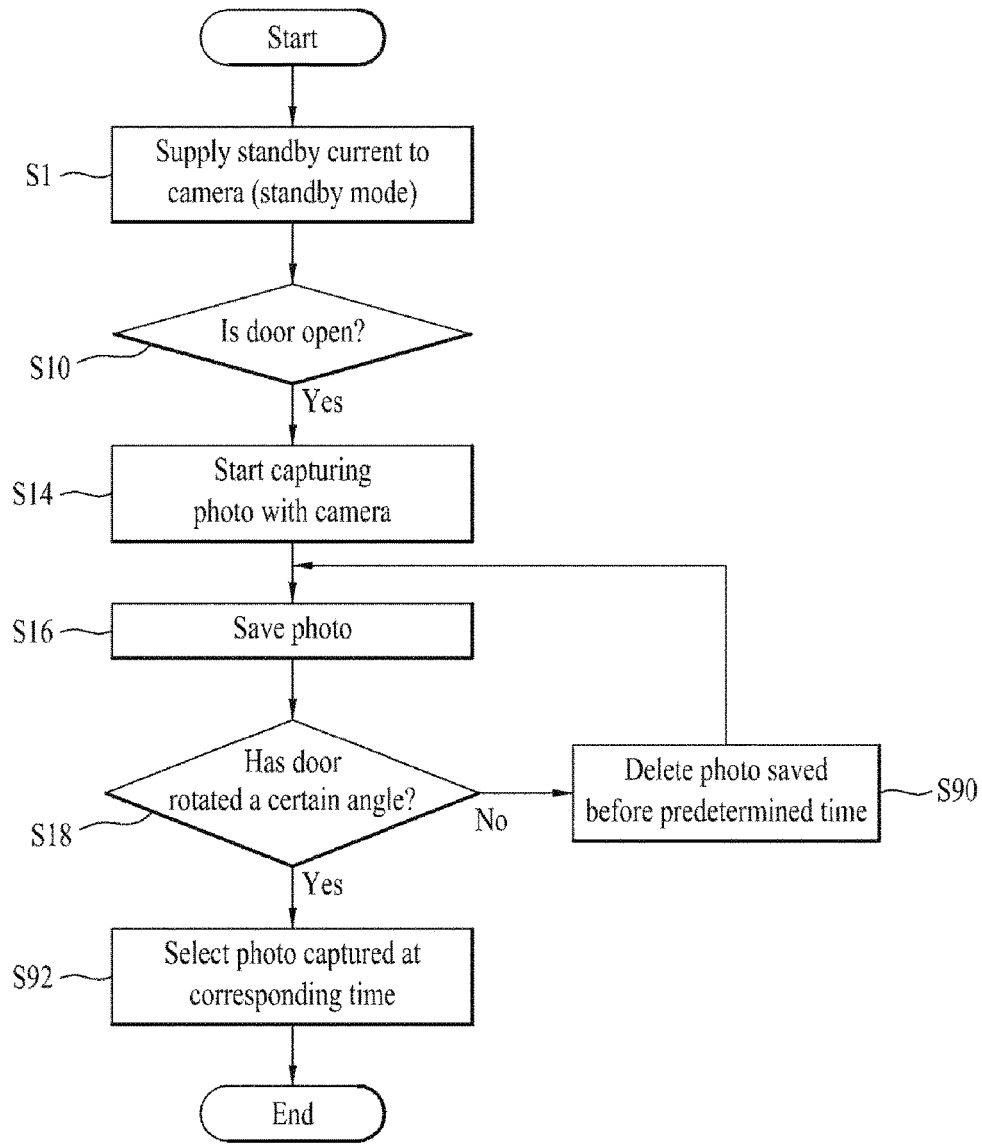

[Fig. 29]
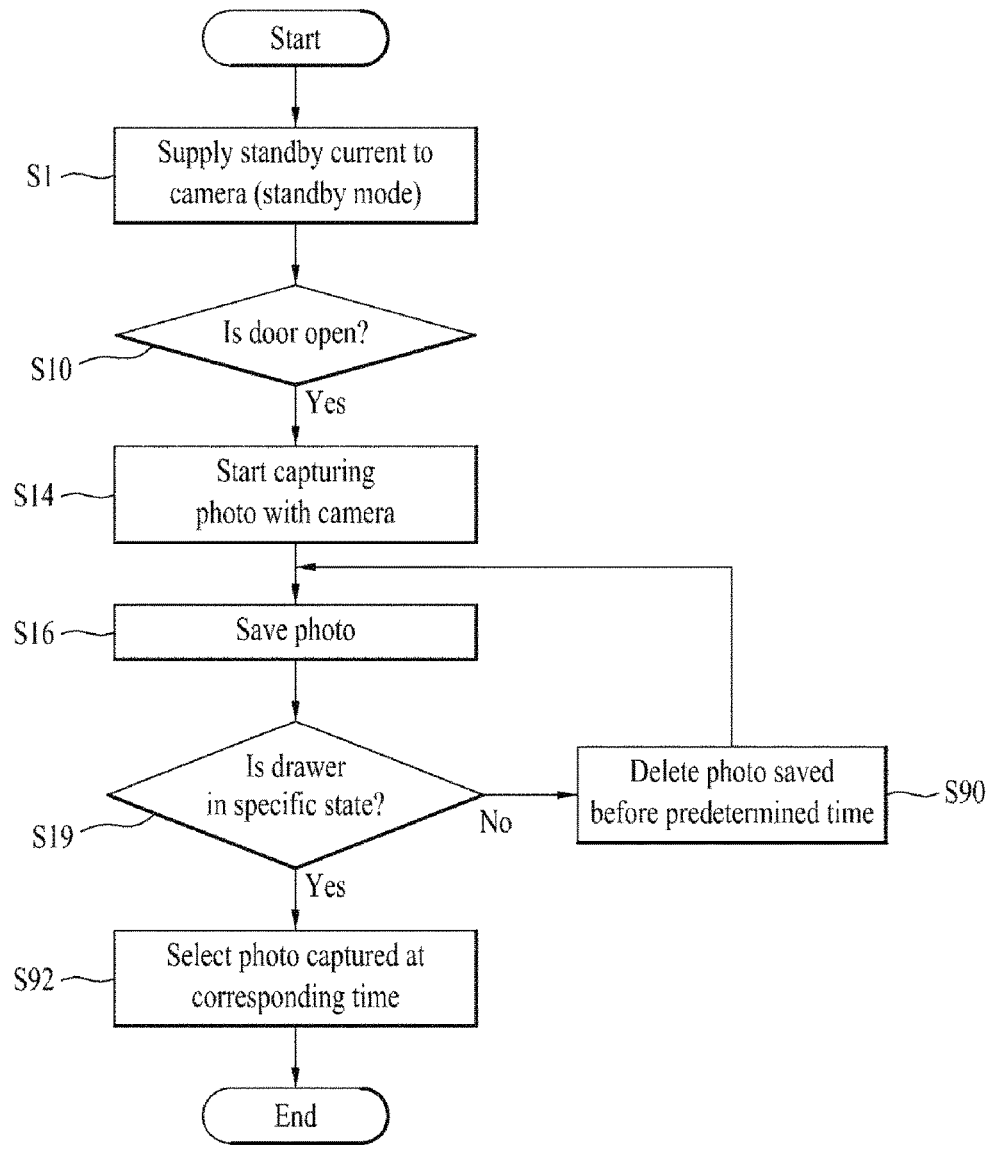

[Fig. 30]
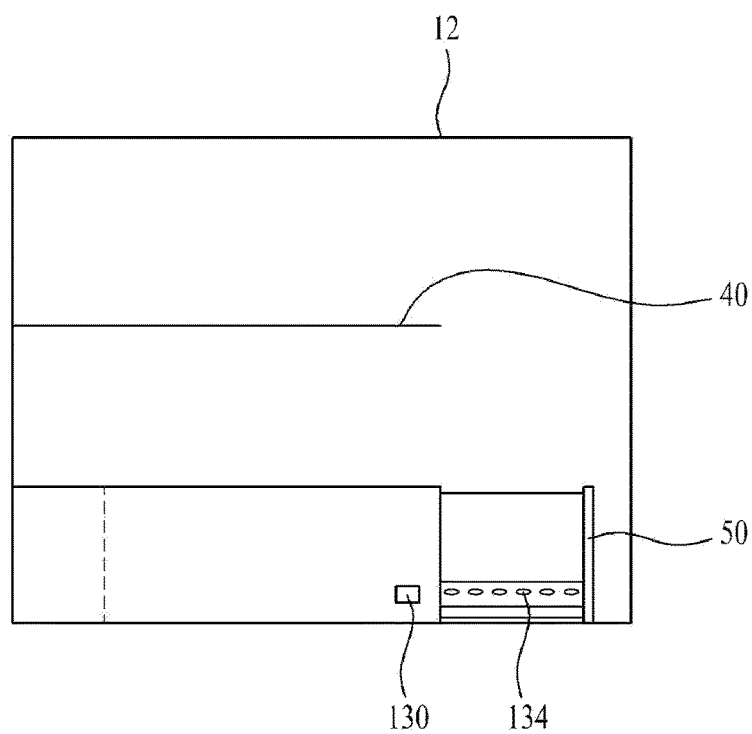

[Fig. 31A]
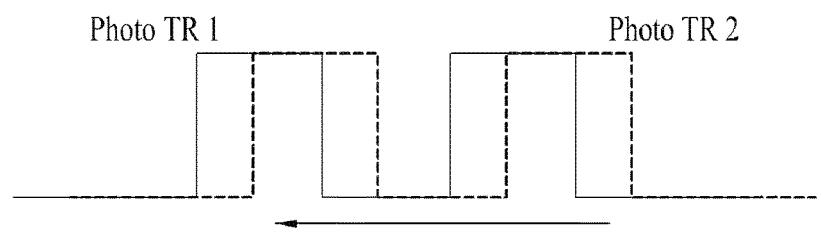
[Fig. 31B]
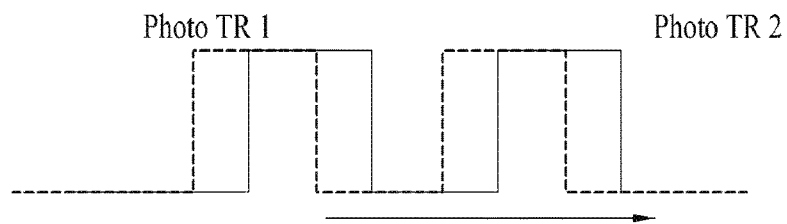

[Fig. 32]
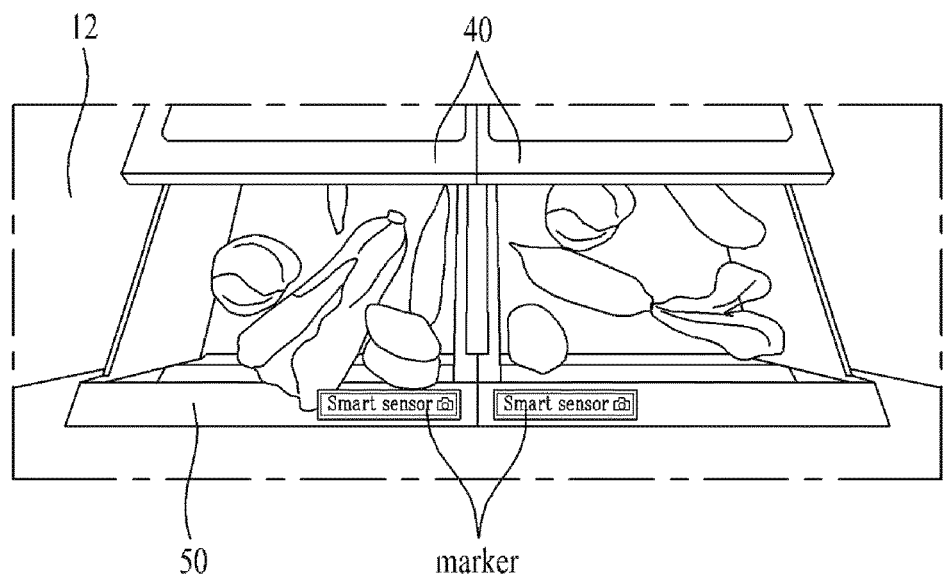

[Fig. 33A]
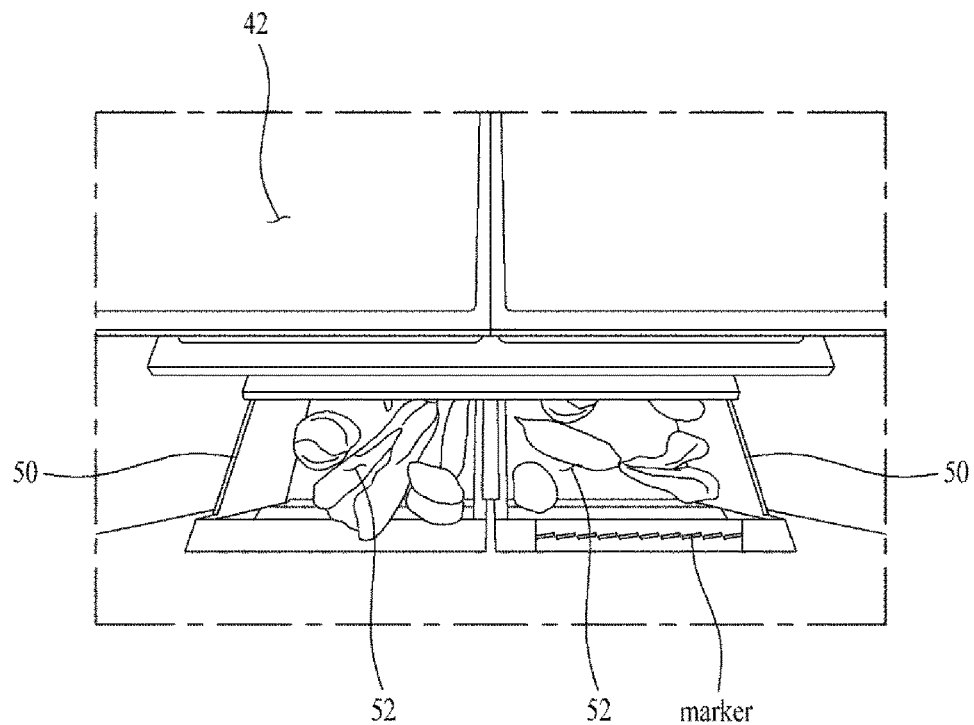
[Fig. 33B]
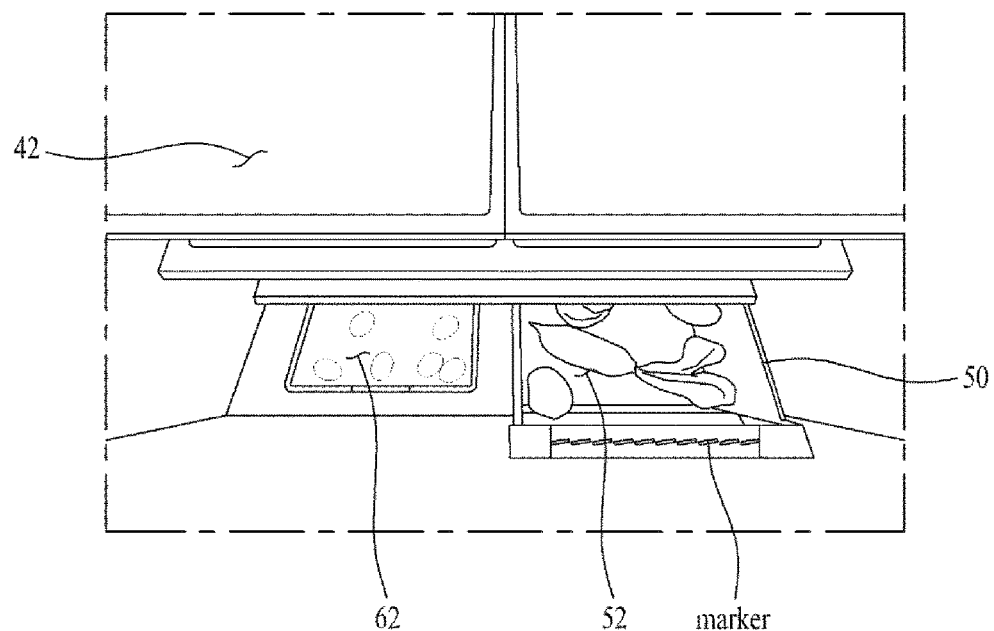

[Fig. 34]
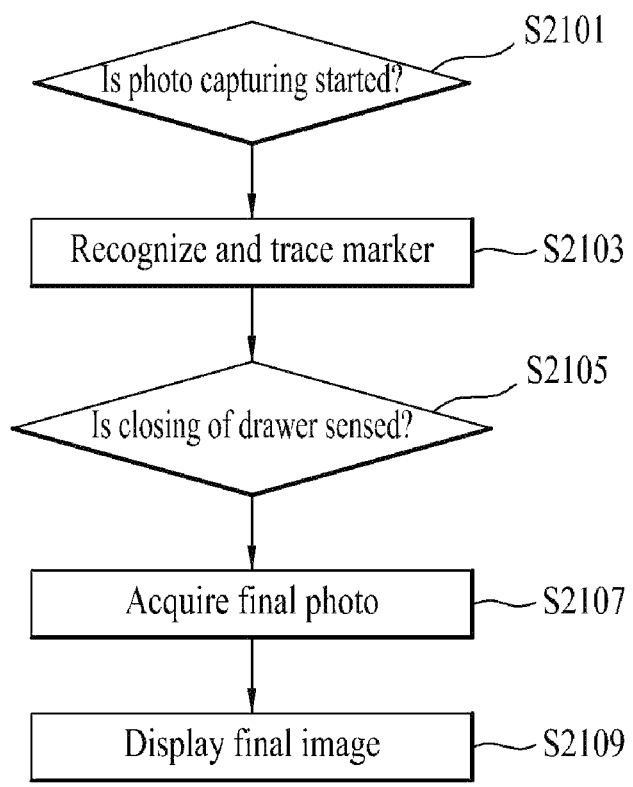

[Fig. 35]
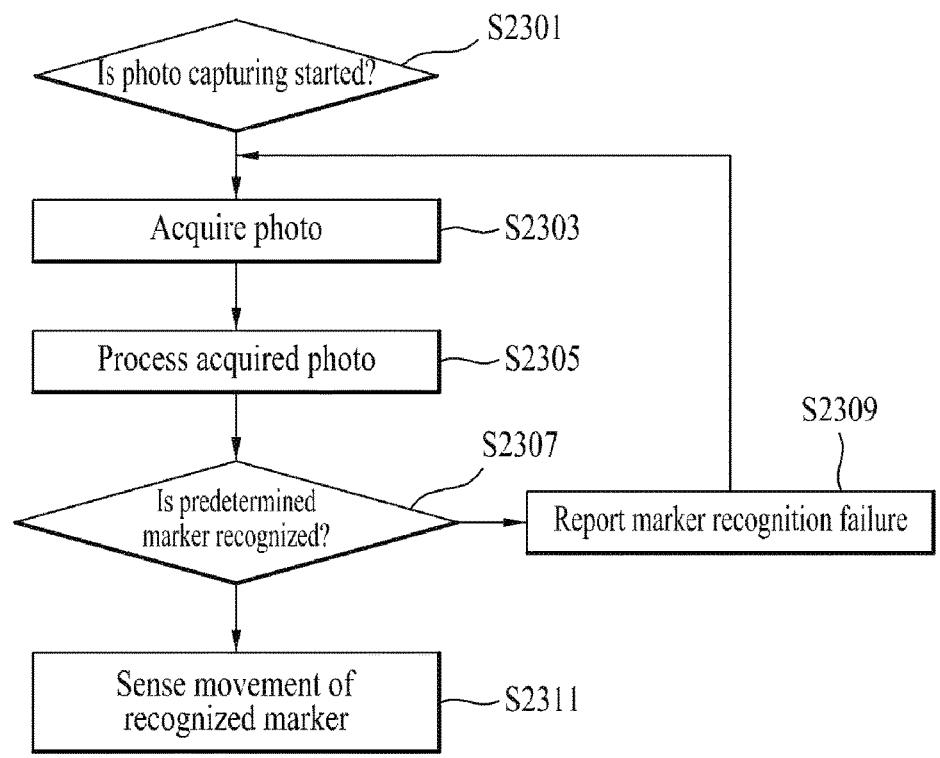

[Fig. 36A]
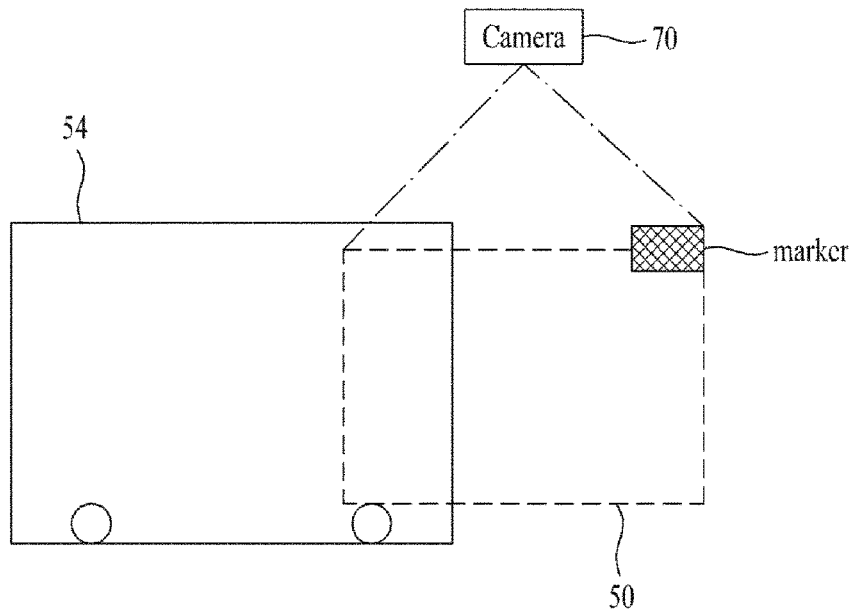
[Fig. 36B]
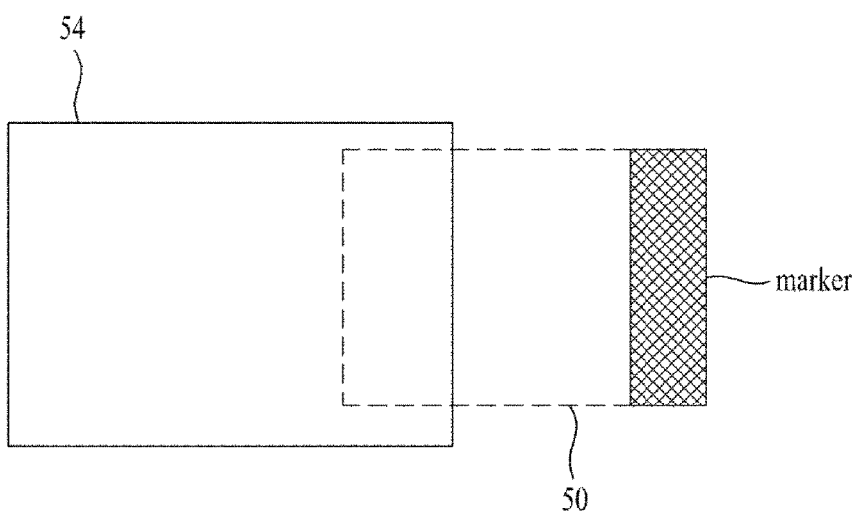

[Fig. 37A]
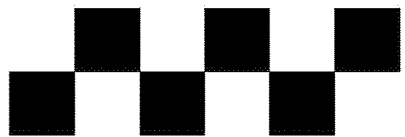
[Fig. 37B]

[Fig. 38]
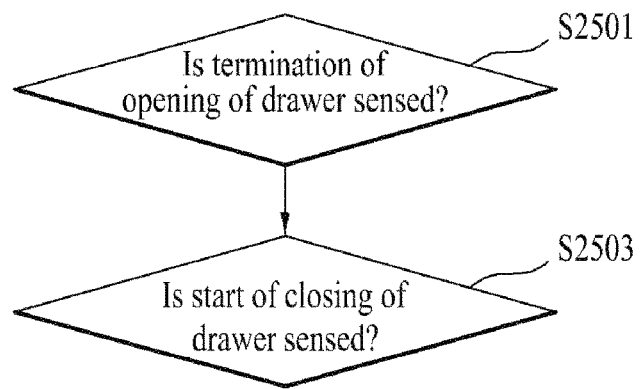

[Fig. 39]
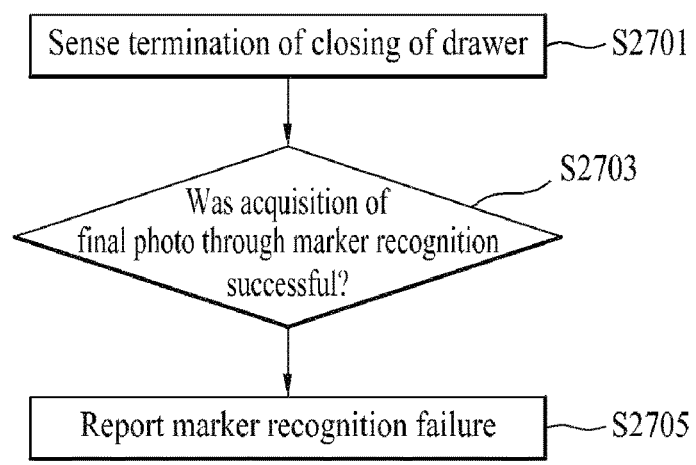

[Fig. 40]
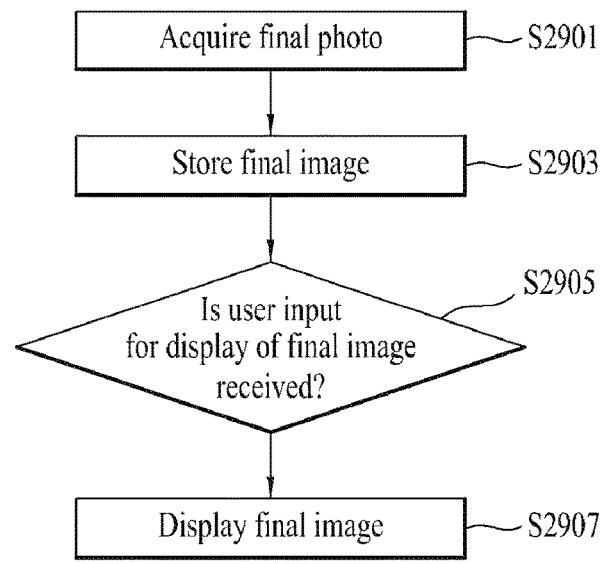

[Fig. 41A]
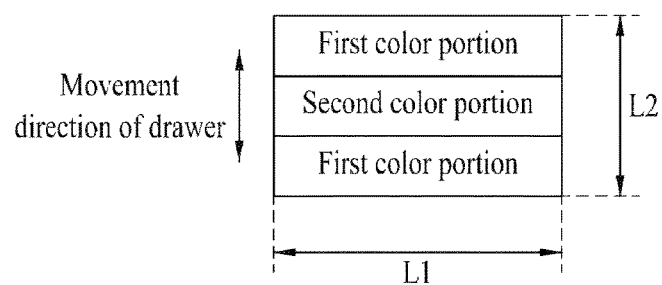
[Fig. 41B]
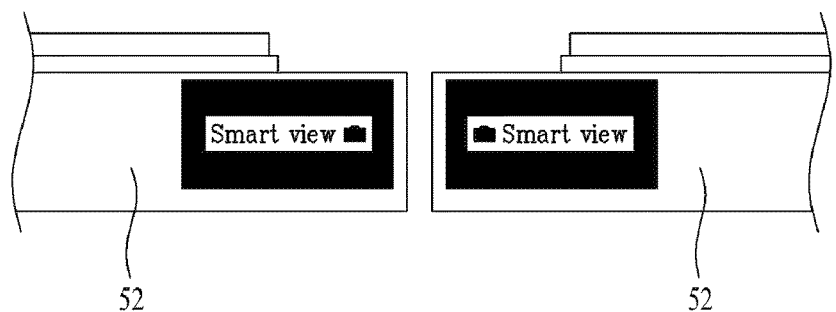

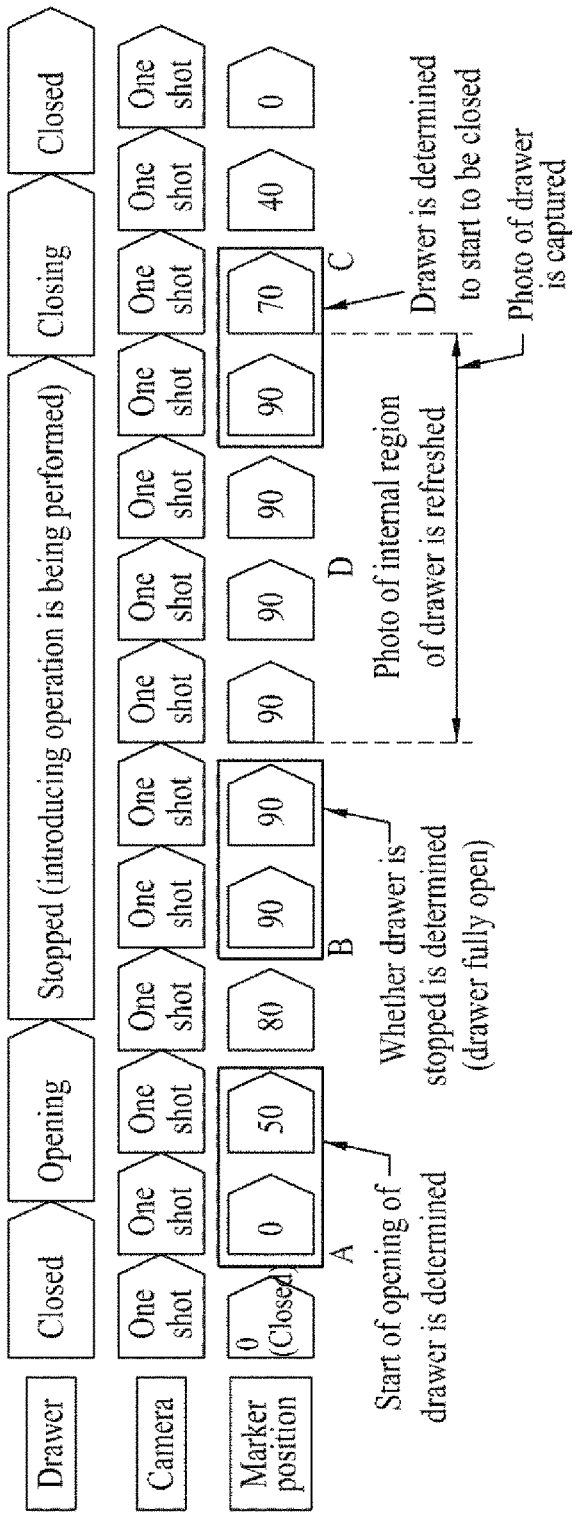
[Fig. 42]

[Fig. 43A]
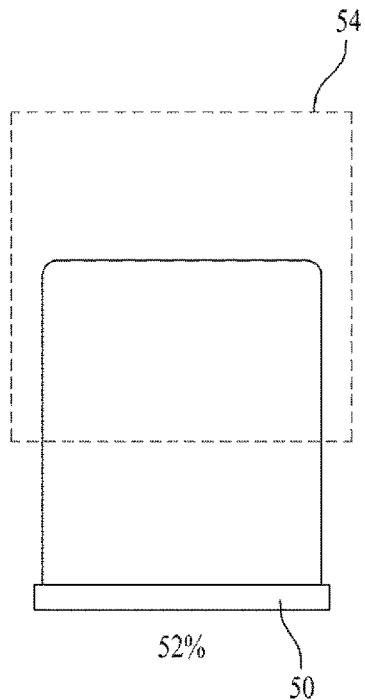
52%
[Fig. 43B]
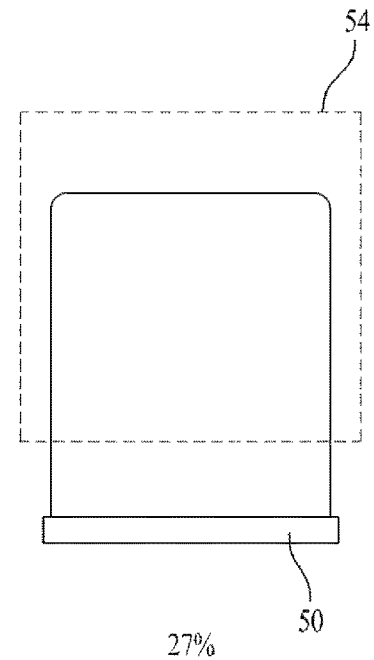
27%
[Fig. 43C]
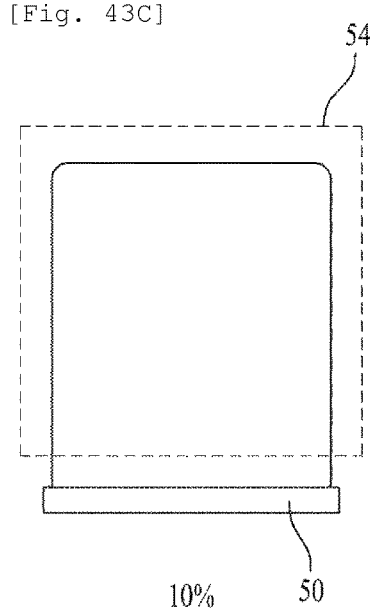
10%

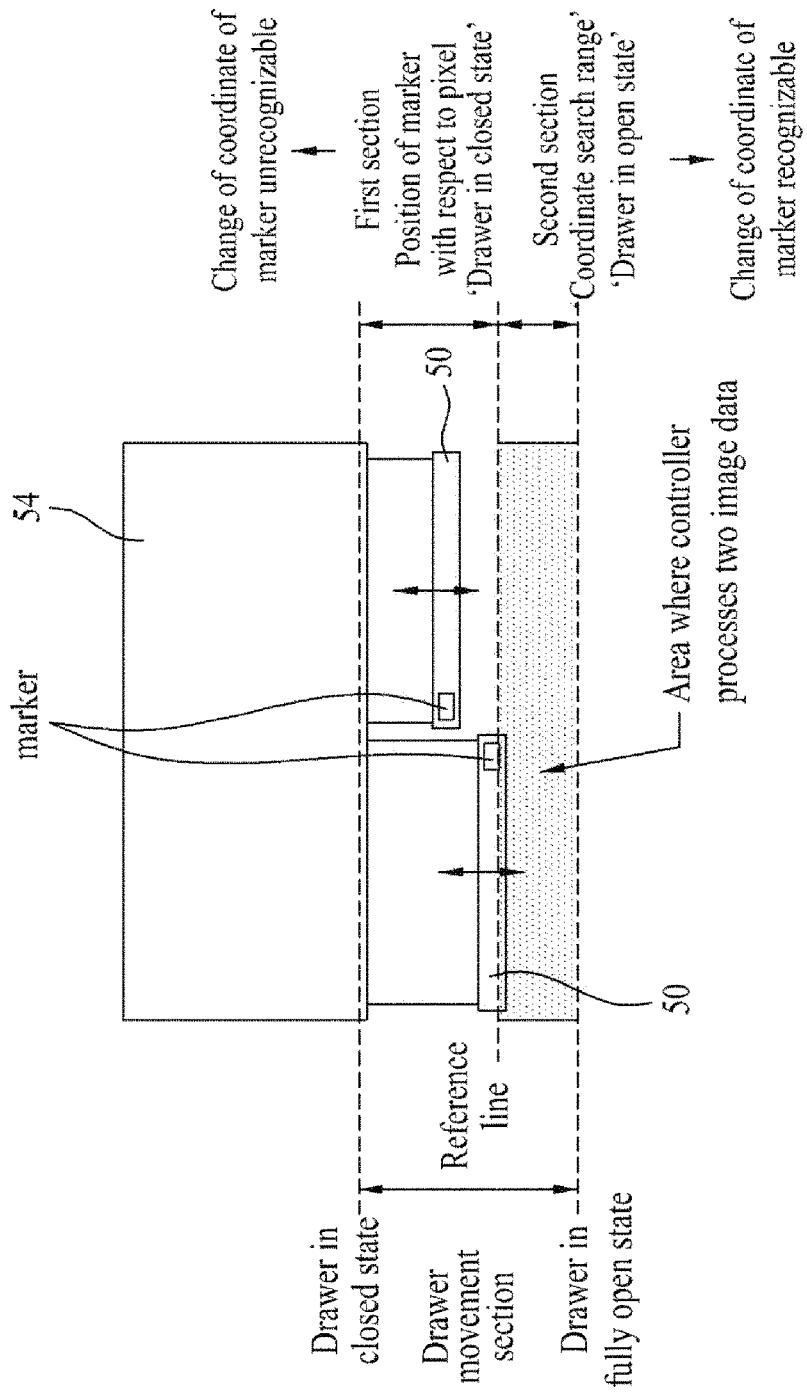
[Fig. 44]

[Fig. 45]
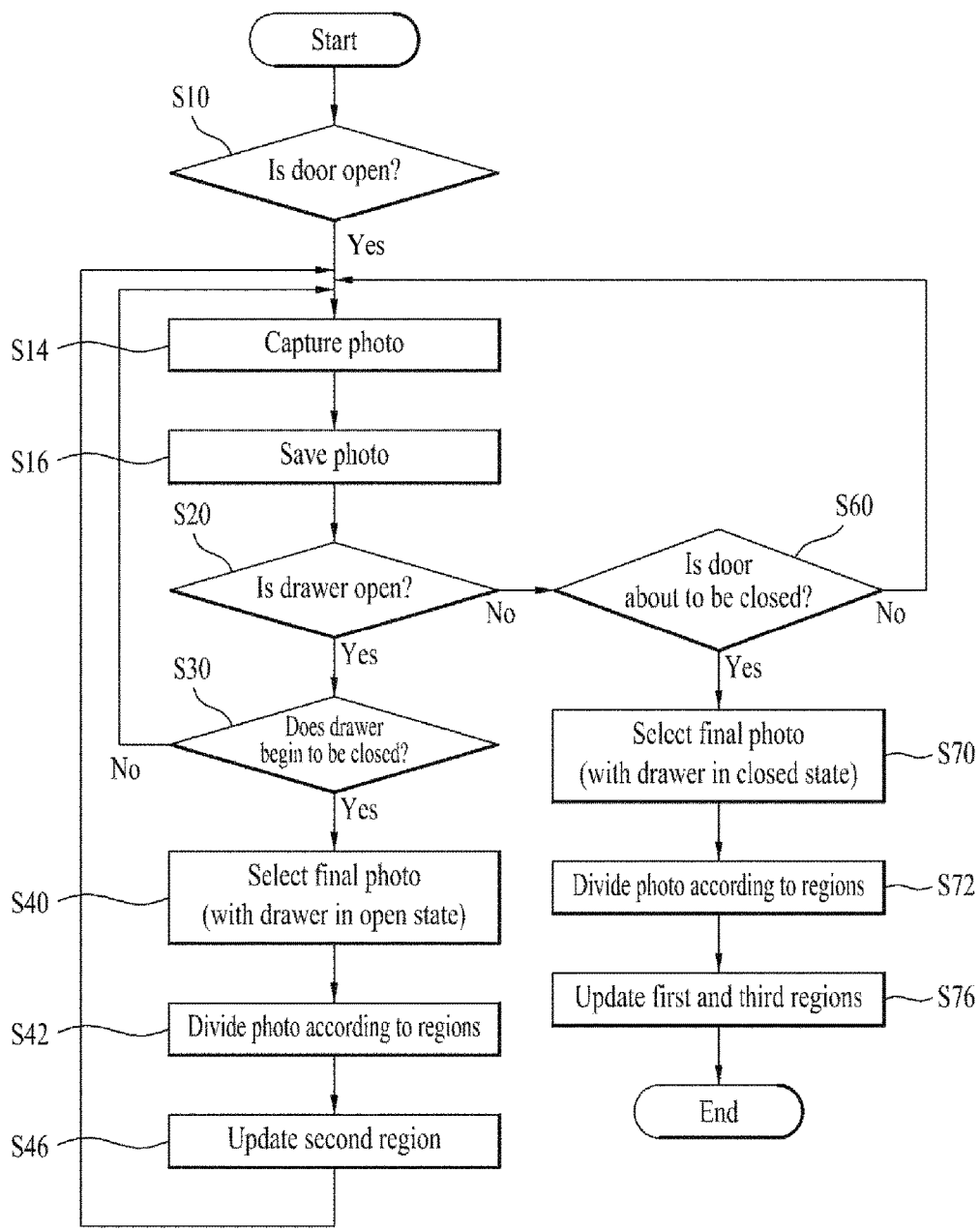

[Fig. 46]
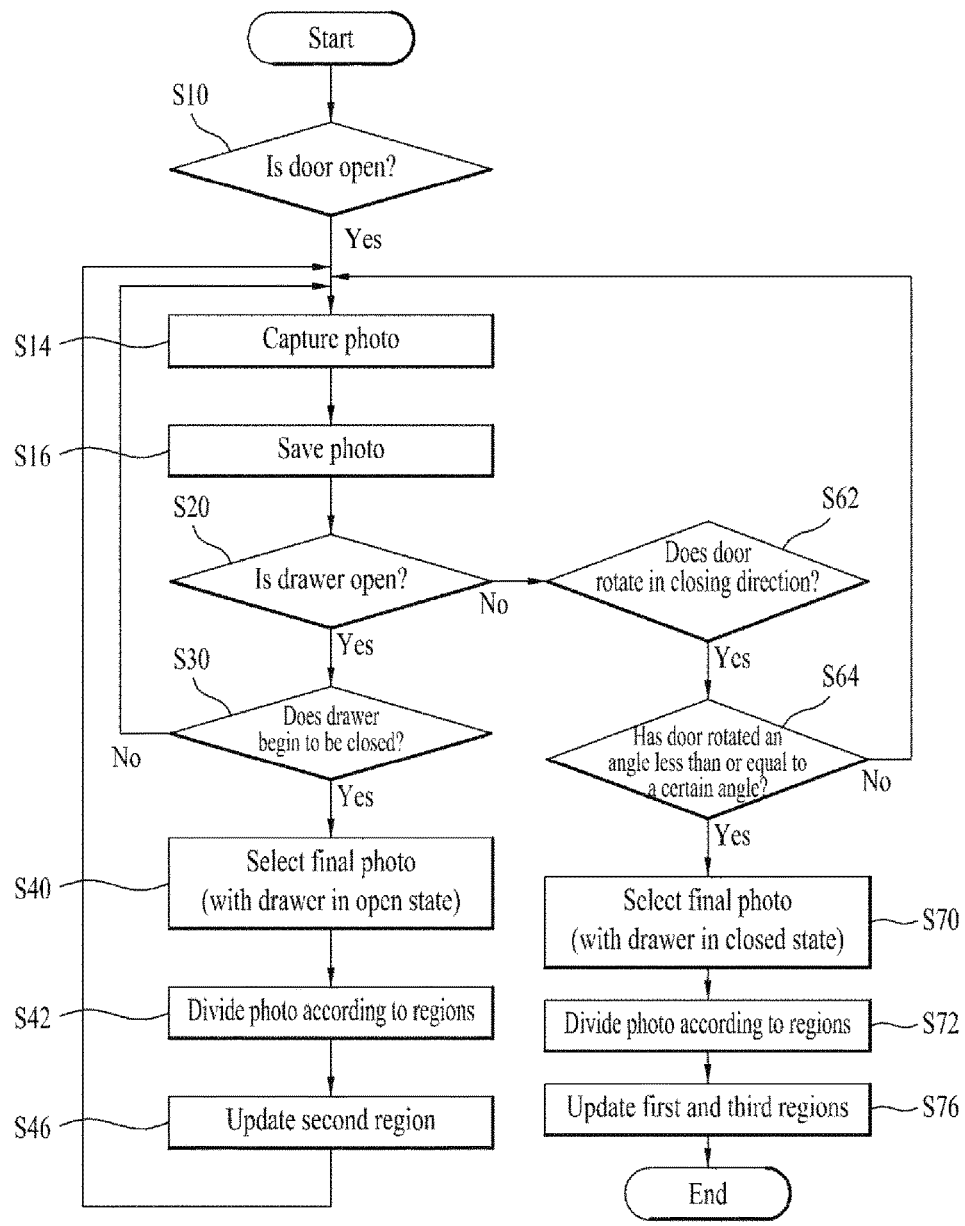

[Fig. 47]
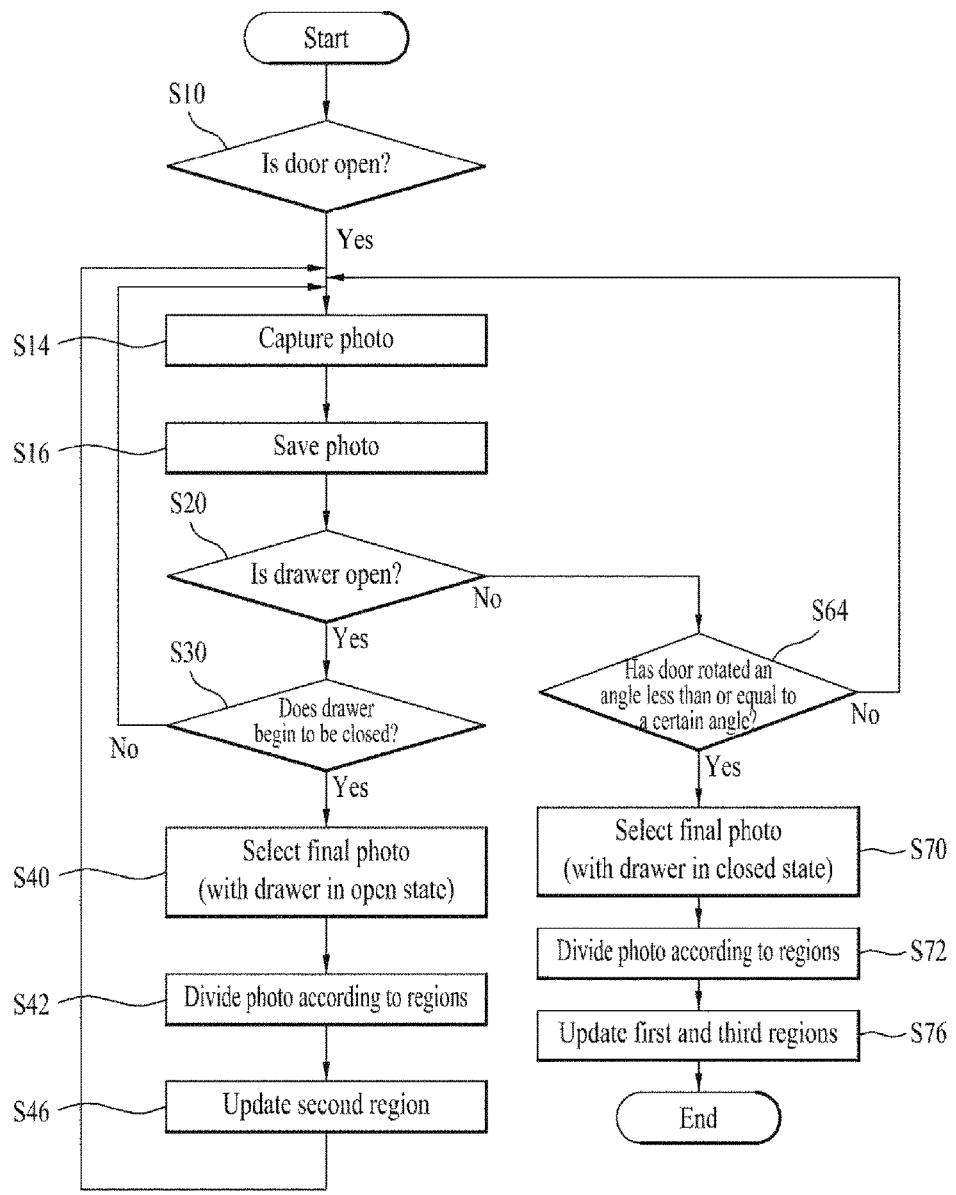

[Fig. 48]
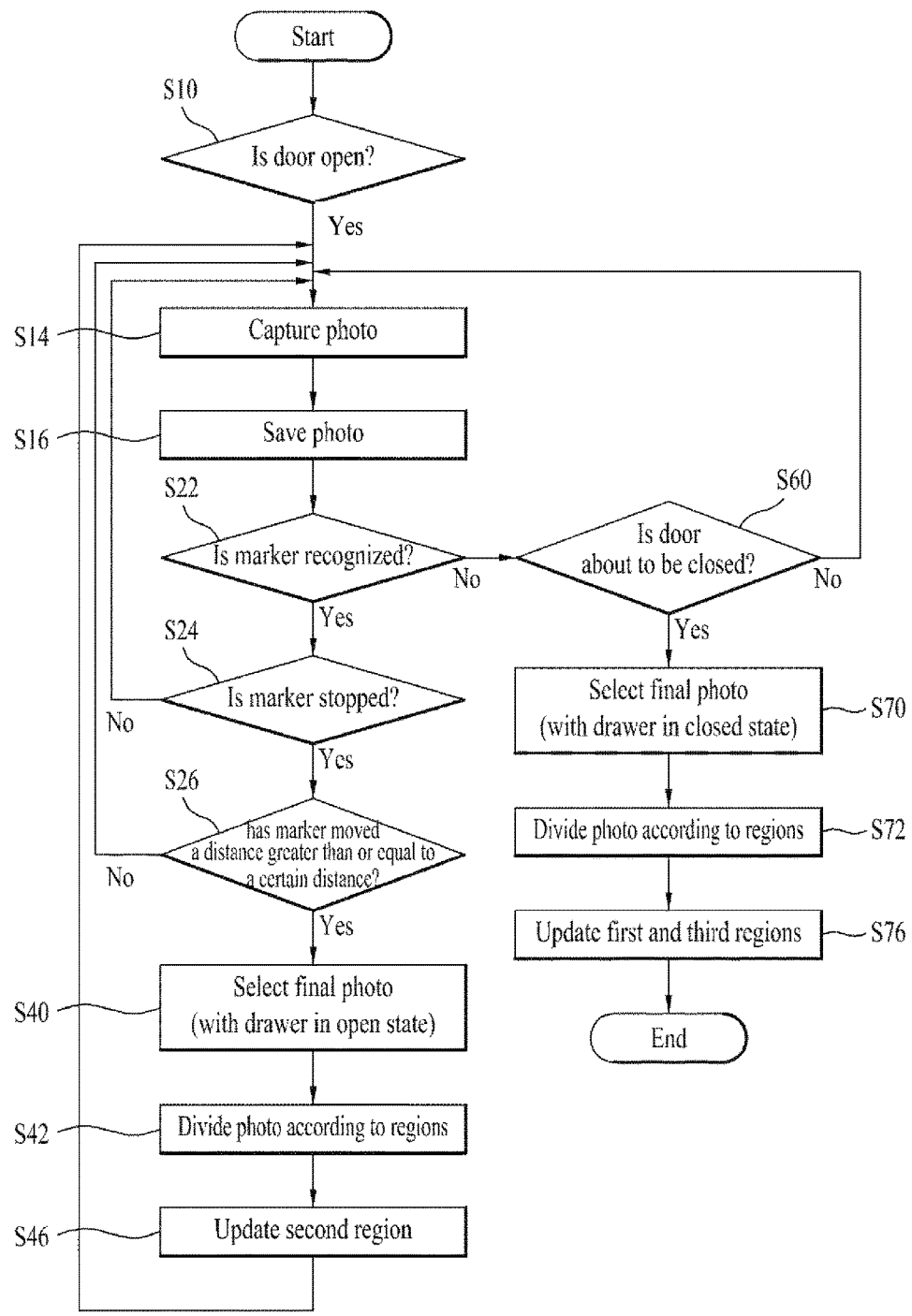

[Fig. 49]
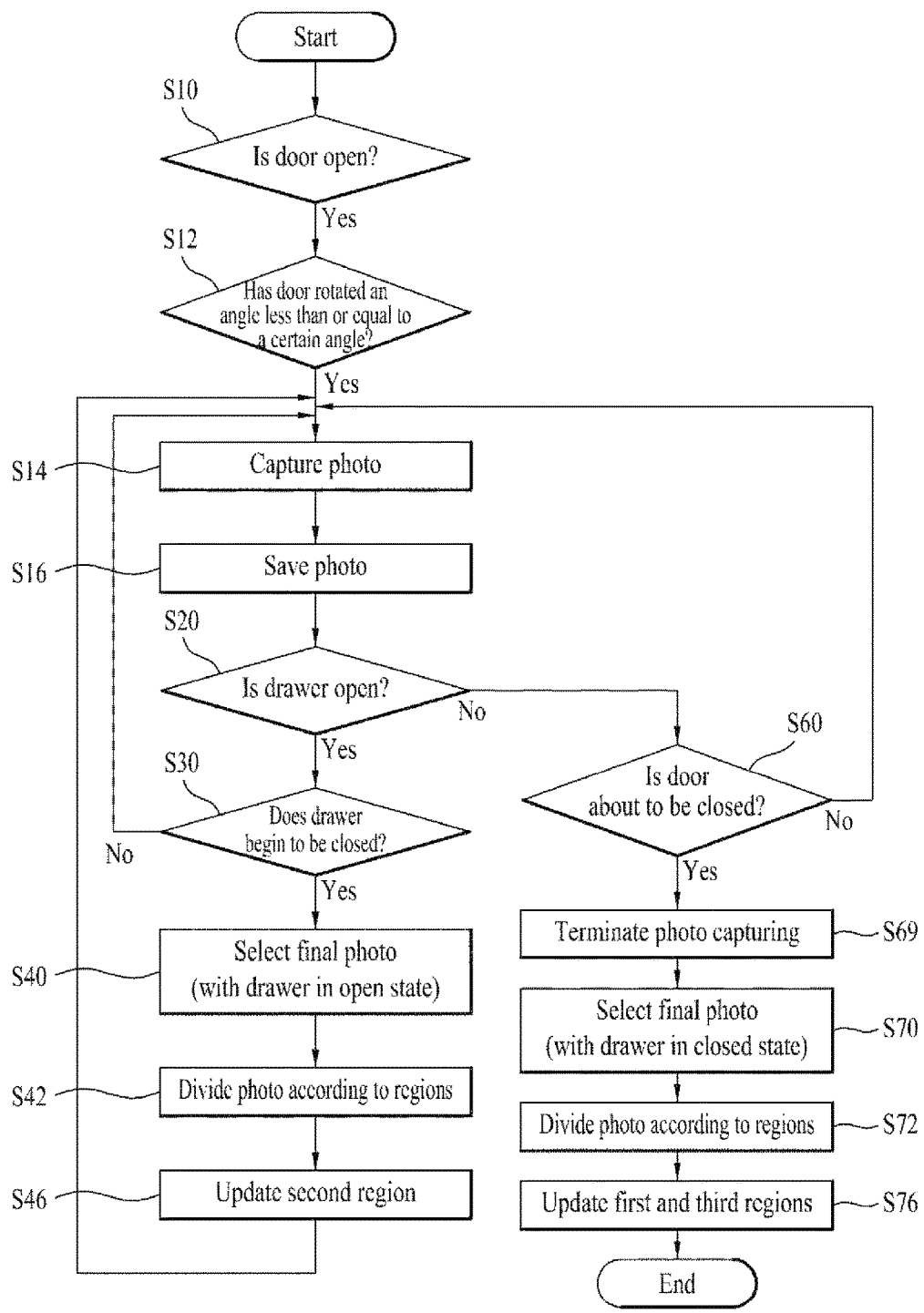

[Fig. 50]
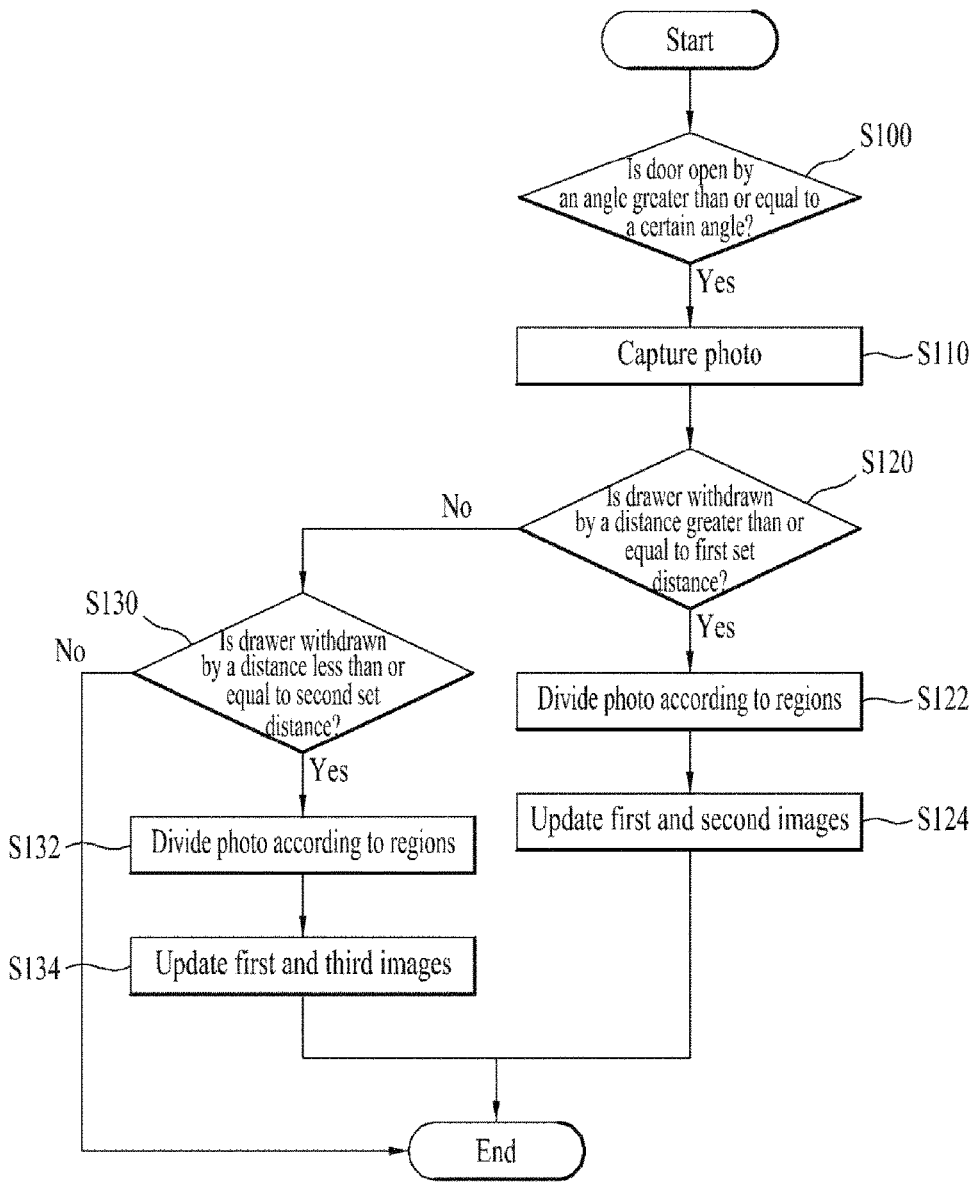

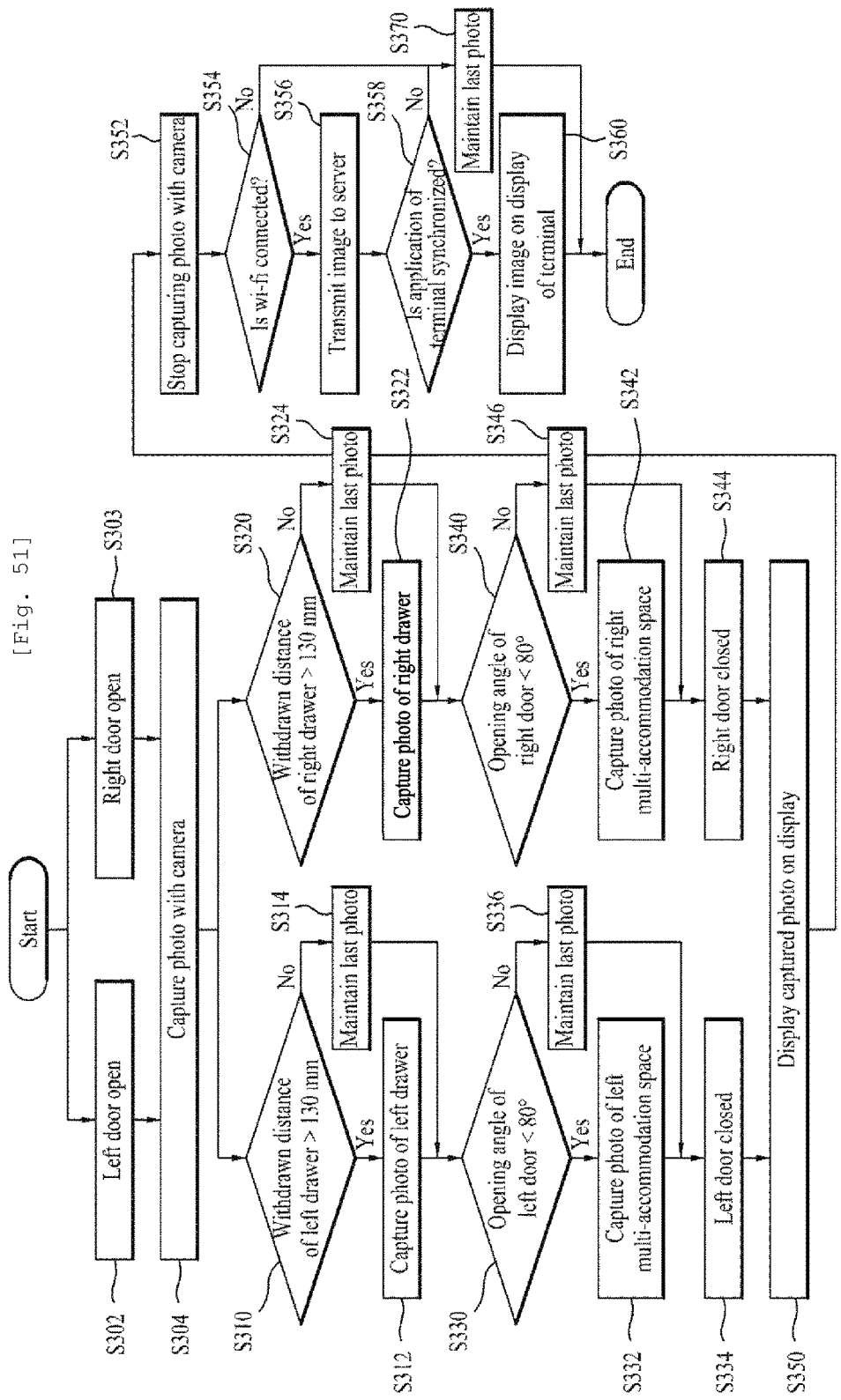
[Fig. 51]

[Fig. 52]
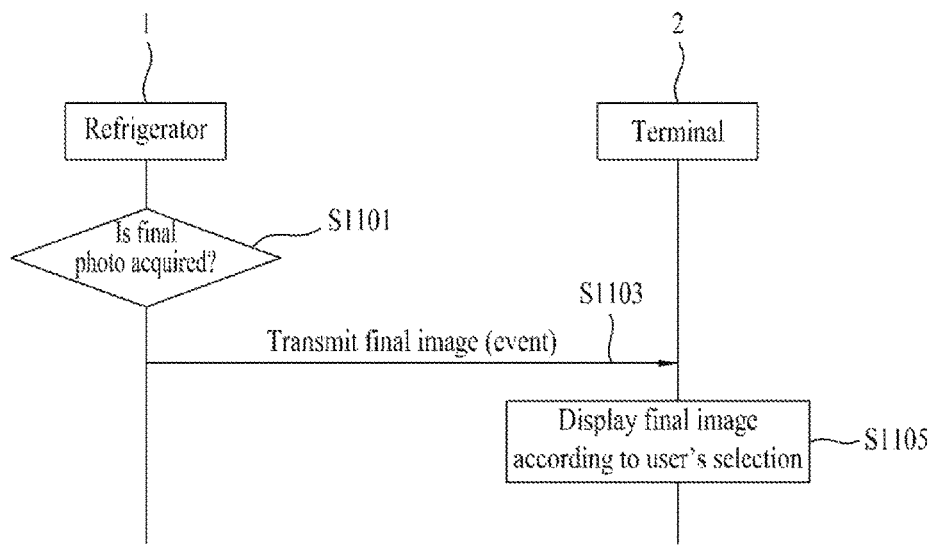

[Fig. 53]
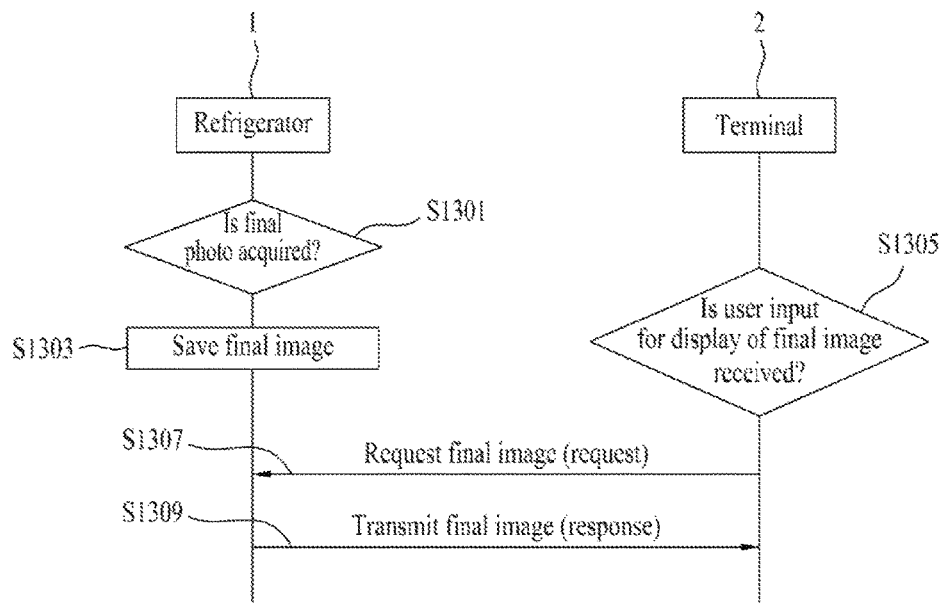

[Fig. 54]
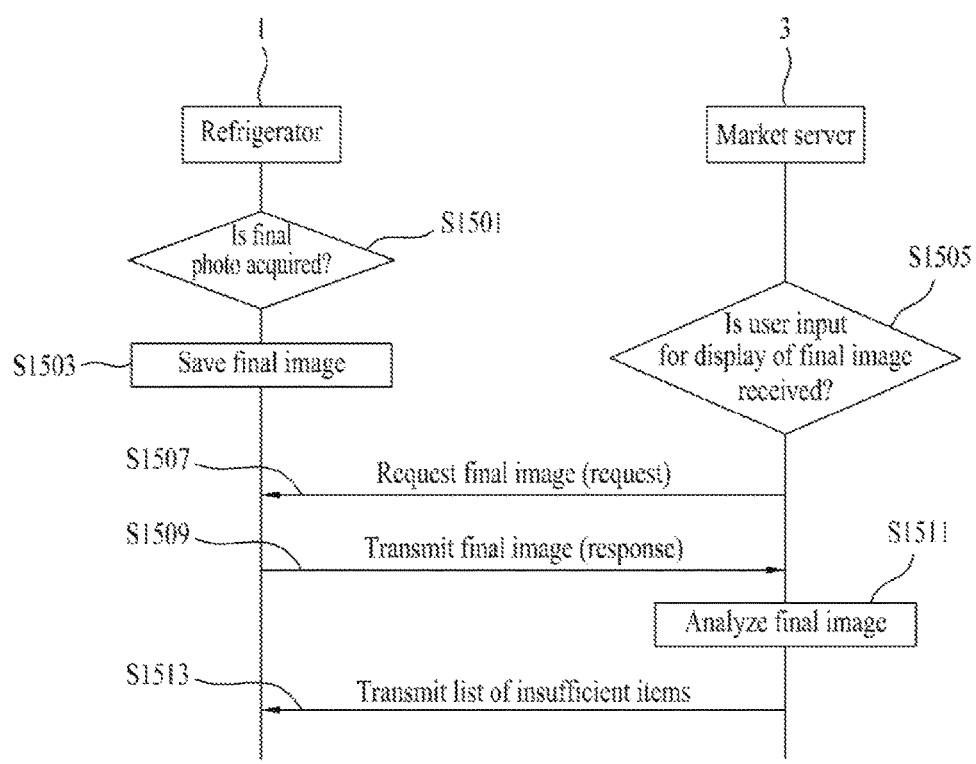

[Fig. 55]
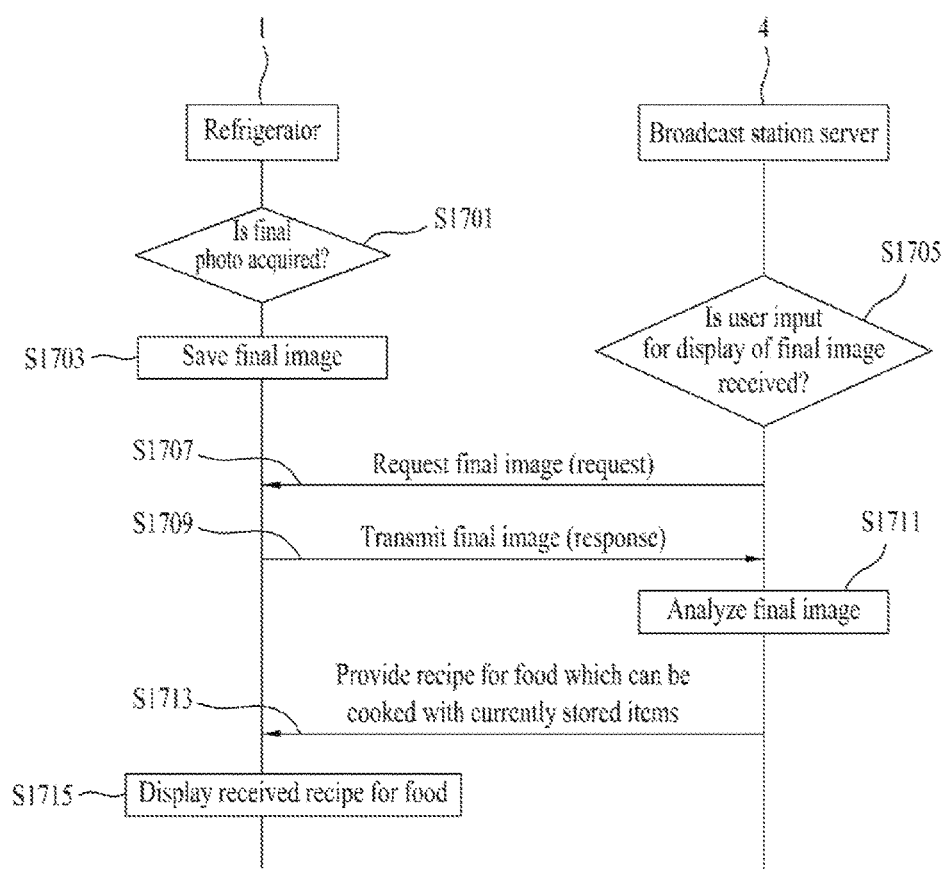

[Fig. 56A]
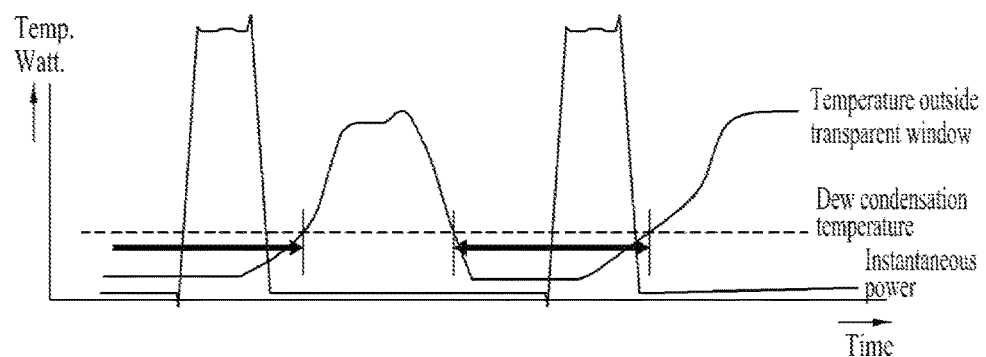
[Fig. 56B]
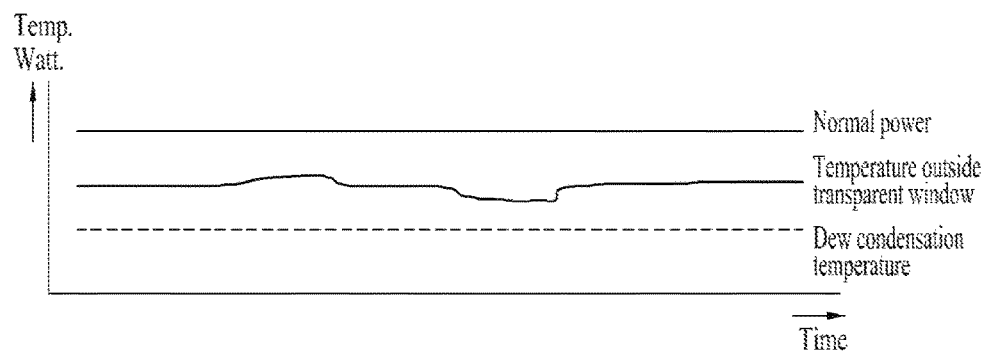

[Fig. 57A]
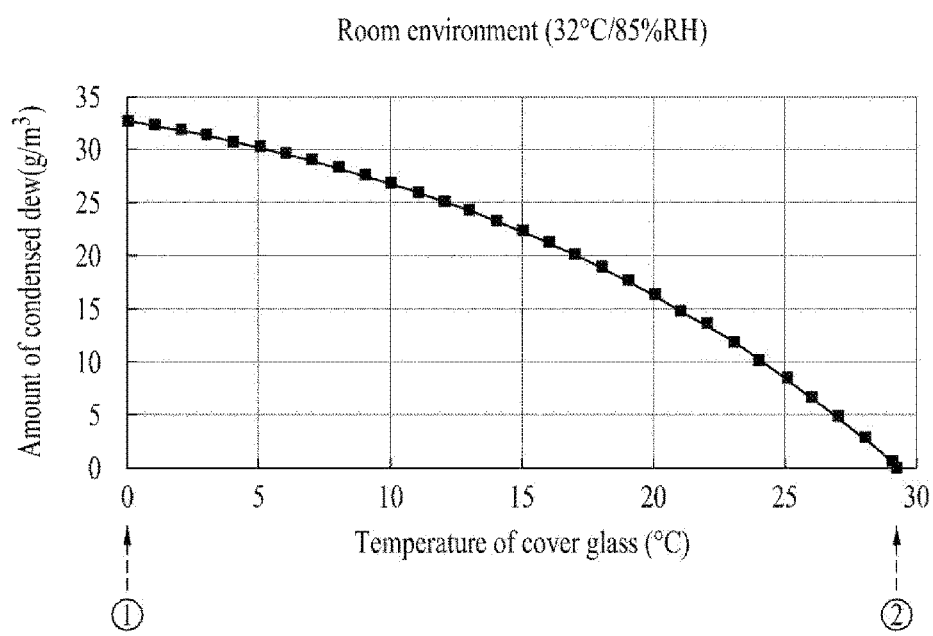
[Fig. 57B]
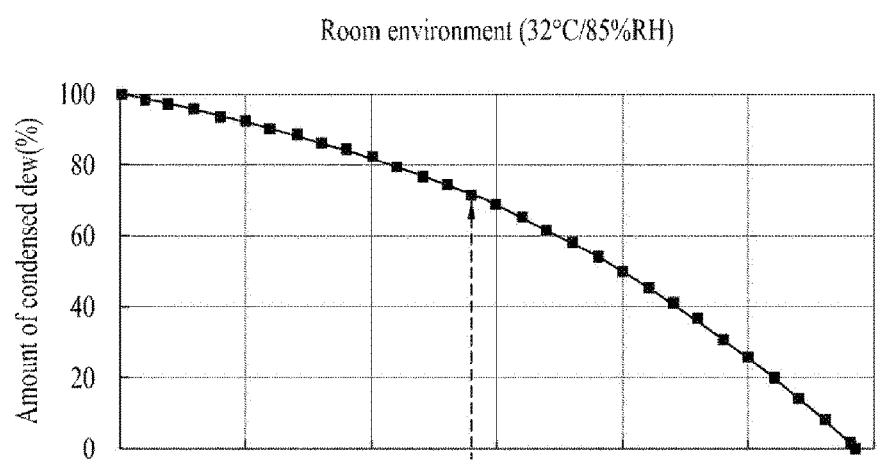

[Fig. 58]
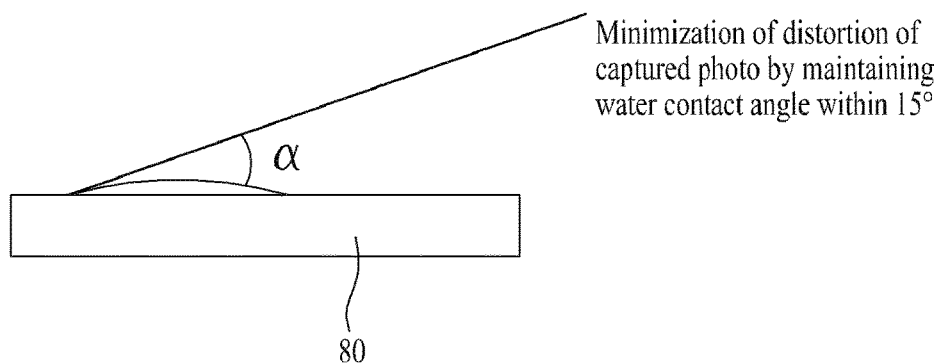

[Fig. 59A]
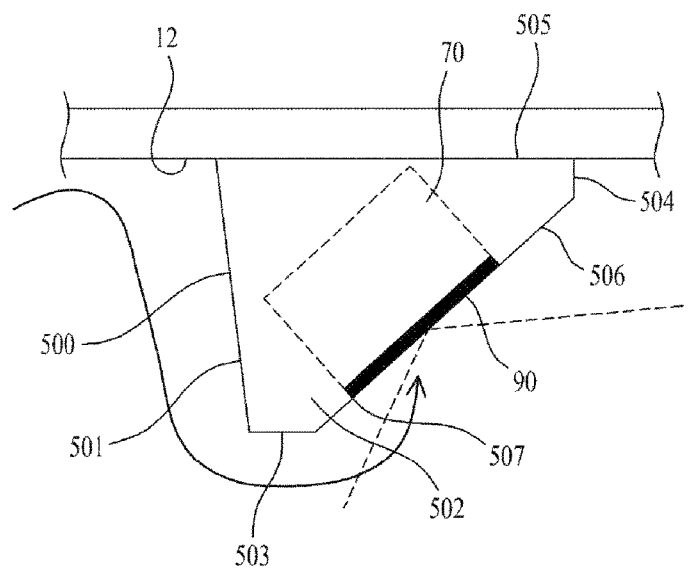
[Fig. 59B]
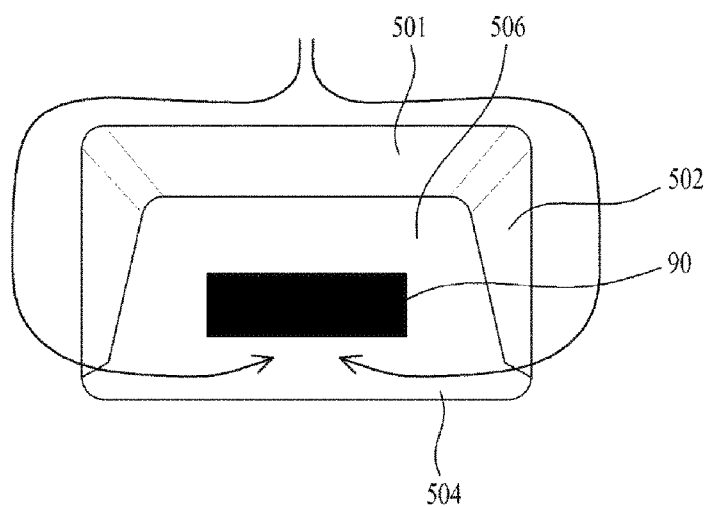

[Fig. 60A]
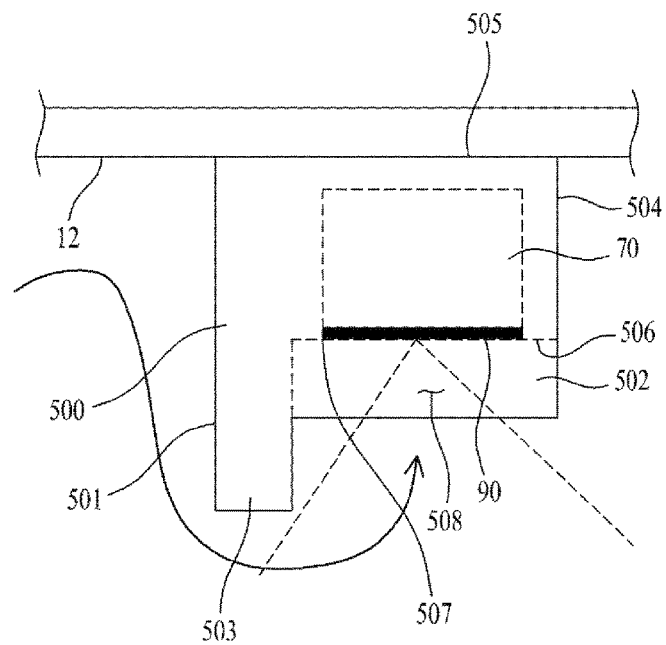
[Fig. 60B]
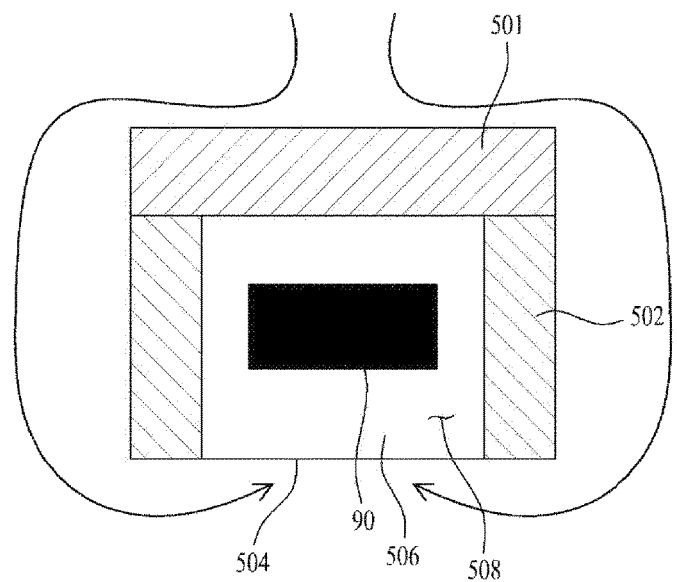

[Fig. 61]
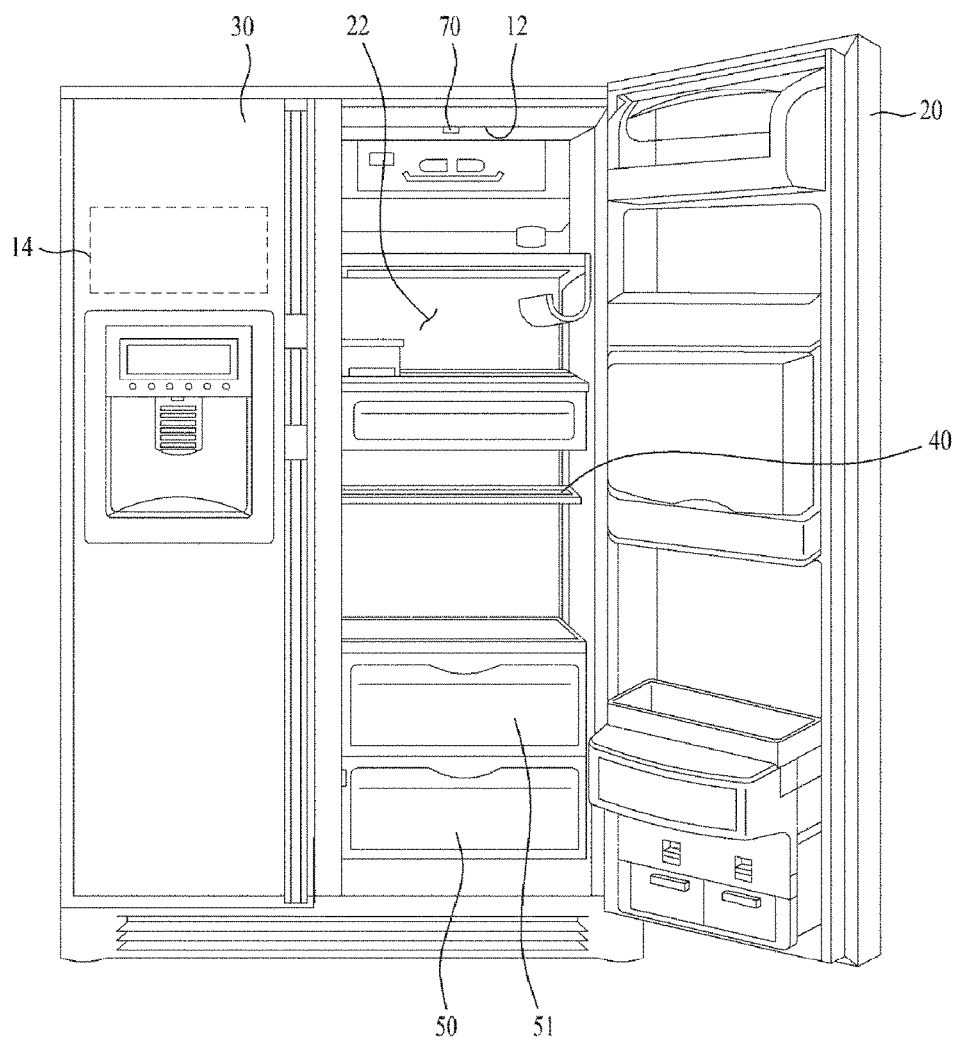

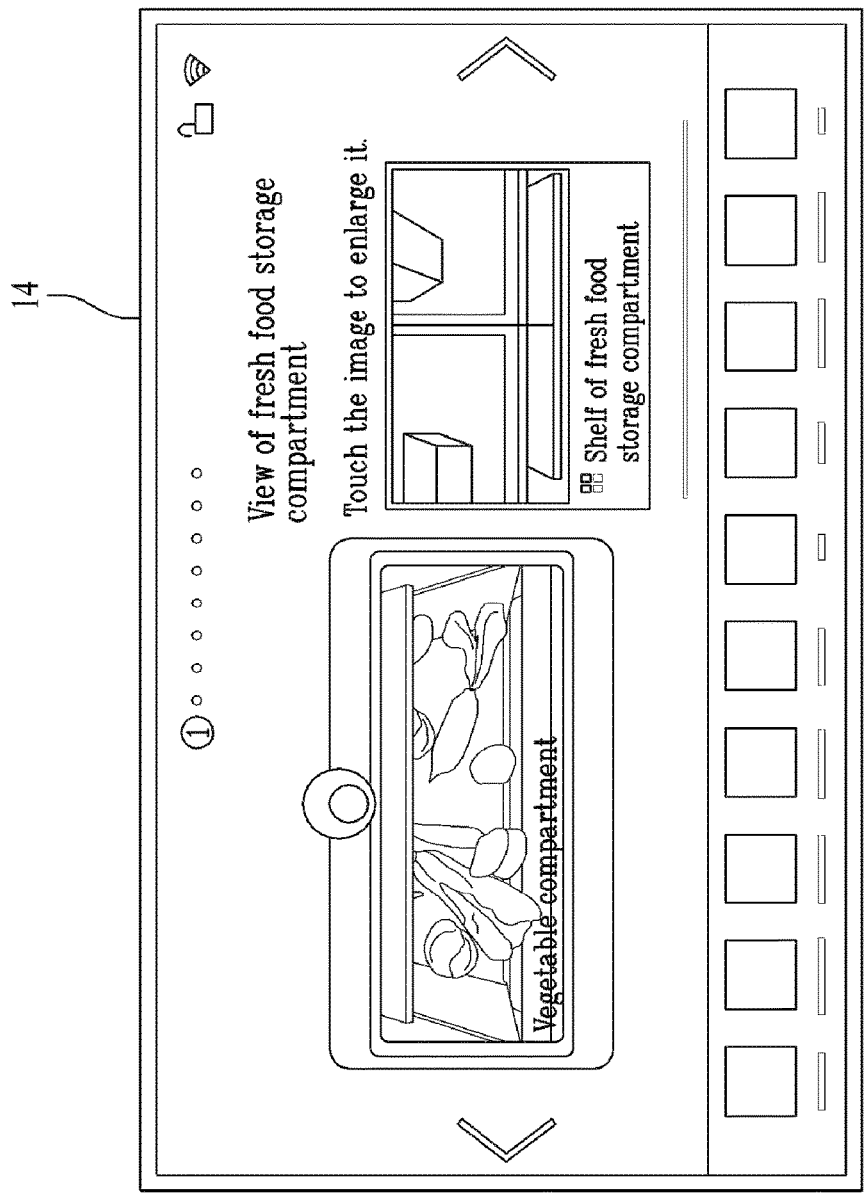
[Fig. 62]

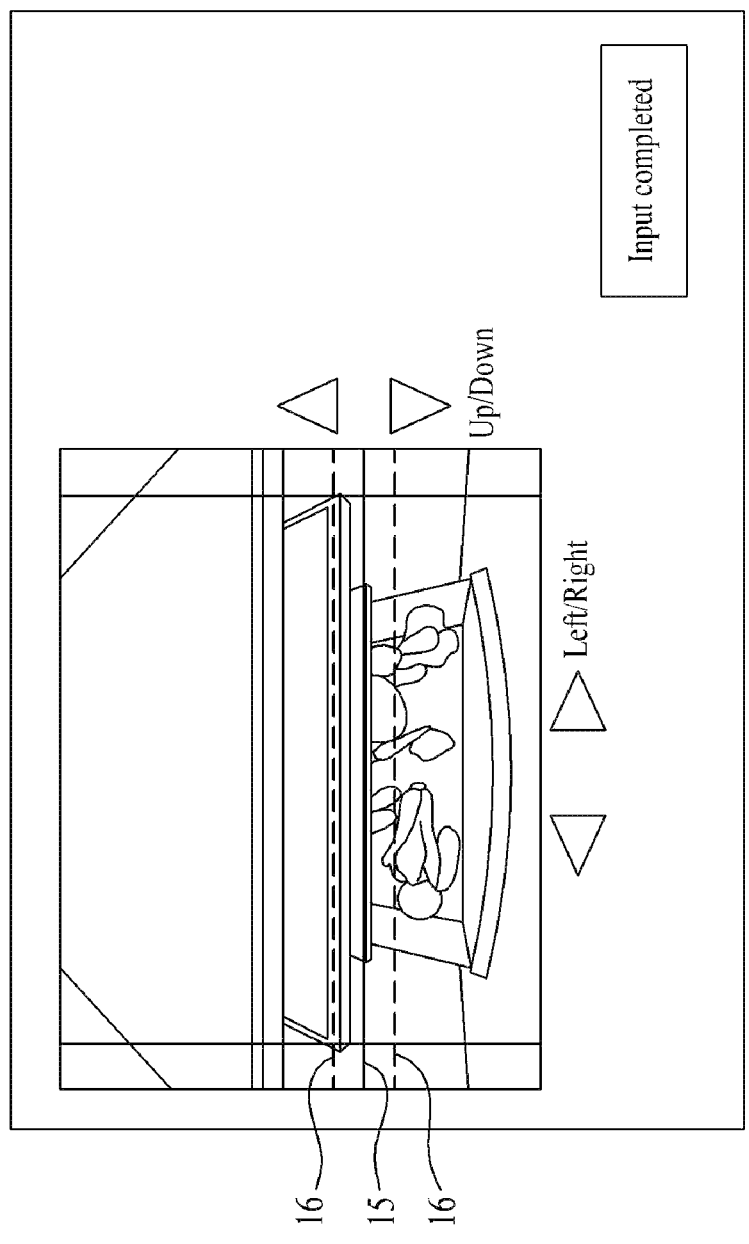

REFRIGERATOR WITH CAMERA AND CONTROL METHOD FOR THE SAME

CROSS-REFERENCE TO RELATED APPLICATION

Pursuant to 35 U.S.C. § 119(a), this application is a continuation of U.S. application Ser. No. 14/930,012, filed Nov. 2, 2015, which is a continuation of U.S. application Ser. No. 14/786,719, filed Oct. 23, 2015, now published, which claims the benefit of an earlier filing date and right of priority to International Application No. PCT/KR2014/003523 filed on Apr. 22, 2014, which claims the benefit of foreign priority application(s) filed in Korea as Serial No. 10-2013-0044528 on Apr. 23, 2013, Serial No. 10-2013-0124739 on Oct. 18, 2013, Serial Nos. 10-2014-0045066, 10-2014-0045067 and 10-2014-0045068 on Apr. 15, 2014, the contents of which are incorporated by reference herein in their entirety.

TECHNICAL FIELD

The present invention relates to a refrigerator and a control method for the same, and, more particularly, to a refrigerator capable of providing information about food stored in the refrigerator even without the door of the refrigerator being opened by a user and a control method for the same.

BACKGROUND

In general, a refrigerator, which is an apparatus for supplying cooled air according to driving of a refrigeration cycle, serves to store food at a low temperature. Conventional refrigerators have only functioned to store food at a low temperature. Recently, however, additional functions other than the function of storing food have been increasingly needed. To check the interior of a refrigerator serving to receive and store certain items, the door of the refrigerator need to be opened. In addition, in the case that the quantity and kinds of food stored in the refrigerator are not identified when a user desires to buy an item in a market or a mart, a food item may be redundantly purchased, or a necessary food item may not be purchased.

In conventional art, Japanese Patent No. 3450907 and Japanese Patent Application Publication No. 2004-183987 disclose that a camera is installed at a door to photograph the interior of the refrigerator. In addition, Japanese Patent Application Publication No. 2001-294308 discloses that cameras are installed in the refrigerator, in a drawer, and at the door.

However, according to the aforementioned conventional documents, the range of photographing of the camera installed in the refrigerator is limited. Thereby, a plurality of cameras needs to be used to photograph various storage regions.

Accordingly, it is needed to improve the photographing efficiency of a camera by reducing the number of cameras installed in the refrigerator and increasing the range of a region photographed by the camera.

In addition, according to conventional art, there have been various problems in acquiring a photo of the interior of the drawer. For example, a specific method of acquiring a picture captured at a desired time, concern about dew condensation occurring on the camera, and improvement of power consumption of the camera have not been specifically addressed.

More specifically, the conventional art have been lacked concreteness of providing optimum information for the user in consideration of uniqueness and positional relationship of a plurality of storage regions in the case the storage regions including a drawer are present in the refrigerator.

SUMMARY

The present invention is basically devised to solve the aforementioned problem.

An object of the present invention devised to solve the problem lies on a storage compartment display device of a refrigerator configured to provide information about food stored in the refrigerator without the door of the refrigerator being opened by a user and a control method for the same.

Another object of the present invention devised to solve the problem lies on a refrigerator allowing the user to intuitively recognize information about food stored in a plurality of storage regions in a storage compartment and a control method for the same.

Another object of the present invention devised to solve the problem lies on a refrigerator allowing the user to intuitively recognize the positional relationship between plural storage regions and capable of providing information about food stored to substantially coincide with the user's point of view and a control method for the same.

Another object of the present invention devised to solve the problem lies on a refrigerator capable of operatively connecting the time to drive a camera the time to perform photographing operation with opening of the door and/or a rotation angle of the door to reduce power consumption of the camera and acquire information about the stored food through the camera at the optimum time, and a control method for the same.

Another object of the present invention devised to solve the problem lies on a refrigerator capable of preventing a picture quality from being degraded due to dew condensation.

Another object of the present invention devised to solve the problem lies on a refrigerator capable of providing the user with the latest information about food stored in the refrigerator and a control method for the same.

Another object of the present invention devised to solve the problem lies on a refrigerator allowing a manager or user to correct regions of a picture displayed for the user to provide the user with the information about stored food in an optimum state and a control method for the same.

Another object of the present invention devised to solve the problem lies on a refrigerator capable of provide the user with optimum information about stored food by fixing a camera to a cabinet to prevent the camera from being shaken and a control method for the same.

Another object of the present invention devised to solve the problem lies on a refrigerator capable of simplifying the configuration by identifying information about the state of a drawer through software and effectively identifying and providing information about food stored in the drawer and a control method for the same.

Another object of the present invention devised to solve the problem lies on a refrigerator capable of providing the latest information about stored food in each of the plural storage regions including a drawer by continuously performing the photographing operation through one camera and a control method for the same.

Another object of the present invention devised to solve the problem lies on a refrigerator capable of providing, using one camera, information about food stored in the inner space of the drawer and another storage region at least partially overlapping the inner space of the drawer in a vertical direction or in the inner space of the drawer and the inner space of another drawer at least partially overlapping the inner space of the drawer in a vertical direction and a control method for the same.

Another object of the present invention devised to solve the problem lies on a refrigerator and a control method for the same which may prevent the quality of pictures captured through a camera from being degraded due to dew condensation.

Another object of the present invention devised to solve the problem lies on a refrigerator capable of reducing necessary expenses for the refrigerator by limiting the number of cameras installed in the refrigerator to one.

Another object of the present invention devised to solve the problem lies on a refrigerator capable of effectively prevent power consumption from increasing due to the camera and a control method for the same.

A further object of the present invention devised to solve the problem lies on a refrigerator capable of minimizing load to a controller and a memory unit and effectively processing continuously captured pictures.

Solution to Problem

The object of the present invention can be achieved by providing a refrigerator including a storage compartment formed in a cabinet of the refrigerator by a fixed insulation wall, the storage compartment being provided with an access opening, a door rotatably provided to the cabinet to open and close the access opening, a drawer provided in the storage compartment, a camera fixed to a ceiling of the storage compartment to photograph both a region (a first region) for storing of food arranged in an external space of the drawer in the storage compartment and a region (a second region) for storing of food arranged in an internal space of the drawer in the storage compartment, and a controller to separate, through a capturing time of a picture containing both the first region and the second region, a portion for the first region (a first region picture) and a portion for the second region (a second region picture) from the picture to individually divide and store the first region picture and the second region picture.

In another aspect of the present invention, provided herein is a refrigerator including a storage compartment formed in a cabinet of the refrigerator by a fixed insulation wall, the storage compartment being provided with an access opening, a door rotatably provided to the cabinet to open and close the access opening, at least one drawer provided in the storage compartment, a camera fixed to a ceiling of the storage compartment to photograph both a region (a first region) for storing of food arranged in an external space of the drawer in the storage compartment and a region (a second region) for storing of food arranged in an internal space of the drawer in the storage compartment, a controller to separate, through a capturing time of a picture containing both the first region and the second region, a portion for the first region (a first region picture) and a portion for the second region (a second region picture) from the picture to individually divide and store the first region picture and the second region picture, and a display to display the first region picture and the second region picture such that the first region picture and the second region are divided from each other.

In another aspect of the present invention, provided herein is a refrigerator including a storage compartment formed in a cabinet of the refrigerator by a fixed insulation wall, the storage compartment being provided with an access opening, a door rotatably provided to the cabinet to open and close the access opening, at least one drawer provided in the storage compartment, a camera fixed to a ceiling of the storage compartment to photograph both a region (a first region) for storing of food arranged in an external space of the drawer in the storage compartment and a region (a second region) for storing of food arranged in an internal space of the drawer in the storage compartment, and a controller to separate a portion for the first region (a first region picture) from a picture taken at a certain time when the door is closed after being opened and separates a portion for the second region (a second region picture) from a picture taken at a certain time when the drawer is introduced after being withdrawn to individually separate, divide, store and update the first region picture and the second region picture.

In another aspect of the present invention, provided herein is a refrigerator including a storage compartment, a drawer movably provided in the storage compartment, the drawer including with a marker, a camera fixedly provided to a ceiling of the storage compartment to photograph the drawer from an outside of the drawer, and a controller to sense a position of the marker in pictures continuously taken through the camera to determine state information about the drawer including at least of a degree of withdrawal of the drawer, whether the drawer is withdrawn, a movement direction of the drawer, and a stopped state or moving state of the drawer.

In another aspect of the present invention, provided herein is a refrigerator including a storage compartment formed in a cabinet of the refrigerator by a fixed insulation wall, the storage compartment being provided with an access opening, a door rotatably provided to the cabinet to open and close the access opening, at least one drawer provided in the storage compartment, at least one shelf provided in the storage compartment, the at least one shelf being positioned at an upper side of the drawer, and a camera fixed to a ceiling of the storage compartment between a front edge of the shelf and the access opening to photograph both a region (a first region) provided in an external upper space to allow the shelf to store food and a region (a second region) provided in an internal space of the drawer to store.

In another aspect of the present invention, provided herein is a refrigerator including a storage compartment configured with an access opening in a front surface thereof and an upper wall, a lower wall, both sidewalls and a rear wall and provided therein with a shelf region divided by a plurality of shelves and a drawer region having at least one drawer, the upper wall, lower wall, sidewalls and rear wall being formed of an insulating material, a cabinet provided therein with the storage compartment, at least one door closely contacting the front surface of the storage compartment to open and close the storage compartment, and a camera device installed at the upper wall of the storage compartment between the access opening of the storage compartment and a front edge of the shelves installed in the refrigerator, wherein the camera device includes a camera module configured to receive a camera lens and electrical components needed to drive a camera and provided with a transparent window spaced a certain distance from the camera lens, and a camera housing part configured to seat and fix the camera module part at a determined position in the camera housing, wherein the camera housing includes a fixing surface adjoining the upper wall of the storage compartment, a front surface formed to face the access opening of the storage compartment, both side surfaces connecting the front surface to a rear surface, and a top surface provided with an opening allowing a camera window of the camera module to be exposed therethrough, wherein the front surface of the camera housing is formed at a lower position than the opening formed in the top surface of the camera housing.

In another aspect of the present invention, provided herein is A refrigerator including one camera to take a picture of an interior of a storage compartment for storing food, a controller to divide one picture taken by the camera into a plurality of images to manage the picture, and a display to independently display the images, wherein the storage compartment includes a first region having food placed on a shelf, a second region defined by an internal space of a drawer introduced into or withdrawn from a lower space of the shelf, and a third region formed on a bottom of a front of the drawer, the third region overlapping the second region when the drawer is withdrawn from the lower space, wherein the one camera photographs the first region, the second region and the third region.

In another aspect of the present invention, provided herein is a control method for a refrigerator including sensing whether a door rotates an angle greater than or equal to a certain angle to open a storage compartment, taking, with one camera, one picture including a first region having food placed on a shelf, a second region defined by an internal space of a drawer introduced into or withdrawn from a lower space of the shelf and a third region formed on a bottom of a front of the drawer to overlap the second region when the drawer is withdrawn from the lower space, dividing the one picture into a first image of the first region, a second image of the second region, and a third image of the third region, individually updating at least one of the first image, second image and third image, and displaying the updated image.

In another aspect of the present invention, provided herein is a control method for a refrigerator provided with a drawer and a camera including recognizing closing of the drawer, acquiring a final image of an interior of the drawer using the camera at a moment the closing the drawer begins, and displaying the final image.

In another aspect of the present invention, provided herein is a refrigerator including a withdrawable drawer, a drawer sensing unit to sense closing or opening of the drawer, a camera to acquire an image of an interior of the drawer, and a controller to control, when the closing of the drawer is recognized, the camera to acquire a final image of the interior of the drawer at the drawer at a moment the closing of the drawer begins.

Advantageous Effects of Invention

According to embodiments of the present invention, a user does not need to open the door of a refrigerator to obtain information about food stored in the refrigerator. Thereby, leakage of cooled air from the storage compartment may be prevented. Accordingly, unnecessary loss of cooled air may be prevented and the energy efficiency of the refrigerator may be improved.

In addition, according to embodiments of the present invention, the latest information about the food stored in the refrigerator may be provided for the user. Therefore, reliability of the information about the stored food provided for the user may be enhanced.

Further, according to embodiments of the present invention, information about food items stored in various positions may be provided by a single camera. Accordingly, a structure allowing installation of only one camera is added, and thus designing of the refrigerator may be facilitated. Particularly, costs incurred by use of a camera may be reduced.

According to embodiments of the present invention, dew condensation on a camera installed in the refrigerator may be prevented. Accordingly, an image captured by the camera may be stably provided for the user.

According to embodiments of the present invention, a user may remotely figure out the current internal situation of the refrigerator and receive necessary information about food from an outside provider.

According to embodiments of the present invention, the refrigerator may provide a screen of a photo of the interior of a drawer captured by a camera which is similar to what the user actually sees when the user uses the refrigerator.

According to embodiments of the present invention, the refrigerator may provide the user with planar images of spatially overlapping and invisible locations on one screen.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a front view illustrating a refrigerator according to one possible implementation;

FIG. 2 is a view illustrating a door of FIG. 1, which is in an opened position;

FIG. 3 is a view illustrating a third region disposed at the bottom of the storage compartment;

FIGS. 4A and 4B are control block diagrams illustrating one implementation;

FIG. 5 is a view illustrating an angle of view of the camera;

FIG. 6 is a transverse cross-sectional view of FIG. 5;

FIG. 7 shows an image captured by the camera with the constituents positioned as shown in FIG. 6

FIG. 8 is a view illustrating selection of a position of the camera;

FIG. 9 is a cross-sectional view showing main parts of the refrigerator.

FIG. 10 is a view illustrating operation of the door sensors;

FIG. 11 is a view specifically illustrating a left hinge unit and right hinge unit;

FIGS. 12A to 12C show screens provided to the user;

FIG. 13 is a view illustrating adjustment of a photo captured by the camera;

FIG. 14 is a perspective view showing the camera;

FIG. 15 is a view illustrating main parts of the camera;

FIG. 16 is a cross-sectional view of FIG. 14;

FIG. 17 is a view illustrating disposition of the heater;

FIGS. 18A to 18C are views showing photos captured with the camera mounted to the refrigerator such that the camera is vertically inclined;

FIGS. 19A to 19C are views showing photos captured with the camera mounted to the refrigerator such that the camera is horizontally inclined;

FIG. 20 is a view illustrating a camera housing in an assembled state;

FIG. 21 is a front view showing a first housing;

FIG. 22 is a front view showing a second housing;

FIG. 23 is a front view showing the first housing with the camera installed;

FIG. 24 is a transverse cross-sectional view of FIG. 23;

FIG. 25 is a cross-sectional view illustrating the cameral housing installed at the inner case;

FIG. 26 shows a table comparing power consumption of a camera according to one implementation with a counterpart example;

FIGS. 27A and 27B are views comparing the supplied standby current with the drive current;

FIGS. 28 and 29 are views illustrating the start time of photographing by the camera and continuous photographing by the camera;

FIG. 30 is a view illustrating a drawer sensor according to one implementation;

FIGS. 31A and 31B are views illustrating a method for the drawer sensor of FIG. 30 to sense movement of the drawer;

FIG. 32 is a view showing a marker indicated on the drawer;

FIG. 33A is a view illustrating a photo showing the left and right drawers which are in the withdrawn position;

FIG. 33B is a view illustrating a photo showing the left drawer which is in the introduced position and the right drawer which is in the withdrawn position.

FIG. 34 is a flowchart describing operation of the refrigerator according to one implementation;

FIG. 35 is a flowchart describing a method of recognizing and tracing the marker according to one implementation;

FIGS. 36A and 36B are views illustrating a marker for sensing the time when the drawer is introduced or withdrawn according to one implementation;

FIGS. 37A and 37B are views illustrating the shape of a marker according to one implementation of the present invention;

FIG. 38 is a flowchart illustrating a method of sensing closing of the drawer according to one implementation;

FIG. 39 is a flowchart illustrating an operation of the refrigerator that is performed when termination of closing of the drawer is sensed according to one implementation;

FIG. 40 is a flowchart illustrating a method of controlling an image of a certain region in the refrigerator captured at a certain time according to another implementation;

FIGS. 41A and 41B are views illustrating various forms of the marker;

FIG. 42 is a view illustrating a method of recognizing the position of the marker;

FIGS. 43A to 43C are views illustrating the degree of access opening of the drawer.

FIG. 44 is a view illustrating movement of the marker;

FIG. 45 is a control flowchart according to one implementation;

FIG. 46 is a control flowchart illustrating a variation of the implementation illustrated in FIG. 45;

FIG. 47 is a control flowchart illustrating a variation of the implementation of FIG. 46;

FIG. 48 is a control flowchart illustrating another variation of the implementation of FIG. 45;

FIG. 49 is a view illustrating another variation of the implementation of FIG. 45;

FIG. 50 is a control flowchart illustrating another implementation;

FIG. 51 is a view illustrating a process of updating images with two doors for access opening and closing the storage compartment and two drawers provided.

FIG. 52 is a ladder diagram illustrating a method of operating the refrigerator according to another implementation;

FIG. 53 is a ladder diagram illustrating a method of operating the refrigerator according to another implementation;

FIG. 54 is a ladder diagram illustrating a method of operating the refrigerator according to another implementation;

FIG. 55 is a ladder diagram illustrating a method of operating the refrigerator according to another implementation;

FIGS. 56A and 56B are views illustrating operation of a heater of the camera;

FIGS. 57A and 57B are views illustrating a result of an experiment on dew condensation occurring on a transparent window of the camera according to temperatures;

FIG. 58 is a cross-sectional view illustrating a transparent window;

FIGS. 59A to 60B are views schematically illustrating installation of the camera at the inner case;

FIG. 61 is a view illustrating a refrigerator according to another implementation;

FIG. 62 is a view illustrating a screen provided for the user from the refrigerator of FIG. 61; and FIG. 63 is a view illustrating a method of adjusting a picture captured with a camera of the refrigerator of FIG. 61.

DETAILED DESCRIPTION

Best Mode for Carrying Out the Invention

Reference will now be made in detail to the preferred embodiments of the present invention, examples of which are illustrated in the accompanying drawings.

FIG. 1 is a front view illustrating a refrigerator according to embodiments of the present invention, and FIG. 2 is a view illustrating a door of FIG. 1, which is in an opened position. Hereinafter, a description will be given with reference to FIGS. 1 and 2.

The refrigerator according to embodiments is applicable to a top mount-type refrigerator having a fresh food compartment and freezer compartment horizontally divided with the freezer compartment disposed on the fresh food compartment and a side by side-type refrigerator having the freezer compartment and the fresh food compartment which are vertically divided.

In the embodiments disclosed below, descriptions will be given of a bottom freezertype refrigerator having a freezer compartment and fresh food compartment which are horizontally divided with the freezer compartment disposed under the fresh food compartment.

The body of the refrigerator includes an outer case 10 forming an overall exterior of the refrigerator seen to the user and an inner case 12 forming a storage compartment 22 to store food. A predetermined space may be formed between the outer case 10 and the inner case 12 to form a passage allowing cooled air to circulate therethrough. In addition, an insulation material may fill the space between the outer case 10 and the inner case 12 to maintain the interior of the storage compartment 22 at a low temperature relative to the exterior of the storage compartment 22.

In addition, a refrigeration cycle system configured to circulate a refrigerant to produce cooled air is installed in a machine chamber (not shown) formed in the space between the outer case 10 and the inner case 12. The refrigeration cycle system may be used to maintain the interior of the refrigerator at a low temperature to keep freshness of the food stored in the refrigerator. The refrigeration cycle system includes a compressor configured to compress the refrigerant and an evaporator (not shown) configured to change the refrigerant from the liquid state to the gaseous state such the refrigerant exchanges heat with the exterior.

The refrigerator is provided with doors to open the storage compartment. Herein, the doors may include a freezer compartment door 30 and a fresh food storage compartment door 20. One end of each of the doors is pivotably installed at the body of the refrigerator. A plurality of freezer compartment doors 30 and a plurality of fresh food storage compartment doors 20 may be provided. That is, as shown in FIG. 2, the freezer compartment doors 30 and fresh food storage compartment doors 20 may be installed to be opened forward by rotating about both edges of the refrigerator.

The space between the outer case 10 and the inner case 12 may be filled with a foaming agent to insulate the storage compartment 22.

An insulated space is formed in the storage compartment 22 by the inner case 12 and the door 20. Once the storage compartment 22 is closed by the door 20, an isolated and insulated space may be formed therein. In other words, the storage compartment 22 is isolated from the external environment by the insulation wall of the door 200 and the insulation wall of the cases 10 and 12.

Cooled air supplied from the machine chamber may flow everywhere in the storage compartment 22. Accordingly, the food stored in the storage compartment 22 may be maintained at a low temperature.

The inner case 12 may be provided with a barrier 60 formed at the bottom of the storage compartment 22. The barrier 60 may be installed at the lower end of the storage compartment 22 to divide the storage compartment into the freezer compartment and the fresh food compartment. The barrier 60 may have a predetermined thickness and be formed at the inner case 12. The barrier 60 may extend horizontally.

The storage compartment 22 may include a shelf 40 on which food items are placed. Herein, the storage compartment 22 may include a plurality of shelves 40, and food items may be placed on each of the shelves 40. The shelves 40 may be positioned horizontally to partition the interior of the storage compartment.

A drawer 50 is installed in the storage compartment 22 such that the drawer 50 may be introduced into or withdrawn from the storage compartment 22. Items, for example, food items are accommodated and stored in the drawer 50. It may be possible to dispose two drawers 50 side by side in the storage compartment 22. The user may open the left door of the storage compartment 22 to reach the drawer disposed on the left side. On the other hand, the user may open the right door of the storage compartment 22 to reach the drawer disposed on the right side.

A space to store food may be formed in the barrier 60. Since the barrier 60 is provided on the inner case 12 rather than on the doors, it is held stationary when the doors rotates. This allows the user to stably store or retrieve food.

The interior of the storage compartment 22 may be partitioned into a space positioned over the shelves 40, a space formed by the drawer 50, and a space formed by the barrier 60. Thereby, a plurality of partitioned spaces to store food may be provided.

Herein, cooled air provided to the storage compartment 22 may move to each of the spaces arranged in one storage compartment 22. That is, the partitioned spaces allow the cooled air to move thereinto, and there the spaces have a different meaning than the aforementioned storage compartment.

Specifically, there may be temperature difference between the spaces, but the spaces do not block transfer of heat therebetween, unlike the storage compartment which forms the insulated space.

The cooled air supplied to one storage compartment may not be allowed to freely move to the storage compartment, but it may be allowed to freely move to the partitioned spaces installed in one storage compartment. That is, the cooled air positioned over the shelf 40 is allowed to move into the space formed by the drawer 50.

The refrigerator according to some implementations may also include a camera 70 configured to capture images of the interior of the storage compartment 22. Herein, the camera 70 may be maintained at a fixed position to capture images of the same part.

Specifically, the camera 70 may be installed at the upper wall of the inner case 12 to face downward. Thereby, it may capture images of food items stored in the storage compartment 22. A captured image may have a view of food seen to the user when the user looks down the interior, i.e., the view that the user will see when the user actually uses the refrigerator.

Specifically, the camera 70 may be installed at a position corresponding to the interior of the drawer which is fully open. Thereby, a captured image may provide a figure similar to the view seen by the user when the user looks down the interior of the drawer.

Herein, the storage compartment 22 may include a first region 42 in which food is placed on the shelf 40 and a second region 52 defined as the inner space of the drawer 50. The storage compartment 22 may also include a third region 62 other than the first region 42 and the second region 52. The third region 62 may overlap the second region 52 when the drawer 50 is withdrawn, which will be described in more detail later. The first region 42 and the second region 52 may have different heights in the storage compartment 22. That is, the height of first region 42 may be greater than that of the second region 52.

Images captured by the camera 70 and various kinds of information about the refrigerator may be provided for the user through a display 14 arranged on the front surface of the refrigerator. In addition, the user may control the refrigerator through the display 14.

The cooled air supplied to the storage compartment 22 may move into the first region 42 and the second region 52. The cooled air positioned in one region may move into the other region.

FIG. 3 is a view illustrating the third region disposed at the bottom of the storage compartment. Hereinafter, a description will be given with reference to FIG. 3.

The barrier 60 may be provided with a recessed portion, in which food may be stored. This portion may be defined as the third region 62. The third region 62 is the space formed in the barrier 60.

The third region, a storage space disposed at a position different from the positions of the first region and the second region, may provide the user with another space for food storage.

Food items such as eggs which are frequently used may be stored in the third region 62. To this end, a cover 68 to open the third region 62 may be provided. In this case, the cover 68 is preferably formed of a transparent material to allow the camera 70 positioned at the upper side to capture an image of the food stored in the third region 62 in spite of the cover 68 being positioned between the camera 70 and the food.

The drawer 50 is disposed at the upper side of the barrier 60. Accordingly, with the drawer 50 positioned in the space under the shelf, the user can reach the third region 62.

On the other hand, with the drawer 50 withdrawn from the space under the shelf, the third region 62 is disposed at the upper side of the drawer 50, and thus the user cannot reach the third region 62.

That is, with the drawer 50 withdrawn toward the user, the drawer 50 and the third region 62 overlap each other. When the user looks down at the drawer 50 in this situation, the interior of the drawer 50 may be seen to the user, and the third region 62 may not be seen.

On the other hand, when the drawer 50 is positioned not to be withdrawn toward the user, the drawer 50 and the third region 62 are disposed not to overlap each other. When the user looks down at the third region 62, only the third region 62 may be seen and the interior of the drawer 50 may not be visible to the user.

The first region 42, the second region 52 and the third region 62 may have different heights in the storage compartment 22. That is, the height of the first region 42 may be greater than the second region 52 and the third region 62, and the second region 52 may have a greater height than the third region 62.

The cooled air supplied to the storage compartment 22 may move to the first region 42, the second region 52, and the third region 62. The cooled air positioned in each region may move to another region.

That is, an area whose image is captured by the camera 70 may be a plurality of storage spaces in the storage compartment 22. The camera 70 captures images of the interior of one storage compartment 22, but one image may contain information about a plurality of partitioned storage spaces.

The camera 70 may capture a photo such that plural storage spaces are exposed on the photo. Particularly, it may be possible that different storage spaces are photographed depending upon the capture time.

For example, the camera disposed in a fixed position may selectively photograph the first region and second region or selectively photograph the second region and the third region according to the positional relationship of the door or the drawer and the time at which a picture is taken. A detailed description will be given later.

FIG. 4A is a control block diagram illustrating one implementation. Hereinafter, a description will be given with reference to FIG. 4A.

The illustrated example may include a controller 100 which divides a photo captured by the camera 70 into a plurality of images to manage the photo. The plurality of images may represent portions of the captured photo processed or corrected by the controller 100.

The controller 100 may command the camera 70 to capture a photo and receive the captured photo transmitted from the camera 70.

In addition, the controller 100 may provide some of the divided images to the display 14 to provide the user with the latest information about the food stored in the storage compartment 22. The display 14 maybe installed on the front surface of the refrigerator, or may construct a device separated from the refrigerator. That is, the user may receive an image related to the storage compartment 22 through an external communication terminal such as a cell phone and acquire information.

The controller 100 may divide a photo captured by the camera 70 into a plurality of areas of independent images and provide the same to the display 14. At this time, the photo selected by the controller 100 may include information about the latest status of the storage compartment after the user most recently accessed the storage compartment 22 to retrieve or place food from or in the storage compartment 22.

According to this example, the refrigerator may include a 110 capable of sensing whether the door 20 opens or closes the storage compartment 22. Herein, the door switch 110 may be provided to the outer case 10. Thereby, it may sense the door 20 closing the storage compartment 22 when the door 20 contacts the outer case 10. In addition, the door 20 does not contact the outer case 10, the door 20 may sense the door 20 opening the storage compartment 22.

According to this embodiment, the refrigerator may also include a door sensor 120 to sense an angle of rotation of the door 20. Herein, the door sensor 120 may sense a rotation direction and rotation angle of the door 20. For example, when the door 20 rotates by an angle greater than or equal to a certain value, a change occurs in the door sensor 120. Thereby, the door sensor 120 may sense that the door 20 has rotated an angle greater than or equal to a certain value. In addition, when the door 20 rotates in a specific direction, the door sensor 120 may sense change in pulses generated according to the rotation direction to sense the rotation direction of the door 20. The door sensor 120 may be differently configured than the configuration described above.

The door sensor 120 may also be provided with a light emitting part and a light receiving part. Thereby, the door sensor 120 may determine whether the light radiated from the light emitting part is transferred to the light receiving part to sense the rotation angle of the door 20.

Particularly, the door sensor 120 may be driven only when the door switch 110 determines that the door 20 has opened the storage compartment 22.

Once the door sensor 120 determines that the door 20 has rotated a specific angle, the camera 70 may capture a photo. In this case, the camera 70 does not immediately start to capture a photo at the time the door switch 110 senses opening of the door 20, but captures a photo only when the door sensor 120 reaches the specific angle.

Once the camera 70 stars capturing operation, it may keep capturing photos at predetermined time intervals. When the door sensor 120 determines that the door 20 is opened by a certain angle, the camera 70 may continuously capture photos until a command to stop capturing photos is provided, rather than capturing only one photo.

The controller 100 may include a drawer sensing unit 130 to sense withdrawal or introduction of the drawer 50. Herein, the drawer sensing unit 130 may represent a constituent in the controller 100 which interprets pictures taken by the camera 70. The drawer sensing unit 130 may not only sense movement of the drawer 50, but also the direction of movement of the drawer 50.

Specifically, the drawer sensing unit 130 may be implemented by software. The drawer sensing unit 130 may use captured information in a photo captured by the camera 70 to sense the position of the drawer 50.

The drawer 50 may be provided with an indication called a marker to provide information about whether the drawer 50 has entered a certain section through the taken pictures of the marker, whether the drawer 50 has stopped if the drawer 50 has entered the certain section, and whether the direction of movement of the drawer 50 has changed after stopping. The marker will be more specifically described later.

Since the marker is placed on the drawer, it makes the same movement as the drawer 50. Accordingly, without providing a separate sensor to sense movement of the drawer, various kind of information about movement of the drawer 50 may be acquired using information about the photo captured by the camera 70.

The photo captured by the camera 70 may be stored in the storage unit 18. Herein, the storage unit 18 may be provided to the refrigerator or to a device provided separately from the refrigerator. The storage unit 18 and the display 14 may be disposed together at the refrigerator or at an apparatus different from the refrigerator, a server connected to the refrigerator and a network, or a terminal connected to the refrigerator and a network.

Not all the photos captured by the camera 70 may be stored in the storage unit 18.

For example, in the case that the controller 100 does not issue a command to select a specific photo, an old photo stored in the storage unit 18 may be deleted and a currently captured photo may be stored in the storage unit 18 (First In, First Out). The storage unit 18 may store only a part of the photos captured by the camera 70 to reduce the storage amount.

FIG. 4B is a control block diagram illustrating a variation of the illustrated implementation. Hereinafter, a description will be given with reference to FIG. 4B.

In FIG. 4B illustrating an example different from the example illustrated in FIG. 4A, the drawer sensing unit 130 may sense movement of the drawer 50 without depending on the information acquired from a photo captured by the camera 70.

For example, the drawer sensing unit 130 may be provided with a plurality of Hall sensors. The Hall sensors may be installed on a path of movement of the drawer 50. Thereby, when the drawer 50 moves, changes in the respective Hall sensors may be sensed to determine the position and movement direction of the drawer 50.

By sensing movement of the drawer 50, the drawer sensing unit 130 may estimate the time at which the internal view of the drawer 50 appears in a photo captured by the camera 70 while the photo capture is conducted by the camera 70. That is, the drawer sensing unit 130 may sense the time at which the information about the items stored in the drawer 50 is presented in a photo captured by the camera 70.

By sensing movement of the drawer 50, the drawer sensing unit 130 may sense the time the latest status of the drawer 50 is determined after the drawer 50 is used by the user. That is, the drawer sensing unit 130 may sense the time at which the latest information is included in a photo captured by the camera 70 after the user finishes using the drawer. That is, the time at which introduction or retrieval of an item is terminated or to updating the items is terminated may be indirectly identified.

FIG. 5 is a view illustrating an angle of view of the camera. Hereinafter, a description will be given with reference to FIG. 5.

In FIG. 5, the drawer 50 is withdrawn and thus the camera 70 is allowed to photographs the second region 52. The shelf is omitted for simplicity of illustration.

The camera 70 may be disposed at the upper wall of the inner case 12 such that it is inclined toward the rear wall of the inner case 12.

A photo captured by the camera 70 may have a horizontal angle of view in the direction of width of the storage compartment 22 and a vertical angle of view in the front-to-back direction of the storage compartment 22.

Preferably, the horizontal angle according to the camera 70 is set such that the inner space of the two drawers 50, i.e., the food stored in the second region 52 is visible when the drawers 50 are withdrawn.

In addition, the range of the horizontal angle according to the camera 70 may include at least a portion of both ends of the shelf 40. To acquire information about the food placed at the upper side of the shelf 40, the camera 70 preferably captures a photo of a view including both ends of the shelf 40.

When the angle of view of the camera 70 changes, the range of the interior of the storage compartment seen in the photo also changes.

FIG. 6 is a transverse cross-sectional view of FIG. 5, and FIG. 7 shows an image captured by the camera with the constituents positioned as shown in FIG. 6.

Hereinafter, a description will be given with reference to FIGS. 6 and 7.

The inner case 12 is provided with an opening 14 to allow the user to access the storage compartment 22. The user may place food in the storage compartment 22 or retrieve food from the storage compartment 22 through the opening 14. The door 20 may open and close the opening 14.

The camera 70 may be installed outside of the drawer 50 to capture photos while the drawer 50 is moving or stopping. Thereby, the camera 70 may capture photos of the drawer 50 in the opened position, closed position and moving state. That is, as the camera 70 continuously captures photos, the photos captured by the camera 70 may present views of the drawer 50 at different positions according to the times at which the photos are captured.

In addition, the camera 70 may provide a screen including the latest status of storage and retrieval of items in the storage compartment 22.

Preferably, the camera 70 is installed within a range I between the opening 14 and one end of the shelf 40. In the case that a plurality of shelves 40 are provided, the camera is preferably installed in a region I (see FIG. 8) between one of the front edges of the shelves 40 located at the foremost position and the opening 14. That is, the camera is preferably installed at the ceiling of the storage compartment corresponding to the region. Since the camera 70 needs to capture a photo of the first region and second region 52 or a photo of the first region and third region 62, it cannot move farther toward the rear wall of the inner case 12 than the front edge of the shelf 40.

FIG. 6 shows a vertical angle of view of the camera 70. Preferably, one end of the vertical angle of view is disposed such that even the front end of the drawer 50 may be photographed when the drawer 50 is open. Additionally, the other end (rear edge) of the vertical angle of view is preferably disposed such that even the rear edge of the uppermost shelf can be photographed.

Since the second region 52 formed by the drawer 50 is also included within the range of the vertical angle of view of the camera 70, the camera 70 may allow the user to acquire information about the second region 52.

As shown in FIG. 7, the camera 70 may capture a photo including the first region 42 and the second region 52. At this time, the camera 70 captures a photo of the two drawers 50 which are laterally disposed. Additionally, in the case that a plurality of shelves is provided, the first region 42 and the second region 52 which are divided by the shelves may be photographed together.

The camera 70 may be installed in the storage compartment 22. Thereby, it may capture a photo including information about the interior of the storage compartment 22. Since the camera 70 is installed in the storage compartment 22, it does not move. That is, the camera 70 is fixedly installed in the storage compartment of the body which is generally fixed at all times. Accordingly, the camera 70 is in a stationary state whenever it captures a photo.

A photo captured by the camera 70 may include the first region 42 and second region 52 or the first region 42 and third region 62.

In the case that the camera 70 captures a photo including the first region 42 and the second region 52, the user may acquire information about the food stored at the upper side of the shelf 40 and the food stored in the drawer 50 through the photo.

On the other hand, in case that the camera 70 captures a photo including the first region 42 and the third region 62, the user may acquire information about the food stored at the upper side of the shelf 40 and the food stored in the barrier 60 through the photo.

The camera 70 may capture a photo of the interior of one storage compartment 22 and transmit the captured photo, while the controller 100 may acquire information about the plural storage spaces.

The camera 70 is disposed at the upper side of the first region 42, second region 52 and third region 62 and thus captures a photo while looking down.

FIG. 8 is a view illustrating a selection of a position of the camera. Hereinafter, a description will be given with reference to FIG. 8.

As shown in FIG. 8, it is possible to mount the camera at positions L1, L2, L3 and L4.

Position L1, which is outside the storage compartment 22, is an external space portioned by the outer case 10. In the case that the camera is installed at position L1, the view in front of the camera may be obstructed by the user when the user uses the refrigerator by accessing the storage compartment 22 with the door opened.

In the case that the interior of the storage compartment is photographed by the camera installed outside the refrigerator as disclosed in the aforementioned Japanese patent document, the user may severely interfere with the view of the camera. Particularly, the drawer may be screened from the camera, and thus movement of the drawer cannot be traced. Thereby, it may not be possible to recognize the image of the interior of the drawer and movement of the drawer together, which is intended by one implementation. Additionally, position L1 may mean that the camera is positioned at the door. In this case, the camera moves during photographing since the door is a movable constituent. Accordingly, it may be very difficult to obtain a stable and clear photo.

Position L2, which is in the storage compartment 22, represents the upper wall of the storage compartment 22, i.e., the ceiling. The camera of this example is installed at position L2. With the camera arranged at this position, the front view of the camera is not obstructed by the user. In addition, wires for supply of power to the camera may be conveniently disposed since the upper wall of the storage compartment 22 corresponds to the inner case 12. In addition, since the inner case 12 is a constituent generally fixed at all times, it may be stably mounted to a constituent to which the camera is fixed.

Position L3, which is in the storage compartment 22, represents a sidewall of the storage compartment 22. In this case, the camera is inclinedly installed at one side of the storage compartment 22 to capture a photo of the opposing side of the storage compartment 22. The camera should be installed at a sidewall of the inner case 12 if it is to be disposed in the middle of the entire height of the storage compartment 22 rather than being disposed at the uppermost end of the storage compartment 22.

In the case that the camera is installed at one sidewall, the camera needs to be installed such that the lens thereof faces the opposing sidewall. Accordingly, an image showing an asymmetric view of the interior of the storage compartment 22 may be acquired due to difference between distances to the left side and the right side of the interior.

Position L4, which is in the storage compartment 22, represents one end of the shelf 40. To dispose the camera based on the height of the storage compartment 22, the camera needs to be supported by a specific structure. In this case, the camera may be fixed to one end of the shelf 40.

In this case, the distance between the drawer 50 and the camera is shorter than the distance between the drawer 50 and position L2. Accordingly, a camera having a greater angle of view than when it is disposed at position L2 may need to be used. In addition, an obtained photo may be severely distorted. Further, various problems causing user inconvenience such as installation of a wire connected to the camera on the shelf 40 may be produced. In addition, the shelf 40 is a constituent that is generally movable. Accordingly, when a food item is placed on the shelf, the camera itself may be shaken.

The camera employed in one implementation may be a VGA camera having an angle of view of 120 degrees and providing performance of 20 fps.

FIG. 9 is a cross-sectional view showing main parts of the refrigerator. Hereinafter, a description will be given with reference to FIG. 9.

A basket 21 capable of storing food may be arranged at the inner side of the door 20.

The basket 21 may be installed on a surface of the door 20 facing the storage compartment 22.

In this case, the basket 21 may accidentally appear in a photo captured by the camera 70. Accordingly, in this example, the camera 70 may capture a photo when it is sensed through the door sensor 120 that the door 20 has rotated an angle greater than a certain angle θ. To allow selection of a photo captured at a time point next to a time point at which sensing is implemented through the door sensor 120, information about time points may be transferred from the door sensor 120 to the controller 100.

For example, the certain angle θ may be between 60 degrees and 80 degrees. The angle may change in a wide range. This angle may change according to the capacity of the refrigerator, the size of the door, or a back-and-forth length of the basket 21.

The certain angle θ may be an angle at which the basket 21 does not appear in the photo captured by the camera 70. The certain angle θ may vary depending upon the lateral width and back-and-forth length of the basket 21.

The door switch 110 to sense whether or not the door 20 is opened may be installed at the upper side of the refrigerator. In this case, when the door switch 110 is pressed by the door 20, it may sense that the door 20 closes the storage compartment. When the door switch 110 is not pressed by the door 20, it may sense that the storage compartment is opened.

A left hinge 300 to pivotably install the left door 20 on the refrigerator and a right hinge 320 to pivotably install the right door 20 on the refrigerator may be provided. Each of the left hinge 300 and the right hinge 320 may be divided into a portion provided with to a rotation axle coupled to the door 20 such that the door 20 rotates about the axle, a portion installed at the outer case 10, and a connecting portion to connect the aforementioned two portions. That is, each of the left hinge 300 and the right hinge 320 may be divided into a door coupling portion 300c, 302c, an outer case coupling portion 300a, 320a, and a connecting portion 300b, 320b connecting the door coupling portion to the outer case coupling portion.

A left door sensor 120L to sense rotation of the left door 20 may be installed at the left hinge 300.

A right door sensor 120R to sense rotation of the right door 20 may be installed at the right hinge 320.

Each of the left door sensor 120L and right door sensor 120R may independently sense a rotational angle of a corresponding door.

FIG. 10 is a view illustrating operation of the door sensors. Hereinafter, a description will be given with reference to FIG. 10.

The door sensor 120 may include a light emitting unit 122 to radiate light and a light receiving unit 124 to receive the light radiated from the light emitting unit 122.

The light radiated from the light emitting unit 122 may be reflected on the upper surface of the door 20 and then transferred to the light receiving unit 124. In this case, to ensure stable reflection of light, the upper surface may be formed of a material having a high reflectivity.

In the case that the light radiated from the light emitting unit 122 is transferred to the light receiving unit 124, the door 20 may be sensed as having rotated by an angle less than the angle at which the door sensor 120 is installed. That is, this may mean that the door 20 has rotated by an angle less than the certain angle θ or that the door 20 has not rotated from the position at which the door 20 closed the storage compartment 22.

On the other hand, in the case that the light radiated from the light emitting unit 122 is not transferred to the light receiving unit 124, the door 20 may be sensed as having rotated by an angle greater than the angle at which the door sensor 120 is installed. That is, this may mean that the door 20 has rotated by an angle greater than the certain angle θ and thus the user is allowed to access the storage compartment 22.

To this end, as shown in FIG. 9, the left hinge 300 and the right hinge 320 may be installed from the uppermost surface of the outer case 10 of the body to the lowermost surface of the door 20. Accordingly, when the door 20 rotates about the rotation center 302, 322, a portion (e.g., the stepped portion) of the uppermost door or the top surface of the door may function as a light receiving part. The left door sensor 120L and the right door sensor 120R may be installed at the connecting portions 300b and 320b to function as a light emitting part. Due to the positional relationship between the sensors 120L and 120R and the door, the sensors 120L and 120R may recognize the time at which the door is opened by an angle greater than or equal to the certain angle θ and the time at which the door is closed to reach the certain angle θ.

FIG. 11 is a view specifically illustrating the left hinge unit and right hinge unit. For simplicity of illustration, the other constituents of the refrigerator have not been shown.

Hereinafter, a description will be given with reference to FIG. 11.

The door sensor may be disposed at a position (where the user stands) in front of the front surface of the inner case, i.e., the opening.

A left door sensor 120L to sense rotation of the left door 20 may be installed at the left hinge 300.

A right door sensor 120R to sense rotation of the right door 20 may be installed at the right hinge 320.

The left door sensor or right door sensor may be disposed in an area between the opening and the rotation center of each of the hinge units. That is, the left door sensor or right door sensor may be disposed at the connecting portion 300b, 320b of each hinge The door sensor 120 may be connected to other constituents by a connector c and a wire to receive electricity or to externally transfer a signal. At this time, the door sensor 120 may be connected to the controller 100 to provide acquired signal information.

The left hinge 300 may be provided with a rotation center 302 about which the left door 20 rotates. In this case, the left door sensor 120L may be disposed on the right side of the rotation center 302. The space on the right side of the rotation center 302 is a space where the left door 20, specifically, the top surface of the left door 20 may or may not be positioned under the left door sensor 120L according to the rotational angle of the left door 20. Accordingly, the left door sensor 120L is preferably positioned at the connecting portion 300b of the hinge 300. Thereby, when the size of the door or the size of the basket changes, the certain angle θ may be flexibly varied. That is, the space on the right side of the connecting portion 300b may be easily varied, and accordingly the position of the left door sensor 120L may be easily changed at the connecting portion 300b.

The wire w may be connected to the left door sensor 120L through the rotation center 302. In addition, the wire w may also be connected to the body of the refrigerator through the outer case 10.

The right hinge 320 may be provided with a rotation center 322 about which the right door 20 rotates. In this case, the right door sensor 120R may be disposed on the left side of the rotation center 322. The space on the left side of the rotation center 322 is a space where the right door 20 may or may not be positioned under the right door sensor 120R according to the rotational angle of the right door 20. For the similar reason, the right door sensor 120R is preferably installed at the connecting portion 320b of the hinge 320.

The time sensing is conducted by the door sensor 120 and may be the time at which a photo of each of the regions in the storage compartment 22, specifically, the first region 42 or the third region 62 is captured. That is, the time sensing is conducted by the door sensor 120 and may be the time at which a photo of a storage space outside the drawer 50 is captured.

Meanwhile, since the door sensor 120 radiates and receives light, it emits light downward. The light radiated downward is reflected upward by the doors 20.

The door sensor 120 and the door 20 may be maintained at a short distance from each other to allow the door sensor 120 to receive a sufficient amount of light. At this time, the maximum vertical distance between the door sensor 120 and the door 20 may be 20 mm.

FIGS. 12A to 12C show exemplary screen images provided to the user. Hereinafter, a description will be given with reference to FIGS. 12A to 12C.

In the example of FIG. 12A, the first region 42, second region 52 and third region 62 are all provided to the user. In the example of FIG. 12B, the second region 52 and third region 62 are provided to the user. In the example of FIG. 12C, the first region 42 and second region 52 are provided to the user.

A description will now be given with reference to 12A.

One photo captured by the camera 70 may be divided into a first image showing the first region 42, a second image showing the second region 52, and a third image showing the third region 62. That is, one photo or a plurality of photos may be divided based on the respective regions. Herein, the first image, second image and third image may be images cut from the captured photo according to the range of the respective regions shown in the images.

The divided photos may be independently provided to the user, as shown in FIG. 12A. That is, a photo of each region may be individually provided to the user such that the user easily acquires information about the food stored in each region.

The display 14 may be disposed such that a plurality of storage regions is shown in a frame.

That is, the second image showing the second region 52 is disposed on the upper left side and upper right side in one rectangular frame, and the third image showing the third region 62 is disposed on the lower left side and lower right side in the rectangular frame.

The images of the regions may be disposed in one frame on the display 14 such that the images have the same width. To this end, the controller may cut the captured photo and correct the size of the photo to provide the photo to the display 14. At this time, the corrected image is shown at the position corresponding to the frame.

At least one portion of the images provided to the display may be corrected to have the same width to produce a two dimensional arrangement making the user feel like they are viewing the configuration of the storage compartment seen by the user when the user actually opens the doors of the refrigerator.

The display 14 may provide two overlapping regions through one screen, thereby providing the user with information about food items which are positioned not to be seen at a glance.

Specifically, the second image and the third image show the spaces disposed in an overlapping manner with the drawer withdrawn. Accordingly, the user may not acquire information about the two storage spaces simultaneously with the drawer withdrawn. However, the display 14 may provide the information about the two storage spaces simultaneously.

The controller 100 may update (replace) the respective images individually to provide the user with the information about the kinds of food accommodated in the respective regions.

For example, in the case that a portion corresponding to the second image needs to be upgraded through the photo captured by the camera and a portion corresponding to the third image does not need to be upgraded, the second image alone may be replaced with a new one.

On the other hand, in the case that the portion corresponding to the third image needs to be upgraded through the photo captured by the camera and the portion corresponding to the second image does not need to be upgraded, the third image alone may be replaced with a new one.

The second image and the third image in one frame may be updated independently of the other images.

Of the two second images disposed on the left and right sides, the second image disposed on the left side alone may be updated or the second image disposed on the right side alone may be updated. In this case, each of the third images may be individually updated.

That is, the display 14 may provide a frame allowing a plurality of images to be provided therein to provide information about items stored in the storage compartment, and multiple images may be individually updated independently of the other images. Particularly, since the second image and the third image are from different photos, the controller may determine the regions represented by the photos and update the images.

Herein, the width of the second image may be equal to or substantially similar to the width of the third image. That is, the portions corresponding to the second image and the third image may be corrected by the controller to have the same width and then provided to the display.

In the case that the size of the second image is different from that of the third image, the second image and the third image may be selected from a photo such that the second image and the third image have different numbers of pixels, i.e. different sizes with respect to pixels. Alternatively, the second image and the third image may be selected to have the same number of pixels but may be corrected by the controller to have different sizes when they are presented on the display 14.

The second image and the third image may be vertically disposed to provide a view of a vertical arrangement in one plane. The region shown in the second image is actually disposed on the region shown in the third image. Accordingly, the user may intuitively recognize the images provided through the display and thus easily understand the information provided through the images.

The display 14 may provide the user with a screen with both the first image and third image replaced. Alternatively, it may provide the user with a screen showing the existing first and third images and a replaced second image.

In FIG. 12A, the food storage compartment shelf may represent the first region 42, the vegetable compartment may represent the second region 52, and the multiaccommodation corner may represent the third region 62. Depending upon the user preference and intention of the image provider, the configuration may take various forms.

The screen shown in FIG. 12A may be provided not only to the display 14 installed in the refrigerator, but also to a separate external terminal device other than the refrigerator such as, for example, a smartphone. Accordingly, when the user is away from home, the user may obtain information about the food stored in the refrigerator and use the information in shopping. Accordingly, the user may understand the kinds of food items stored in the refrigerator without opening the door. The screen provided to the user may display one storage compartment which is divided into a plurality of storage regions. Accordingly, the user may easily acquire information about the food items stored in one storage compartment classified based on the positions of the food items in the storage compartment.

The image arranged in the position of the vegetable compartment shows a region vertically extending from the front edge of the drawer 50 to the front edge of the shelf 40 with the drawer 50 withdrawn. The image arranged in the position of the multiaccommodation corner shows a region overlapping the drawer 50 arranged in the introduced position with the door 20 positioned not to obstruct the view. The region at the upper side of the shelf 40 is shown in the area of the aforementioned shelf.

According to one implementation, the screen provided to the user does not show one storage compartment as it is, but shows separated images disposed on divided areas. Therefore, the user may easily acquire information. In other words, rather than using the picture shown in FIG. 7, the respective regions may be separated from one picture and individually and independently used.

A screen having a different configuration than that of the FIG. 12A may be provided as shown in FIG. 12B. In this case, the camera 70 may capture a photo containing the second region 52 and the third region 62. Alternatively, the camera 70 may capture a photo containing the first region 42, second region 52 and third region 62, but may also provide the user with images corresponding to only two of the regions.

Another screen having a different configuration as shown in FIG. 12C may be provided. In this case, the camera 70 may capture a photo containing the first region 42 and the second region 52. Alternatively, the camera 70 may capture a photo containing to the first region 42, second region 52 and third region 62, but may provide the user with images corresponding to only two of the regions.

That is, according to one implementation, a photo containing the three regions may be captured and then only relevant images may be provided for the user. However, it may be possible to provide the user with an image corresponding to at least the internal storage region of the drawer, i.e., the second region and an image corresponding to another region together.

FIG. 13 is a view illustrating adjustment of a photo captured by the camera.

Hereinafter, a description will be given with reference to FIG. 13.

The screen image shown in FIG. 13 may be an example of screens displayed on the display 14. In the case that the display is not provided to the refrigerator, the screen of FIG. 13 may be a screen displayed on a separate display device of an operator when the refrigerator is fabricated. In addition, the screen of FIG. 13 may represent a screen displayed on the user's cell phone.

In the case that the camera 70 is provided, the camera 70 may not be accurately installed at a desired position due to assembly tolerance.

Accordingly, in one implementation, it is possible for the operator or user to change an adjustment line 15 dividing the regions through a photo or image shown by the camera 70.

The adjustment line 15 may include a vertical adjustment line and a horizontal adjustment line. The vertical adjustment line may be disposed at the center and opposite ends of an image. The user may use buttons shown on the screen to vertically move the vertical adjustment line and horizontally move the horizontal adjustment line. Thereby, the user may select a portion of the image cut and provided to the display 14.

Meanwhile, limit lines 16 which limit the range of movement of the adjustment line 15 may also be shown. In this case, the limit lines 16 may be disposed horizontally and spaced a predetermined distance from each other with the vertical adjustment line placed therebetween. In addition, the limit lines 16 may be disposed vertically and spaced a predetermined distance from each other with the horizontal adjustment line placed therebetween Given the limit lines 16, installation of the camera 70 may be determined to be poor and the position where the camera 70 is installed may be adjusted, in the case that a desired image is not acquired even when the adjustment line 15 is moved.

In the case that two drawers are provided in the storage compartment as shown in FIG. 13, the vertical adjustment line may be disposed between the drawers.

In addition, the horizontal adjustment line may be disposed at the front edge of the shelf.

With movement of the horizontal adjustment line and the vertical adjustment line completed, an image showing the left portion of the second region or third region may be configured on the lower left side of the point of intersection between the horizontal adjustment line and the vertical adjustment line. In this case, the image may horizontally cover a particular number of pixels from the horizontal adjustment line and vertically cover a particular number of pixels from the vertical adjustment line.

An image showing the right portion of the second region or third region may be configured on the lower right side of the point of intersection between the horizontal adjustment line and the vertical adjustment line. In this case, the image may horizontally cover a particular number of pixels from the horizontal adjustment line and vertically cover a particular number of pixels from the vertical adjustment line.

The first region may be configured at the upper side of the horizontal adjustment line. In this case, the image may vertically cover a particular number of pixels from the horizontal adjustment line.

By separately displaying the images of the left and right portions of the third region corresponding to the vegetable compartment as shown in FIG. 13, whether a photo corresponding to the drawer has been acquired may be checked.

Once adjustment by the user or operator is completed, the Input Completed button may be clicked to input an indication that the movement of the adjustment line 15 has been completed. Therefore, when the installation error of the camera is small, the positions of the vertical line and/or horizontal line dividing the regions may be adjusted in the taken picture. Thereby, portions representing a specific region may be clearly displayed. When there are plural regions divided vertically or horizontally, a plurality of horizontal adjustment lines of vertical adjustment lines maybe provided.

FIG. 14 is a perspective view showing the camera, FIG. 15 is a view illustrating main parts of the camera, and FIG. 16 is a cross-sectional view of FIG. 14. Hereinafter, a description will be given with reference to FIGS. 14 to 16.

The camera 70 may include a camera module 71 including a camera lens 71a and a body 71b and cases 73 and 74 where the camera module 71 is accommodated.

The camera module 71 may include an image sensor to convert image information transmitted through the camera lens 71a into a digital signal.

The cases may include a first case 73 and a second case 74 coupled to the first case 73 to internally form a predetermined space. The body 71b and the camera lens 71a may be accommodated in between the first case 73 and the second case 74. Coupling between the first case 73 and the second case 74 may be maintained with a separate sealing member placed between the first case 73 and the second case 74 to prevent introduction of moisture or dust into the first case 73 and the second case 74.

Since the body 71b and the camera lens 71a are inserted into the space formed by the first case 73 and the second case 74, they are prevented from contacting the foaming agent filling the space between the inner case 12 and the outer case 10. In addition, the camera module 71 may be protected by being prevented from directly contacting the cooled air accommodated in the storage compartment 22.

The first case 73 may include a transparent window 80 installed at the front edge of the camera lens 71a and a heater 84 providing heat to the transparent window 80.

Preferably, the transparent window 80 may be formed of a transparent material.

The heat provided by the heater 84 may prevent dew condensation on the transparent window 80.

In the case that the heater 84 is installed at the camera lens 71a to prevent dew condensation, the camera lens 71a may be deformed. In this case, possibility of occurrence of aberration and permanent damage resulting from the deformation may increase. Accordingly, in this example, the transparent window 80 is arranged not to directly contact the camera lens 71a.

The transparent window 80 may be formed of any of plastics and glass to acquire images from the camera. However, the thermal conductivity of plastics is low. Accordingly, in the case that plastics are used to form the transparent window 80, power consumption may increase relative to the case in which glass is used to form the camera 70. Therefore, the transparent window 80 is preferably formed of glass to reduce power consumption.

If the thermal conductivity increases, heat supplied from the heater 84 may be easily conducted to portions of the transparent window 80 which do not directly contact the heater 84. For example, if the thermal conductivity decreases. The temperature may be high at a portion of the transparent window 80 adjacent to the heater 84 and be low at a portion far apart from the heater 84. In this case, it may be difficult to prevent dew condensation. Moreover, more thermal energy needs to be supplied by the heater 84, and accordingly energy efficiency may be lowered.

Meanwhile, since the heater 84 makes direct surface-contact with the transparent window 80, heat transfer efficiency may be improved.

The heater 84 may be disposed at the opposite side of the surface of the transparent window 80 exposed to the storage compartment 22. Accordingly, the heat generated by the heater 84 may be prevented from being supplied to the storage compartment 22 without being transmitted through the transparent window 80.

Particularly, the heater 84 may include a hotwire coil to generate heat. The hotwire coil may make surface contact with the transparent window 80.

In addition, the transparent window 80 and the camera lens 71a are preferably spaced a predetermine gap g from each other, in consideration of deformation of the transparent window 80 by heat supplied thereto and assembly tolerance.

In addition, the camera 70 may include a cable 79 to receive electricity which is externally supplied and transmit a signal related to an acquired photo. The cable 79 may electrically connect the camera module 71 to an external constituent.

Meanwhile, the case is provided with a first seating segment 75 capable of fixing the camera 70 to another constituent. The first seating segment 75 may be provided to any one of the first case 73 and the second case 74.

The first seating segment 75 may include a surface having a predetermined area and may be disposed at a desired position and inclined at a desired angle.

The first seating segment 75 may be provided to both sides of the camera 70.

Thereby, both sides of the camera 70 may be fixed by an external constituent.

The second case 74 may be provided with a second seating segment 76 or second seating surface 76 having a predetermined area and formed in a stepped to manner. The second seating segment 76 is provided at a position different from the position of the first seating segment 75 to allow the camera 70 to be stably coupled to another constituent at a specific position at a predetermined angle. Therefore, the camera 70 may be fixed at the predetermined angle at at least three support points by the first seating segments 75 and the second seating segment 76 with respect to other constituents. The supporting structure of the camera 70 will be described in detail later.

A VGA resolution may be applied to the camera 70. The camera 70 may adopt the VGA resolution (640 by 480) of 0.3 mega pixels.

The interface of the camera 70 may be of a USB type and driven using the USB power of 5V and 500 mA.

The value of current supplied to the camera 70 may be 87 mA in the standby mode and 187 mA (for the heater, 67 mA) in the active mode. Power consumption may be in proportion to the supplied current. Operation of the camera 70 may be divided into the standby mode and the active mode, and power may always be supplied to the heater 84 to prevent dew condensation on the surface of the transparent window 80.

When a rated voltage is applied to the camera 70, the camera 70 operates in the standby mode. When the door switch 110 senses that the door 20 is open, the camera 70 is switched from the standby mode to the active mode to take a picture. That is, when power is applied to the refrigerator, the camera may operate in the standby mode. When the door switch 110 senses that the door 20 is open, the camera 70 may be switched to the active mode to take a picture.

FIG. 17 is a view illustrating disposition of the heater. Hereinafter, a description will be given with reference to FIG. 17.

The camera 70 may have a horizontal angle of view of 115° a vertical angle of view of 95°, and a diagonal angle of view of 145°. That is, the camera 70 may be disposed such that the horizontal angle of view may be greater than the vertical angle of view. Through this disposition, a photo providing food information about the storage compartment 22 may be acquired in the case that the length of the storage compartment 22 in the width direction of the storage compartment 22 (the horizontal direction in FIG. 17) is greater than the length of the storage compartment 22 in the front-to-back direction (the vertical direction in FIG. 17).

Meanwhile, the heater 84 may be formed along the outline of the transparent window 80. In this case, the heater 84 may be disposed in a quadrangular shape so as not to be placed within the angles of view of the camera 70.

In the case that the heater 84 has a quadrangular shape, the heat may be supplied to a relatively wide area of the transparent window 80. Accordingly, energy efficiency of the heater 84 may be improved.

Particularly, in the case that a gap g is formed between the camera lens 71a and the transparent window 80 as shown in FIG. 16, the angles of view of the transparent window 80 form a rectangular shape as shown in FIG. 17. In the case that the transparent window 80 and the camera lens 71a contacts without the gap g present therebetween, the heater 84 may be formed in the shape of a square with sides each of which has a length greater than or equal to the diameter of the camera lens 71a since the heater 84 contacts one surface of the transparent window 80.

However, in this example, the gap g is present and the vertical angle of view is different from the horizontal angle of view as described above. Accordingly, the heater 84 is preferably formed in the shape of a rectangle having one side longer than another side.

FIGS. 18A to 18C are views showing photos captured with the camera mounted to the refrigerator such that the camera is vertically inclined, and FIGS. 19A to 19C are views showing photos captured with the camera mounted to the refrigerator such that the camera is horizontally inclined. Hereinafter, a description will be given with reference to FIGS. 18A through 19C.

FIG. 18A shows a photo captured with the camera turned upward by 5 degrees, FIG. 18B show a photo captured with the camera installed at a desired position, and FIG. 18C shows a photo captured with the camera turned downward by 5 degrees. The photos shown in FIGS. 18A to 18C may provide the user with information about the food stored in the storage compartment. However, in the case that the camera is turned by an angle exceeding the angles shown in FIG. 8, desired information may not be provided for the user.

FIG. 19A shows a photo captured with the camera turned leftward by 4 degrees, FIG. 19B show a photo captured with the camera turned leftward by 2 degrees, and FIG. 19C shows a photo captured with the camera installed at a desired position.

Compared to the photos of FIGS. 18A to 18C which are captured with the camera installed to be turned in the vertical direction (back-and-forth direction), the photos captured with the camera which is not installed at a desired horizontal (lateral) angle provided images which are relatively significantly distorted images.

As can be seen from FIGS. 18A through 19C, even a delicate difference in the angle of installation of the camera may result in significant distortion of a captured photo. Therefore, the angle of installation of the camera needs to be controlled such that the produced assembly tolerance is as small as possible. A fine error may be adjusted through the adjustment line described in FIG. 13, and thus optimum pictures may be provided.

FIG. 20 is a view illustrating a camera housing in an assembled state, FIG. 21 is a front view showing a first housing, and FIG. 22 is a front view showing a second housing. FIG. 23 is a front view showing the first housing with the camera installed, FIG. 24 is a transverse cross-sectional view of FIG. 23, and FIG. 25 is a cross-sectional view illustrating the cameral housing installed at the inner case. Hereinafter, a description will be given with reference to FIGS. 20 to 25.

A cameral housing may be provided to install the camera 70 in the inner case 12. That is, a camera housing to receive the camera shown in FIG. 14 and to fix the camera to the ceiling of the storage compartment may be provided.

The camera housing may include a first housing 400 coupled to the lower surface of the ceiling of the inner case 12, a second housing 410 coupled to the upper surface of the ceiling of the inner case 12, and a third housing 420 and fourth housing 430 coupled to the first housing 400. Herein, the first housing 400 may be coupled to the top surface of the ceiling of the storage compartment The third housing 420 may close the front of the camera 70 such that all the parts of the camera 70 except the transparent window 80 are not directly exposed to the door 20. That is, the third housing 420 may function as a cover that covers the front surface of the camera 70. In this case, the third housing 420 and the fourth housing 430 may be constructed with one constituent. The fourth housing 430 may be a deco hosing interposed between the third housing 420 and the first housing.

The camera 70 may be installed at the first housing 400 such that the degree of lateral inclination (horizontal inclination) and back-and-forth inclination (vertically inclination) of the camera 70 are managed.

As shown in FIG. 21, the first housing 400 may be provided with a seating part 402 on which the first seating segment 75 of the camera 70 is seated. Herein, two first seating parts 402 may be provided to allow the left and right first seating segments 75 to be fastened to each of the first seating parts 402.

The first seating segment 75 may be provided to both left and right sides of the camera 70 such that the first seating segment 75 is inclined at a predetermined angle. Thereby, the camera 70 may be disposed to be inclined at a desired angle when it is installed at the inner case 12.

The first seating part 402 may be provided with a hole 404. Thereby, the first seating segment 75 and the first seating parts 402 may be fixed by a screw. The first seating parts 402 are arranged in horizontal direction such that they are disposed at different heights. Thereby, the camera 70 may be stably fixed.

The first housing 400 may be provided with a second seating part 408 allowing the second seating segment 76 of the camera 70 to be seated thereon. Herein, the second seating part 408 may be formed to have a predetermined area. Thereby, it may fix the degree of inclination of the camera 70 while making surface-contact with the second seating segment 76.

That is, the camera 70 may be coupled to the first housing 400 with a plurality of surfaces thereof contacting the first housing 400. Thereby, the camera 70 may function to fix the camera 70 at a position inclined at a desired angle. In other words, it may be fixed to have at least three support points and supported at a predetermined angle with respect to the first housing 400. It may be fixed at a horizontal angle to be parallel with the first housing 400 and the vertical angle may be set to be a predetermined angle.

The first housing 400 may be provided with a fastening hole 406 to be coupled to the second housing 410 by a screw.

As shown in FIG. 22, the second housing 410 is provided with a contact surface 416 capable of making surface-contact with the upper surface of the ceiling of the inner case 12. Herein, the contact surface 416 is distributed over a wide area, generally forming quadrangular shape. Thereby, it may allow the second housing 410 to be stably seated on the upper surface of the ceiling of the inner case 12. Therefore, the contact surface 416 may have a surface parallel with the ceiling of the inner case 12. Thereby, the reference line or plane for the installation angle of the camera may be identical to the ceiling surface of the inner case 12.

The second housing 410 may be provided with an accommodation space 412 to accommodate the cable 79 of the camera 70. A through hole 418 may be formed at one side of the accommodation space 412 to allow a wire connected to another constituent of the refrigerator to be exposed to the accommodation space 412. At this time, the wire connected to another constituent of the refrigerator may be connected to the cable 79 in the accommodation space 412. Accordingly, electricity may be supplied to the camera 70 through the cable 79, and a signal for a photo captured by the camera 70 may be transferred to the connected constituent.

The second housing 410 may be provided with a fastening part 414 coupled to the first housing 400. The fastening part 414 may be coupled to the fastening hole 406 by a screw. It is preferable that an assembly tolerance is not produced when the fastening part 414 is coupled to the fastening hole 406. Accordingly, the fastening part 414 may be formed to protrude to a predetermined height to facilitate surface-contact with the fastening hole 406.

As shown in FIGS. 23 and 24, when the camera 70 is installed at the first housing 400, the camera 70 may be disposed to be inclined at a predetermined angle. As shown in FIG. 24, one side surface 400a of the first housing 400 may be formed in the shape of a flat surface to contact the inner case 12. The camera 70 is inclined at a predetermined angle with respect to one surface of the first housing 400. In addition, the one side surface 400a is coupled to the lower surface of the ceiling of the inner case to be parallel with the contact surface 416 of the second housing 410. Therefore, as the camera is coupled to the first housing 400 and the first housing 400 is coupled to the second housing 420, the error of installation angle of the camera 70 with respect to the ceiling surface of the storage compartment may be significantly reduced.

Referring to FIG. 25, the second housing 410 is disposed to be exposed to the space over the inner case 12, i.e., the space between the inner case 12 and the outer case 10 which is filled with a foaming agent. The second housing 410 is disposed outside the storage compartment 22, but is disposed in the space defined by the outer case 10. The position of the second housing 410 may be temporarily fixed by adhesively attaching the second housing 410 to the inner case 12. Thereafter, it may be finally fixed by the foaming agent filling the space between the inner case 12 and the outer case 10.

The first housing 400 and the second housing 410 may be coupled to each other with the inner case 12 placed therebetween. Since the first housing 400 is coupled to the second housing 410 with the second housing 410 fixed at a particular position on the inner case 12, the position of the camera 70 may be fixed.

With the camera 70 inclined at a particular angle with respect to the first housing 400, the third housing 420 and the fourth housing 430 may be coupled to the second housing 410. As described above, the third housing 420 and the fourth housing 430 may be constructed with one constituent, and thus only a constituent functioning as the fourth housing 430 may be coupled to the first housing 400.

The fourth housing 430 may allow only the transparent window 80 of the camera 70 to be exposed to the storage compartment 22 and may not allow the other part of the camera 70 to be exposed. Accordingly, moisture, dust and cooled air present in the storage compartment 22 may be prevented from affecting the camera 70.

The structure of the housing of the camera and the installation direction and position of the housing on the inner case have a purpose of reducing dew condensation on the transparent window 80 in a technical aspect. A relevant detailed description will be given later.

FIG. 26 shows a table comparing power consumption of a camera according to one example with a counterpart example, and FIGS. 27A and 27B are views comparing the supplied standby current with the drive current. FIG. 27A shows currents supplied to a camera of a counterpart example. FIG. 27B shows currents supplied to a camera according to one implementation. Hereinafter, a description will be given with reference to FIGS. 26 through 27B.

In the counterpart example, a standby current of 70 mA is supplied to the camera 70.

At the time the door is opened, 50 mA is additionally supplied, and thus a drive current of 120 mA is supplied to the camera 70. In the counterpart example, if the door is opened twenty five times a day, the camera 70 consumes 253 Wh a month. If the door is opened fifty times a day, the camera 70 consumes 254 Wh a month.

On the other hand, according to one implementation, a standby current of 20 mA is supplied to the camera 70. At the time the door is opened, 100 mA is additionally supplied, and thus a drive current of 120 mA is supplied to the camera 70. If the door is opened twenty five times a day, the camera 70 consumes 74 Wh a month. If the door is opened fifty times a day, the camera 70 consumes 76 Wh a month.

According to the two experimental results, it can be seen that the power consumed by the camera 70 may be reduced by about 70% by reducing the standby current. Accordingly, it has been found that the power consumed by the camera 70 may be significantly reduced by reducing the standby current, on the condition that the same drive current is supplied. When the refrigerator continuously operates around the clock, the time for which the door is opened is relatively short. Thus, if the value of current in the active mode is constant, power consumption may be reduced in reducing the current applied to the camera in the standby mode.

In the case that the standby current is reduced as shown in FIGS. 27A and 27B, the time at which the drive current is supplied to the camera 70 is delayed. This is because difference between the standby current and the drive current increases delay time. In other words, when the standby mode is switched to the active mode, photographing is not immediately performed until a predetermined delay time elapses.

Accordingly, the time at which the camera 70 actually captures a photo is delayed. If the time lag between when a command to capture a photo is transferred to the camera 70 and when the camera 70 captures a photo is long, the photo actually captured by the camera 70 may fail to provide desirable information about food to the user.

In other words, as the standby current decreases, the power consumed by the camera 70 may be reduced, but a delay time taken to increase the current to the drive current for driving of the camera 70 may become long. Accordingly, by calculating the usual time taken to capture a photo at a desired time point, the value of the standby current is preferably selected so as to shorten the delay time below the aforementioned time. For this reason, in this example, the current is preferably increased step by step from the standby current value to the drive current value. That is, sufficient delay time is provided when the current increases the relatively low standby current value to the drive current value. That is, rapid increase of current may be prevented. Thus, power consumption may be reduced and stability of the camera may be secured.

Accordingly, in this example, the camera 70 is controlled to be driven at the time the door 20 is opened. That is, when the door switch determines that the door is opened, the standby mode is switched to the drive mode. However, a valid picture of the pictures taken by the camera are captured after a predetermined time elapsed after the door is to opened. This is because a few seconds may take for the user to update the food items. That is, even if delay time becomes long, a photo may be surely captured at a desired time point. Therefore, when the camera is switched from the standby mode to the drive mode, photographing may be performed by the result of sensing by the door switch. In addition, at the reference time at which a valid picture is selected, photographing may be performed by the result of sensing by the door sensor.

FIG. 28 is a view illustrating the start time of photographing by the camera and continuous photographing by the camera. Hereinafter, a description will be given with reference to FIG. 28.

In this example, the door switch may be provided as shown in FIG. 4.

When the door switch 110 senses that the storage compartment 22 is opened, the controller 100 may command the camera 70 to start to capture a photo. That is, when the storage compartment 22 is opened by movement or rotation of the door 20, the camera 70 may start to capture a photo.

On the other hand, when the door switch 110 senses that the storage compartment 22 is closed, the controller 100 may command the camera 70 to stop capturing a photo. That is, when the storage compartment 22 is closed by movement or rotation of the door 20, the camera 70 may terminate the photographing operation.

As shown in FIG. 28, when electricity is supplied from an external power source to the refrigerator, a standby current is supplied to the camera 70 (S1). At this time, the camera 70 may be driven in the standby mode. In the standby mode, the camera 70 does not capture a photo.

The door switch 110 may sense the opening of the door 20 (S10).

Upon determining that the door 20 opens the storage compartment 22, the camera 70 may start to capture a photo (S14). Particularly, the camera 70 may continuously capture photos at predetermined time intervals.

At this time, a current greater than the current supplied in the standby mode is supplied to the camera 70, and thus the camera 70 may be operated in the drive mode. To supply a current greater than the standby current, i.e. the drive current to drive the camera 70, a predetermined time, i.e. a delay time may be inevitably produced. That is, to increase the magnitude of the current supplied to the camera 70, a certain amount of time is actually needed. When a predetermined time, delay time elapses after the current for implementation of the drive mode is supplied to the camera 70, the camera 70 may capture a photo with the drive current supplied thereto.

Since the camera 70 is switched to the drive mode for photographing from the time the door 20 is opened, there is little risk of capturing a photo earlier and failing to capture a photo at a particular time. This is because photographing time is delayed due to the delay time produced when the standby current is supplied before the desired photographing time and the value of current is increased a the desired time.

In addition, the number of photos captured per second may be reduced. If the camera 70 captures thirty photos per second, it is rarely possible that a change occurs in the storage compartment 22 for 1/30 second, i.e., a time interval at which a photo is captured. The interior of the storage compartment 22 may be changed by an action performed the user, but it is rarely possible that an average person terminates an action for the storage compartment 22 in 1/30 second. That is, a time interval at which a photo is captured by the camera 70 may be relatively extended. Therefore, a camera 70 of a relatively low price may be used, and accordingly, production cost of the refrigerator may be reduced.

The photos captured by the camera 70 may be stored in the storage unit 18 (S16). In addition, in the case that the number of photos captured per second by the camera 70 is reduced, the number of photos stored in the storage unit 18 is also reduced, and thus the storage unit 18 may be managed more efficiently.

Meanwhile, the door sensor 120 may sense whether the door 20 has rotated a particular angle (S18).

In the case that the door sensor 120 does not sense rotation of the door 20, photos stored in the storage unit 18 before a predetermined time may be deleted (S90). That is, photos which are not processed to be provided for the user may be deleted to prevent the amount of stored objects from increasing.

On the other hand, in the case that the door sensor 120 determines that the door 20 has rotated the particular angle, it selects a photo captured at a corresponding time (S92). At this time, the selected picture, which is a valid picture, may be processed by the controller 100 and provided for the user. For example, the photo processed by the controller 100 may be transferred to the display 14.

A certain amount of time is needed for the user to rotate the door 20 to access the storage compartment 22. The delay time elapses for the certain amount of time, and thus a photo may be captured at the time the door 20 has rotated the particular angle.

Accordingly, the controller 100 may select a photo at a desired time.

In the case that the camera 70 is switched, at the time point at which the door sensor 120 senses the rotation, from the standby mode to the active mode to capture a photo, the camera 70 may undesirably capture a photo of the storage compartment only when a delay time elapses after the time point.

Since the camera 70 begins to capture a photo at the time the door 20 is opened, a standby current of a relatively low value may be supplied to the camera 70. In the case that a standby current of a relatively low value is supplied, the delay time taken to supply the drive current may increase, but the camera 70 starts photographing earlier in a control flow. Accordingly, failing to capture a photo at a desired time may be prevented.

FIG. 29 is a view illustrating the start time of photographing by the camera and continuous photographing by the camera. Hereinafter, a description will be given with reference to FIG. 29.

In FIG. 29, a time to select a photo does not depend on rotation of the door 20, unlike the example illustrated in FIG. 28. Rather, the time to select a photo is determined according to the position of the drawer 50. The other details are the same as those of the example of FIG. 28, and thus they will not be discussed again for simplicity of illustration. However, manipulation of the drawer 50 may presume opening of the door 20. The reference time at which a specific picture is selected may be determined by the door sensor. The reference time at which a specific picture of the specific region in the specific picture may be determined according to the determination by the door sensor and the determination by the drawer sensing unit 130. Therefore, in any cases, to determine the reference time for the valid picture, determination by the door sensor is needed.

The user may withdraw the drawer 50 to store food in the drawer 50 or to retrieve stored food from the drawer 50. At this time, the user may withdraw the drawer 50 to a sufficient distance to use the drawer 50.

Upon completing use of the drawer 50, the user may push back the drawer 50. The time at which this event occurs may represent the particular state disclosed in S19.

The camera 70 starts to capture a photo from the time the door switch 110 senses opening of the door 20. Accordingly, when the drawer 50 is put in the particular state, a photo captured at the corresponding time may be selected and provided for the user (S92).

When the door 20 is opened, the camera 70 captures a photo, and movement of the drawer 50 may be sensed from the time the photo is captured, i.e., the time when the door 20 is opened.

FIG. 30 is a view illustrating a drawer sensor according to one example, and FIGS. 31A and 31B are views illustrating a method for the drawer sensor of FIG. 30 to sense movement of the drawer. Hereinafter, a description will be given with reference to FIGS. 30 to 31B.

Referring to FIG. 30, it may be possible to configure the drawer sensing unit 130 as a separate constituent rather than providing the drawer sensing unit 130 to the controller 100.

The drawer sensing unit 130 may be provided with one light emitting part and two light receiving parts. That is, by analyzing the time when the light radiated from the light emitting part is incident on the two light receiving parts, the direction of movement of the drawer 50 may be sensed.

A plurality of slits 134 may be continuously disposed on the drawer such that the light radiated from the light emitting part of the drawer sensing unit 130 and incident on the slits 134 are reflected. Thereby, the light may be sequentially incident on the two light receiving parts.

In FIGS. 31A and 31B, the x-axis represents time, and the y-axis represents signals generated at the time when the light is received by the two light receiving parts Photo TR1 and Photo TR2. That is, in FIG. 31A, Photo TR1 receives light earlier than the Photo TR2.

In FIG. 31B, Photo TR2 receives light earlier than Photo TR1.

The view of FIG. 31B may represent a moving state of the drawer 50 in which the user withdraws the drawer 50 to use the drawer 50, and the view of FIG. 31B may represent a state of the drawer 50 in which the user introduces the drawer 50 into an original position after finishing using the drawer 50.

Accordingly, when the drawer sensing unit 130 senses signals as in FIG. 31A, the controller 100 may determine that it is time to acquire a photo captured by the camera 70 and select the photo as a photo of the interior of the drawer 50, i.e., the third region at the corresponding time. That is, according to the result of sensing or determination by the drawer sensing unit 130, the time at which a picture corresponding to the third region may be acquired may be determined. The portion corresponding to the third region and the other portions in the acquired picture may be independently and individually selected, separated and updated.

FIG. 32 is a view showing markers indicated on the drawer. Hereinafter, a description will be given with reference to FIG. 32.

Unlike FIGS. 30 to 31B, movement of the drawer 50 may be sensed using a marker, which is a specific indication, for the drawer 50, without employing a separate machine or electronic device.

The drawer 50 may be provided with a marker having various patterns (e.g., a pattern of white and black colors). The camera 70 may analyze movement of the marker through the photo captured by the camera 70 and then interpret movement of the drawer 50 and the direction of the movement. At this time, the analysis of the marker may be conducted by the drawer sensing unit 130. That is, the drawer sensing unit 130 may determine the state of the drawer 50 by analyzing movement of the marker in the pictures which were continuously taken. Therefore, depending upon the result of sensing or determination by the drawer sensing unit 130, the time at which a picture corresponding to the third region may be determined. The portion corresponding to the third region and the other portions in the acquired picture may be independently and individually selected, separated and updated.

FIG. 32 shows a simplified image of the camera and a wording reading as "SMART SENSOR." The marker may include a pattern of various shapes. The pattern may be formed by alternately arranging the white and black colors such that the pattern is recognizable by the camera 70.

The marker may be indicated at the upper side of the front surface of the drawer 50.

FIG. 33A is a view illustrating a photo showing the left and right drawers which are in the withdrawn position, and FIG. 33B is a view illustrating a photo showing the left drawer which is in the introduced position and the right drawer which is in the withdrawn position. Hereinafter, a description will be given with reference to FIGS. 33A and 33B.

FIGS. 33A and 33B illustrate an example of the marker arranged at the center of the upper side of the drawer 50 and provided with a wave pattern.

The first region 42 may be shown in one photo captured by the camera 70. In addition, one photo may show one of the second region 52 and the third region 62.

That is, a photo captured with the left and right drawers withdrawn as shown in FIG. 33A shows the first regions 42 disposed on the left and right sides and the second regions 52 disposed on the left and right sides.

On the other hand, a photo captured with only the right drawer withdrawn as shown in FIG. 33B may show the first regions 42 disposed on the left and right sides, the third region 62 disposed on the left side, and the second region 52 disposed on the right sides.

That is, when the drawer 50 is withdrawn, the photo shows the second region but does not show the third region 62. On the other hand, when the drawer 50 is introduced, the photo shows the third region 62 but does not show the second region 52.

The camera 70 captures photos at the same position. The drawer 50 is movable, and thus the camera 70 may capture a photo of various regions according to the position of the drawer 50.

When the drawer 50 arranged on the left side is fully introduced into the space under the shelf 40 as shown in FIG. 33B, the marker is not recognized by the camera 70.

That is, the marker is not shown in a photo captured by the camera 70.

Hereinafter, a method of sensing movement of the drawer using the marker will be described with reference to FIGS. 34 to 40.

FIG. 34 is a flowchart describing operation of the refrigerator according to one implementation.

Referring to FIG. 34, when the door switch 110 senses opening of the door 20, the camera 70 starts capturing a photo (S2101), and the controller 100 starts recognizing and tracing the marker (S2103).

Hereinafter, steps S2101 and S2103 will be described in more detail with reference to FIG. 35.

FIG. 35 is a flowchart describing a method of recognizing and tracing the marker according to one implementation.

Referring to FIG. 35, when the door 20 is opened, the camera 70 starts capturing a photo (S2301).

The controller 100 controls the camera 70 to acquire a photo of the interior of the drawer 50 (S2303).

Subsequently, the controller 100 processes the acquired photo (S2305), and determines whether a predetermined marker is recognized in the acquired photo (S2307).

To determine whether the predetermined marker is recognized, the controller 100 may compare if the marker recognized in the acquired photo is identical to the prestored marker.

The predetermined marker may be determined by the provider or the user, and may be pre-stored in the storage unit 18.

A marker may be formed in a searchable region in a photo captured by the camera. Hereinafter, a detailed description will be given of a marker which may be recognized and traced by the controller 100, with reference to FIGS. 36A through 37B.

FIGS. 36A and 36B are views illustrating a marker for sensing the time when the drawer is introduced or withdrawn according to one implementation.

Referring to FIG. 36A, the marker may be formed in a searchable region by the camera 70 from the time the drawer 50 starts to be opened. For example, in the case that the xx070 is positioned at the upper end of the refrigerator and allowed to capture a plan view of the drawer 50, the marker may be positioned at the front edge portion of the upper end of the drawer 50. In addition, the camera 70 may be installed to capture a photo of the drawer 50 from the position at which the drawer 50 is fully closed, to the position at which the drawer 50 is fully opened.

In the case that the marker is positioned at the upper end of the drawer 50, it is presumed that there is no obstacle at the upper end of the drawer 50 at the time the drawer 50 is closed after items stored in the drawer 50 are arranged in order. However, implementations are not limited thereto.

Referring to FIG. 36B, when the xx54 accommodating the drawer 50 and the drawer 50 are viewed from the point of view of the camera 70, the camera 70 may capture a photo of the interior of the drawer 50 including the marker within the range from the position at which the drawer 50 begins to be opened to the position at which the drawer 50 is fully opened.

FIGS. 37A and 37B are views illustrating the shape of a marker according to one implementation.

Referring to FIGS. 37A and 37B, the marker may be formed by alternately arranging identical shapes with two different colors Referring to FIG. 37A, the marker may be formed by arranging a plurality of bands having white squares and black squares which are alternately arranged such that the bands are misaligned.

In the case that the marker has a repeated pattern as above, even when a portion of the marker is not in the capture range of the camera, the controller 100 may recognize and trace the marker.

The marker is not limited to a repeated pattern. Nor is it limited to a plurality of colors. The marker may have any pattern as long as it allows a movable internal constituent of the refrigerator such as the drawer 50 to be recognized.

Referring back to FIG. 35, when the predetermined marker is recognized, the controller 100 senses movement of the recognized marker (X2311). The controller 100 may analyze and process the photos captured consistently or periodically, thereby determining whether the recognized marker moves or stops. For example, the controller 100 may determine whether the recognized marker moves or stops in the case that opening of the drawer 50 is continued or completed, or in the case that closing of the drawer 50 is started, continued, or completed.

Alternatively, in the case that the predetermined marker is not recognized, the controller 100 informs the user that recognition of the marker has failed (S2309).

For example, in the case that an obstacle is positioned at the marker, the camera may fail to capture a photo including the marker, or the controller 100 may not recognize the marker in an acquired photo. In this case, the controller 100 may provide the user with information indicating that recognition of the marker has failed or information providing a way to succeed in recognizing the marker such as removing the obstacle, through the display 14.

Subsequently, in the case that recognition of the marker fails, the controller 100 may process a new photo acquired through the camera and repeat the steps for recognizing the predetermined marker.

Referring back to FIG. 34, when closing of the drawer is sensed (S2105) after the marker is recognized, the controller 100 acquires a final photo including the interior of the drawer (the third region 62) through a photo captured at the corresponding time (S2107). At this time, the final photo of the interior of the drawer acquired by the controller 100 may include a view of the interior of the drawer immediately before closing of the drawer is sensed, or include a view of the interior of the drawer immediately after closing of the drawer is sensed. However, implementations are not limited thereto.

Sensing closing of the drawer will be described with reference to FIG. 38.

FIG. 38 is a flowchart illustrating a method of sensing closing of the drawer according to one implementation.

Referring to FIG. 38, the controller 100 determines whether termination of opening of the drawer 50 has been sensed (S2501). For example, in the case that the controller 100 recognizes the marker in the previously acquired photo of the drawer 50 and senses, by tracing movement of the marker, that the marker has stopped moving, it may sense termination of opening of the drawer 50.

Subsequently, the controller 100 determines whether start of closing of the drawer 50 has been sensed (S2503). For example, in the case that the marker stops moving and moves again in the reverse direction, the controller 100 may sense that closing of the drawer 50 has started.

Hereinafter, operation of the controller 100 having sensed closing of the drawer according to another implementation will be described with reference to FIG. 39.

FIG. 39 is a flowchart illustrating an operation of the refrigerator that is performed when termination of closing of the drawer is sensed according to one implementation.

When termination of closing of the drawer is sensed (S2701), the controller 100 determines whether acquisition of a final photo through recognition of the marker has been successful (S2703).

The controller 100 may sense termination of closing of the drawer 50 through image processing by the drawer sensing unit 130.

In the case that the marker is not normally recognized due to, for example, an obstacle and thus acquisition of the final photo failed, the controller 100 informs the user that recognition of the marker has failed (S2705).

The controller 100 may provide the user with information indicating that recognition of the marker has failed through, for example, the display 14. Thereby, it may guide the user in removing the obstacle and introducing or withdrawing the drawer such that the marker is normally recognized and the final image is acquired.

Referring to FIG. 34, the controller 100 displays the final image using, for example, the display 14. At this time, the image provided for the user may be the image of the portion corresponding to the third region 62 extracted from the acquired final photo. Hereinafter, control of a final image according to another implementation will be described with reference to FIG. 40.

FIG. 40 is a flowchart illustrating a method of controlling an image of a certain region in the refrigerator captured at a certain time according to another implementation.

Referring to FIG. 40, the controller 100 acquires the final photo (S2901), and then may cut an image of a desired region off of the photo. Then, the acquired final image is to stored in the storage unit 18 (S2903).

Subsequently, the controller 100 determines, through user inputs, whether a user input for display of the final image is received (S2905).

For example, when the final photo is acquired, the controller 100 may provide information indicating success of acquisition of the final photo to the display 14 constructed with a touchscreen and form an icon type user input portion on the display 14. Whether or not a user input is received may be determined depending on whether the corresponding icon is selected. The user input portion may not only include the icon formed on the touchscreen but also a physical key described above. However, implementations are not limited thereto.

Subsequently, when a user input for displaying the final image obtained by processing the final photo is received, the controller 100 displays the final image (S2907). The controller 100 may display the final image using the display 14. At this time, the displayed existing image may be replaced with the final image. Accordingly, displaying the final image may be viewed as updating of the final image.

Updating the final image may be automatically performed regardless of the user input.

According to one implementation, the refrigerator may sense movement of the drawer by recognizing a marker pre-formed on, for example, the drawer. The refrigerator may acquire an image of the final state of an item stored in the drawer using a camera installed in the refrigerator. At this time, the refrigerator may determine the optimum time at which the final storage state of, for example, the drawer, using the marker formed on the drawer.

Hereinafter, a description will be given of a position where the camera is installed and acquires photos according to the position.

According to one implementation, the camera 70 may be installed outside the drawer 50, i.e., in the storage compartment 22 and continuously capture photos including the interior of the drawer 50 and the movement path of the drawer body (including the front and rear walls of the drawer 50 and the upper portion of both sidewalls of the drawer 50) forming the drawer 50. Thereby, not only the state of the items stored in the drawer but also movement of the drawer may be simultaneously recognized. A photo captured by the camera 70 also contains an image of the space at the upper side of the drawer 50, i.e., the portion corresponding to the first region 42.

Basically, a photo captured by the camera needs to include both the operation of opening and closing of the drawer and the path along which the drawer moves. Accordingly, the camera needs to be installed at a position outside the drawer allowing the camera to capture a photo of opening/closing operation of the drawer and the movement path of the drawer. That is, the camera is preferably installed at a position where it can capture a photo including images of both the closed position and fully opened position of the drawer.

Further, the camera 70 may be configured to cover storage regions including the drawer region, i.e., a plurality of storage regions such that a photo captured through one shooting contains not only the drawer region but also the storage compartment or other storage regions such as, for example, the shelf region in which food or items divided by the shelf are stored.

To this end, the drawer 50 is preferably formed on the bottom surface in the storage compartment of the refrigerator. The drawer 50 may include a front wall, two sidewalls, a rear wall, a bottom wall, and an opening formed at the upper portion of the drawer 50. The camera 70 needs to be arranged over the drawer such that at least one portion of the interior of the drawer 50 and the upper portion of the front wall of the drawer 50 are exposed to the camera 70 when the drawer 50 is fully opened.

In addition, a printed part (a marker) with a specific pattern is formed or attached at a position on the front wall or the upper surface of the sidewalls of the drawer exposed to the camera.

At this time, the camera 70 is fixed at a predetermined position, and thus the position of the printed part of the drawer 50 needs to be relatively changed. That is, when the camera 70 receives a drive command from the controller 100, it continuously captures images at a constant capturing speed, and the captured images of the interior of the refrigerator are sequentially transmitted to the controller 100. The controller 100 traces the position of the printed part based on the photos of the items stored in the refrigerator received from the camera 70. Thereby, it determines information about, for example, a degree of opening of the drawer and movement of the drawer.

The range of capture by the camera may be determined by an angle of view of the camera. The angle of view includes a vertical angle of view representing the vertical range of capture and a horizontal angle of view determining the horizontal range of capture.

One end of the vertical angle of view of the camera 70 needs to be determined such that the front wall of the drawer 50 is within the vertical angle when the drawer 50 is at least fully opened. The other end of the vertical angle of view needs to be determined such that a portion, e.g., a portion of the front surface of the upper side of drawer 50 covering the opening at the upper portion of the drawer 50 allowing checking of whether the printed part positioned on the front wall or upper surface of the sidewalls of the drawer 50, is not exposed, is within the vertical angle when the drawer 50 and is closed.

At this time, it may be possible for one camera to recognize the internal region of the drawer and another storage space simultaneously. According to another implementation, a separate accommodation space (hereinafter, a bottom accommodation section of the storage compartment) may be provided on the bottom surface of the storage compartment, which is arranged between the front wall of the drawer in the fully closed position and the opening in the front surface of the storage compartment and overlaps at least one portion of the drawer when the drawer is opened. In this case, the camera 70 may be configured to recognize the internal region of the drawer 50 and another storage space (the bottom accommodation section) together in the range of capture in which the vertical angle of view of the camera 70 covers the fully opened position and fully closed position of the drawer.

Meanwhile, in another implementation for the vertical angle of view of the camera 70, a photo of both the internal region of the drawer and the shelf region may be captured. Accordingly, the range of the other end of the vertical angle of view may be determined such that the vertical angle of view covers at least one part of a plurality of shelves which are disposed vertically spaced a certain distance from each other. Preferably, in configuring the camera such that the vertical angle of view thereof covers the shelf region, the vertical angle of view may cover even a portion of the uppermost shelf of the shelves. More preferably, the vertical angle of view may cover even the rear edge of the uppermost shelf disposed at the uppermost end of the storage compartment.

According to the illustrated examples, the stored condition of the items in the at least two storage spaces including the internal region of the drawer may be checked through one photo captured by one camera.

To this end, the camera needs to be installed at a desirable position with respect to the drawer formed at the bottom portion of the storage compartment. Inventors of the present invention reviewed positions for installation of the camera disclosed in or known from documents published at the time of filing of the present application. First, it was reviewed whether a photo of the interior of the storage compartment can be captured by installing the camera at the upper end of the door outside the storage compartment of the refrigerator.

In the case that the camera is installed at a position (the door) outside the storage compartment, the camera is kept exposed to the external temperature and thus dew condensation does not occur around the camera. Accordingly, a separate structure to prevent dew condensation is not needed. However, it is difficult to photograph the interior of the storage compartment with the camera mounted to the door since the user always puts items in the interior of the drawer and the storage spaces in the compartment with the door open. Particularly, one object of the present invention is to obtain the condition of the items stored in the drawer as well as movement of the drawer from the outside of the drawer. Since the user's operation in the drawer is always performed with the door open, and the drawer is closed when the door is closed, this case does not serve the mentioned one object.

Accordingly, to photograph at least the interior of the drawer and movement of the drawer, it is preferable to dispose the camera in the body of the storage compartment of the refrigerator in which the drawer to be photographed is present rather than disposing the camera outside the refrigerator so that the storage compartment can be captured.

In the case that the camera is installed under one of the shelves positioned over the drawer and oriented toward the opening of the storage compartment of the body in accordance with the one object, the shelf region cannot be photographed, and it is difficult to install a drive unit to drive the camera and a wire on the shelves. In addition, to cover the entire movement path of the drawer, a wide angle camera needs to be used. Accordingly, captured images may be significantly distorted.

In the case that the camera is installed at a sidewall of the storage compartment in a range in which the drawer can be exposed to the camera, it has been found that an asymmetric image is produced due to different distances from the camera to the left side and right side of the storage compartment of the refrigerator, and thus an image showing the condition of the items stored in the drawer is significantly distorted. Accordingly, the level of user satisfaction with the image may be greatly lowered.

Above all, one object of the present invention is to sense opening/closing of the drawer and the degree thereof by tracing movement of the drawer without using a separate sensor. The aforementioned asymmetric image may show a relatively enlarged image (image distortion) of the printed part (the marker) positioned on the front wall of the drawer or the upper surface of both sidewalls the drawer may be shown. Accordingly, the size (pixel size) of the portion occupied by the marker may increase relative to the whole size of the image and thus change of position of the marker may not be easily recognized. In addition, the range to be processed to determine change of position of the marker may increase, and thus images which are continuously transmitted may be missed or fail to be processed.

Accordingly, it has been found that installing the camera at the sidewall or corner of the storage compartment which is known at the time of filing of this application does not serve the object of this present invention.

In one implementation, the camera is installed at the upper wall of the storage compartment corresponding to the open upper surface of the drawer within the ranger of the upper surface onto which the drawer in the closed position and the drawer in the opened position are projected. In addition, the camera is oriented toward the rear wall of the storage compartment to face the interior of the storage compartment and is inclined at a certain angle such that the focus of the camera is directed to one point on the rear wall surface of the storage compartment. Thereby, images undergoing minimized distortion may be obtained with respect to the vertical angle of view of the camera in the illustrated examples.

According to anther implementation, in determining the position of the camera, the camera is installed at a position on the upper wall of the storage compartment between the opening in the front surface of the storage compartment and the projected position on the upper wall of the front edge portion of the uppermost one of the shelves vertically disposed in the storage compartment. In addition, the camera is oriented toward the rear wall of the storage compartment to face the interior of the storage compartment and is inclined at a certain angle such that the focus of the camera is directed to one point on the rear wall surface of the storage compartment.

The camera is preferably positioned at the central portion of the upper portion of the storage compartment, and the printed part correspondingly positioned on the upper surface of the front wall or both sidewalls of the drawer is preferably installed on the upper surface of the front wall of the drawer. More preferably, the position of the camera installed on the upper surface of the storage compartment is nearby the upper surface of the front wall of the drawer under the upper surface of the storage compartment.

In a refrigerator provided with at least one door, i.e., the left and right doors to open and close the opening of a storage compartment, the camera is installed on a portion of the upper surface (ceiling surface) of the storage compartment on the boundary between the left and right doors, and the printed part is positioned, when left and right drawers are provided, near the boundary between the left and right drawers. That is, when a viewer faces the interior of the storage compartment, the left drawer is preferably positioned at an end of the upper surface of the right sidewall or the upper right surface of the front wall, and the right drawer is preferably positioned at an end of the upper surface of the left sidewall or the upper left surface of the front wall. In other words, printed parts are preferably formed near a position right under the camera. This is because distortion of the printed parts may occur if the printed parts are far apart to the left and right sides from the position right under the camera. This example is shown in FIG. 41B.

In the case that the printed parts are installed at one side of the upper surface of each of the left and right drawers or an end of the upper surface of each of both sidewalls of the left and right drawers, the drawers may be used in common regardless of the left and right positions thereof when they are used for a refrigerator which is opened and closed by the left and right doors. Accordingly, the efficiency of use of the drawers may increase.

According to the positions of the camera and printed parts as described above according to some implementations, the fixed range of capture of the camera covers the movement path of the drawer from the closed position to the open position. Therefore, not only opening/closing of the drawer but also the degree of opening/closing and stopping or moving of the drawer may be sensed and at the same time even the condition of the items stored in the drawer may be sensed or checked with one camera.

In addition, the condition of the items stored in the bottom accommodation section installed on the bottom surface of the storage compartment may also be checked with the drawer closed. Therefore, the camera may recognize a plurality of storage regions.

In the case that the angle of view of the camera is extended up to the shelf region, the camera may selectively recognize three storage regions including the internal region of the drawer, the bottom accommodation section of the storage compartment, and the shelf region.

Since the camera installed on the upper surface of the storage compartment and the printed part formed on or attached to the upper portion of the drawer are approximately vertically aligned, the image of the printed part in a whole image of the interior of the refrigerator captured and transmitted by the camera is less distorted. In addition, the space occupied by the printed part may be relatively minimized, and therefore the time taken to trace and determine the position of the printed part through image processing may be minimized.

Hereinafter, a method of tracing and recognizing a marker formed on the drawer will be described.

A printed part (marker or printing paper) which is recognizable through image interpretation may be installed at a specific portion of the body of the drawer exposed to the camera. By tracing the position of the marker, the degree of opening/closing of the drawer and the closed or opened state may be sensed. By allowing the marker on the movement path of the drawer from the closed position to the fully opened position to be exposed to the camera, the opened or closed state of the drawer may be determined based on the position of the marker. That is, information about various states of the drawer may be determined based on the change in position of the marker in the photos which have been continuously captured.

The printed part may be provided with a specific pattern to trace and recognize movement of the drawer or the opened or closed state of the drawer. In this case, the printed part may be disposed at various positions on the upper surface of the drawer exposed to the camera.

Preferably, the printed part is installed approximately on a boundary of the maximum access opening of the drawer at the upper end of the front wall or both sidewalls of the drawer.

The pattern of the printed part may be formed in a manner that figures having a certain shape and contrasting colors are alternated. The certain shape may include quadrangle, triangle, circle, and wave.

The printed part may degrade the whole aesthetics of the refrigerator and provoke negative feeling among some users. Therefore, repetition of the figures of the pattern need to be minimized so as not to provide negative feeling regarding aesthetics of the refrigerator, and a printed part having a shape attractive to the user needs to be considered.

However, this design-related issue is not simply raised in the aspect of design. It may also be raised in the case that the position of the drawer is not accurately recognized. That is, the design issue may affect the rate of recognition of the printed part of the drawer, thereby resulting in failing to accurately sense the position of the drawer.

That is, considering that the size of the printed part needs to be greatly reduced in the design aspect, a pattern in which figures having a certain shape and contrasting colors are repeated two to four times rather than being repeated more times may be selected. In this case, the controller configured to process captured images of the interior of the refrigerator may not accurately recognize the boundary of the printed part (marker) in a whole image.

According to one implementation addressing this problem, colors contrasting that of the drawer, which is usually bright-colored, transparent, or semi-transparent, may be selected. In addition, referring to FIG. 41A, the length L1 of the printed part in the direction perpendicular to the direction of movement (back and forth movement) of the drawer may be set to be longer than the length L2 of the printed part in the direction of movement of the drawer. In the printed part, a first color portion having a certain length in the vertical direction is formed, and a second color portion having a color contrasting the color of the first color portion or identical to the color of the drawer and a width approximately equal to that of the first color portion is formed at the front or back of the first color portion with respect to the movement direction of the drawer. Subsequently, the first color portion is repeated. That is, the first color portion and the second color portion maybe sequentially disposed. Regarding to the whole size of the marker including a first color portion, a second color portion and anther first color portion disposed in this order, the length L1 of the marker in the direction perpendicular to the direction of movement of the drawer is preferably longer than the length L2 of the marker in the movement direction of the drawer.

According to another implementation, both ends of the first color portion arranged at the front edge of the marker are connected to both ends of the first color portion arranged at the rear edge of the marker such that the second color portion is surrounded by the first color portions. The marker in the previously disclosed third implementation may be an example having this structure.

That is, in a preferred implementation of the marker proposed by the present invention, the marker is configured such that the length L1 in the direction perpendicular to the movement direction of the drawer is greater than the length L2 of the movement direction of the drawer and that a portion of the marker adjoining the drawer (with respect to the movement direction of the drawer) has a color (a dark color) contrasting the color of the drawer, and the central portion of the marker has a bright color contrasting the dark color.

When the printed part is configured as above, the printed part may have a small size. Accordingly, the user's demand for aesthetics may be met and an image portion of the printed part in a whole image captured with the camera may have a small size relative to the size of the whole image. Accordingly, the size of an area undergoing image processing to sense change in position of the printed part may be reduced and thus the image processing speed may be improved. This advantageously allows the image processing speed of the controller to support the speed of continuous capturing of photos to be transmitted. Thereby, the accuracy of acquiring a photo at the accurate time may be further improved. For example, if a portion in the photos which are continuously captured is large, the controller may be subject to a heavy work-load. This may lead to use of a highly expensive controller. If the portion to be processed is small, on the other hand, the load to the controller may be lessened. Accordingly, images may be effectively processed even with an inexpensive controller.

Preferably, as shown in FIG. 41B, the marker is provided with a letter, a sign, or a pattern to allow the user to intuitively understand the use of the marker.

Hereinafter, a description will be given of a method of recognizing the coordinate of the marker and processing photos from the camera.

FIG. 42 is a view illustrating a method of recognizing the position of the marker. Hereinafter, a method of recognizing the position of the marker of the drawer will be described with reference to FIG. 42.

When the user desires to newly introduce (stock) or retrieve an item into or from the drawer, the user first opens the door. Once the door is separated from the front surface of the storage compartment, the door switch senses the separation, and the controller receives a signal from the door switch and drives the camera which is installed in the refrigerator and set in the standby mode. When the camera receives a drive command from the controller, a drive voltage is applied to the camera in place of the standby voltage. Then, the camera finishes preparation for driving and starts continuous photographing.

The user will subsequently grip a handle on the front wall of the drawer mounted in the storage compartment of the refrigerator and pull the drawer out to open the drawer. As the camera continuously photographs the drawer, the camera captures photographs of the opening of the drawer at certain intervals and sends the captured photos to the controller.

Meanwhile, a marker having a certain shape is formed at a portion of the drawer exposed to the camera. Upon receiving photos sent from the camera, the controller divides a whole image by a certain set of pixels and assigns coordinate values to the image at certain intervals. Then, the controller analyzes the coordinate of the marker on the coordinates of the image.

Accordingly, when a photo captured with the drawer in the closed position is sent to the controller, the marker will not be exposed in the corresponding image. At this time, the coordinate value of the marker is 0.

When the user opens the closed drawer, the camera photographs the drawer with the marker exposed. Thus, the camera captures a photo including the marker. When this photo is sent to the controller, the controller recognizes a coordinate value of the marker in the corresponding image and compares the coordinate value with that of the previous position of the marker. For example, referring to FIG. 42, when the coordinate value of the marker changes from 0 to, e.g., 50 at location A, the controller may determine that the drawer is moving, based on the change of the coordinate value. Particularly, when the coordinate value is just changed from 0, the controller may determine that the drawer has just begun to open.

When the user continues to open the drawer, the controller may determine, through a series of processes as described above, that the drawer is moving to be opened based on the change of the coordinate of the marker to a greater value.

When the user fully opens the drawer, the controller recognizes that the coordinate value does not change any more and determines that the drawer is fully open or that the drawer stops opening in the open state. For example, in FIG. 42, location B is a point at which the coordinate value of the marker is 90 and does not change, and thus the controller may recognize that the drawer is stopped or determine that the drawer is fully open.

Normally, when the drawer is opened, whether fully opened or partially opened, and then stopped, it may be determined that the user is performing a certain operation for the drawer. Even when the drawer is stopped, the camera continues to capture photos of the interior of the refrigerator and send the captured photos to the controller. And the controller monitors change of the coordinate of the marker.

Once the user's operation of stocking or retrieving an item in or from the drawer is completed, the user closes the drawer. At this time, the controller recognizes based on the captured photos that the coordinate of the marker in a whole image changes and determines that the drawer is moving again. For example, in FIG. 42, location C is a point at which the coordinate value of the marker changes from 90 to 70. Based on change of the coordinate value to a lower value, the controller may determine that the drawer is beginning to be closed immediately after the user completes an operation for the drawer.

Similarly, in the case that the coordinate value of the marker is 0, that is, the marker is not recognized in an image, it is determined that the drawer is fully closed.

A description has been given above of a method for the controller to recognize the position of the marker through the coordinate of the marker on a whole photo captured by the camera and to trace the marker and determine whether the drawer is moving or stopped, the degree of opening of the drawer, and whether the drawer begins to be opened or closed.

Hereinafter, a description will be given of a method of processing photos from the camera and acquiring a desired photo based on the position of the marker of the drawer. Based on the movement state of the drawer, a method of processing and acquiring a photo of the interior of the drawer, particularly a method of obtaining a photo determined to be captured immediately after the user completes an operation for the drawer will be described in detail.

When the coordinate of the marker of the drawer changes from 0 to a greater value and thus the drawer is determined to be moving in the opening direction, the controller only senses change of the coordinate based on a photo of the interior of the refrigerator captured by the camera and sent to the controller and buffers the whole photo in a temporary buffer without processing the storage regions separately shown in the photo.

When the drawer continues to be opened set in the fully open state, or is partially opened and stopped, the user performs an operation for the drawer. This situation is determined to occur by the controller when there is no change in the coordinate of the marker. Then, a sub-image corresponding to the drawer region among the divided regions in a whole image of the transmitted photo is moved to and stored in a temporary drawer buffer. That is, referring to FIG. 42, in a section corresponding to location D, the controller cuts off a necessary part from a portion for the drawer region of a photo of the entire interior of the refrigerator and moves the part to a temporary buffer for the drawer region. This section is defined as a "section of refreshing the photo of the internal region of the drawer."

In other words, images are processed differently between the section in which the drawer is being opened and the section in which the drawer is stopped. This is to because image processing is conducted in consideration of the fact that the user's operation for the drawer is performed with the drawer stopped. Thereby, the speed of image processing for tracing the change of the coordinate may increase in the section in which the drawer moves, ensuring efficient data processing.

When the drawer in the stopped state begins to be closed, the controller determines, based on the change of the coordinate to a lower value, that the user's operation has been completed. At this time, the controller selects and stores the latest image of the images temporarily buffered in the temporary buffer for photos of the interior of the drawer. That is, an image of the internal region of the drawer provided immediately after completion of the user's operation is captured.

The captured (stored) latest image of the items stored in the drawer region replaces an image on an area of the display, which is connected online or directly to the controller, or is transmitted to a network server. The latest image transmitted to and stored in the network server may be provided for the user such that the user checks the image through the display installed at the refrigerator or a mobile terminal connected to the network server whenever the user desires to check.

Next, a description will be given below of a method of selecting and searching a specific section for the position of the marker rather than searching a whole captured photo showing the drawer.

That is, it is possible to set a search range for the drawer region. The movement path of the drawer may be divided into several sections according to the degree of opening of the drawer and the marker may be traced with different methods in the respective sections. Thereby, time taken to process (analyze) photos captured and transmitted by the camera may be shortened such that the photo processing speed matches with the photographing speed of the camera.

Generally, when the drawer used in the refrigerator is in the full open position, it is not withdrawn to be separated from the storage compartment. That is, the normal withdrawn distance of the drawer, commonly referred to as an open distance, is generally about 50% of the entire depth of the drawer (the front-to-back length of the drawer with respect to the movement direction of the drawer).

The withdrawn distance of the drawer may be determined to be a region in which a coordinate is assigned to the marker of the drawer in a show image to be processed by the controller. In this case, the controller may recognize the position of the drawer from the time at which the drawer begins to be withdrawn. Particularly, the withdrawn distance corresponds to the size of data to be processed by the controller to sense change of the coordinate of the drawer. In addition, to sense and determine the change of the coordinate, the controller needs to compare two photos, and the speed of performing this process should correspond to the capturing speed of the camera. Preferably, the capturing speed of the camera (the time interval at which a photo is captured) is determined such that it approximately matches with the speed of the controller determining the change based on the transmitted photos and processing the photos.

According to this method, the marker is immediately located in the photos captured by the camera, and thus the position of the drawer is determined. In addition, the controller may easily obtains images from new photos continuously sent from the camera, while processing divided regional images of the storage spaces in a whole photo of the interior of the refrigerator. That is, depending upon whether the door is open and whether the drawer is open, images of the respective regions may be cut off from the whole image and stored in the corresponding temporary buffers, without leaving any photo captured by the camera unprocessed.

However, data for two images (a previous image and a current image) having the size as described above need to be processed, and accordingly a high processing capability of the controller may be required. In the case that the processing capacity of the controller is increased to meet this requirement, the price of a processor may rise significantly. In addition, to process images without the drawer open, an excessively high processing capability may be required and thus efficient selection of components may not be implemented.

According to one implementation provided to address this problem, images identifying the drawer identifying the drawer region are separated step by step and the image data are processed with different methods according to the withdrawn distance, considering that it is substantially difficult to sufficiently recognize the interior of the drawer with the drawer open by a certain distance.

FIGS. 43A to 43C are views illustrating the degree of opening of the drawer. FIG. 43A shows the drawer which is fully open, i.e., open by about 50% of the overall length of the drawer, FIG. 43B shows the drawer which is open by about 30% of the overall length of the drawer, FIG. 43C shows the drawer which is open by about 10% of the overall length of the drawer.

For example, when the user opens the drawer by about 10% of the overall front-to-back length of the drawer as shown in FIG. 43A, the items stored in the drawer may be not sufficiently identified. Only when the drawer is opened by about 30% of the overall front-to-back length, the items stored in the drawer may be identified to a certain extent, and thus the drawer may be recognized as being open.

When the drawer is fully open as shown in FIG. 43A, the drawer has been withdrawn by about 50% of the overall length of the drawer, and the items stored in the drawer may be sufficiently identified. In other words, only when the drawer is open by about 30% to about 50% of the overall length, the user can store or retrieve an item in or from the drawer. When the drawer is in this section of movement it may be viewed as being open.

In this context, when the withdrawn distance of the drawer is less than 30% of the overall length, it may be determined that "the drawer is not open." When the withdrawn distance of the drawer equal to or greater than 30% of the overall length, it may be determined that "the drawer is open." Thereby, photos may be processed differently according to the withdrawn distance to reduce load of data that the controller need to process.

The controller obtains images from photos captured by the camera and determines the image size corresponding to the movement trajectory of the drawer. Then, the controller determines the number of pixels to the point or distance at which the drawer is withdrawn by about 30% of the overall length and sets an image section.

That is, when the drawer is withdrawn from the position shown in FIG. 43A to the position shown in FIG. 43B, the controller may determine change of the coordinate of the marker. In this case, load to the controller may be reduced compared to the case in which change of the coordinate is determined when the drawer is withdrawn from the position of FIG. 43A to the position of FIG. 43C.

In the movement section from the closed position of the drawer to the position where the drawer is withdrawn by 30% of the overall length, only whether the marker has reached the position of a pixel corresponding to the distance of 30% of the overall length is determined. In other words, the coordinate of the marker in the previous photo is not compared with the coordinate of the marker in the current photo (to determine change of the coordinate of the marker). Rather, only whether the position of the marker is within a certain pixel range is determined and the whole image is temporarily buffered.

Since only the data of one photo is processed in this movement section without comparing two photo's data, the capability of the controller to process data does not need to be increased, the processing may be smoothly performed according to the capturing speed of the camera.

Meanwhile, in the case that the drawer is opened beyond the position corresponding to 30% of the overall length, that is, from the time at which the marker reaches a position beyond a specific pixel in a photo processed by the controller, the value of the coordinate of the marker may be determined by comparing two photos (the last photo captured immediately before this time and a photo captured after this time) to determine whether the drawer is stopped.

If the search range is limited as above, the size of a photo is reduced to about ⅖ of the size of the photo obtained when the search range is not limited. Further, the photo size corresponding to two photos to be processed is reduced to about ⅘ of the size of the photo obtained when the search range is not limited. Accordingly, the size of the data to be processed by the controller may become substantially less than or equal to the size of one whole photo.

Accordingly, the speed of data processing for tracing the change of the coordinate value between two photos may correspond to the capturing speed of the camera, and thus data processing (tracing or monitoring the coordinate) may be possible without leaving any photo captured by the camera unprocessed. Time delay related to the processing time may be prevented even when the capacity of the controller is not increased. Therefore, a desired photo may be acquired at the accurate time.

To sum up, it is possible to divide a portion of the distance by which the drawer is withdrawable into a first section and a second section in a photo captured by the camera.

The position of the marker may be determined based on the pixels of a photo captured in the first section. At this time, in the first section, the pixel position of the marker in the photo may be determined without comparing values of the coordinate of the marker.

In the first section, it is difficult for the user to retrieve or store an item from or in the drawer even if the drawer is actually open. Therefore, the drawer may be viewed as being substantially closed.

The second section may be set as a coordinate search range in which the coordinate values of the marker in two continuously captured photos are compared. Since two photos are compared in the second section, change of the coordinate of the marker may be sensed. For example, if the marker is shown at the same position in the two photos, it may be determined that the drawer remained stopped while the two photos are captured. If the position of the marker is changed between the two continuous photos it may be determined that the drawer moved while the two photos are captured. At this time, depending upon the direction in which the position of the marker was changed, it may be determined whether the drawer is moving to be closed or to be opened.

In the second section, an opening allowing the user to store or retrieve an item in or from the drawer is exposed, and accordingly the drawer may be viewed as being substantially open.

FIG. 45 is a control flowchart according to one implementation.

Hereinafter, a description will be given with reference to FIG. 45.

It is determined that the door 20 opens the storage compartment 22 (S10). At this time, opening/closing of the door 20 may be sensed by the door switch 110.

When the door 20 is opened, the door sensor 120 may be driven. That is, the door sensor 120 may sense whether the door 20 has rotated an angle greater than or equal to a certain angle θ. That is, the door sensor 120 may not operate when the door 20 is not open, and may begin to operate when the door 20 is opened.

In addition, when the door 20 is opened, the camera 70 may begin to capture photos (S14). At this time, the camera 70 may capture photos at predetermined time intervals.

For example, it may capture ten photos per second.

The photos captured by the camera 70 are stored in the storage unit 18. In the case that a plurality of photos are captured by the camera 70, a most recently captured photo may be stored and a previously captured photo may be deleted due to the capacity limit of the storage unit 18.

Meanwhile, the drawer sensing unit 130 may sense whether the drawer 50 is open (S20). The drawer sensing unit 130 may sense withdrawal of the drawer 50 from the space under the shelf 40.

In addition, when closing of the drawer 50 is sensed by the drawer sensing unit 130, a photo captured at this time or at a time closest to this time is selected as a final photo (with the drawer in the open state).

Since the camera 70 captures a determined number of photos per second, a photo may not be correctly captured at the time when the drawer 50 begins to be closed. When movement of the drawer 50 is determined by analyzing, through the drawer sensing unit 130, movement of the marker expressed on the photos captured by the camera 70, a photo may be selected at the time at which the drawer 50 is determined to begin to be closed.

The controller 100 divides the final photo into the first region 42, the second region 52, and the third region 62 (S42). At this time, the controller 100 may divide the photo into the regions by specifying the number of pixels from the adjustment line 15 and acquire final images of the respective regions.

As described above, when the drawer 50 is withdrawn, the second region 52 overlaps the third region 62.

Since information indicating that the drawer 50 has been withdrawn has been obtained in S20, the controller 100 may determine that a second image has been obtained.

Then, information about the second region 52 may be updated (S46). The controller 100 may transmit the second image showing the second region 52 to the display 14 to change a corresponding portion on the display 14 based on the final photo.

On the other hand, when it is determined in S30 that the drawer 50 does not begin to be closed, photos may be captured as in S14.

When it is determined in S30 that the drawer 50 is not closed, it may mean that the use has not terminated access to the second region 52. That is, the user may store a new food item in the second region 52 or retrieve a stored item from the second region 52, with the drawer 50 stopped.

On the other hand, when it is determined that the drawer 50 begins to be closed, it may suggest that the user terminates access to the second region 52 and introduce the drawer 50 into the space under the shelf 40.

Meanwhile, in the case that it is determined in S20 that the drawer 50 is not open, it may be determined whether the door 20 is about to be closed (S60).

At this time, whether the door 20 is about to be closed may be sensed by the door sensor 120.

Upon terminating access to the storage compartment 22, the user closes the door 20, thereby shutting the storage compartment 22 tightly. That is, the user may store a new food item in the xx2 or retrieve a stored food item from the storage compartment 22, with the display 14 opened by the door 20.

In the case that the door 20 is closed by the user, it may be determined that the user terminates access to the storage compartment 22 and that the food in the storage compartment 22 is maintained in place until the door 20 is opened again.

When it is determined in S60 that the door 20 is about to be closed, the controller 100 may select a photo captured at this time or at a time closest to this time as a final photo (with the drawer in the closed state) (S70). That is, the controller 100 may select, as a final photo, a photo captured at the time at which capturing photos with the camera 70 is terminated or at a time close to this time.

The controller 100 divides the final image into the first region 42, the second region 52 and the third region 62 (S72). At this time, the final photo may include a first image showing the first region 42. The most recent state of food stored in the first region 42 is the condition of the food at the time when the user terminates access to the storage compartment 22. Accordingly, the user may acquire correct information about the food in the first region 42 from the first image acquired at this time.

Since information indicating that the drawer 50 has been introduced has been obtained in S60, it may be determined that the controller has obtained the first image and the third image. As described above, when the drawer 50 is withdrawn, the second region 52 and the third region 62 overlap each other, but the first region and the third region are positioned not to overlap each other but to be photographed together.

In addition, information about the first region 42 and the third region 62 may be updated (S76). The controller 100 transmits the first image showing the first region 42 and the third image showing the third region 62 to the display 14 such that corresponding portions on the display 14 are changed based on the final photo.

Although not shown in FIG. 45, when the door 20 rotates to shut the storage compartment 22 and thus the storage compartment 22 is closed, driving of the camera 70 may be stopped. At this time, the door switch 110 may sense whether the door 20 shuts the storage compartment 22.

That is, in this example, a photo acquired at the time at which the user terminates use of the storage compartment 22 is processed to provide the user with information about the food stored in a region. Accordingly, the user may obtain accurate information about the food stored in the storage compartment 22.

Meanwhile, two door sensor 120, two 110 and two drawer sensing unit 130 may be installed on the left side and the right side, respectively. In this case, individual information about the left and right doors and the left and right drawers may be acquired. In the case that the drawer sensing unit 130 senses movement of the drawer by analyzing the marker shown in the captured photos, the marker may be installed at each of the two drawers while one drawer sensing unit 130 is provided.

Accordingly, in the case that only the left door is open, only the left portion of a photo may be updated based on the aforementioned information. In the case that only the right door is open, on the other hand, only the right portion of the photo may be updated.

In the case that both the left door and the right door are open under conditions as above, both left and right portions of a photo may be updated and provided to the display 14.

FIG. 46 is a control flowchart illustrating a variation of the example illustrated in FIG. 45.

Referring to FIG. 46, S60 of FIG. 45 is divided into S62 and S64. Only details different from those of FIG. 45 will be described.

That is, determining whether the door 20 is about to be closed is conducted by determining whether the door 20 rotates in the closing direction (S62) and determining to whether the door 20 rotates an angle greater than or equal to a certain angle θ.

In other words, when the door 20 rotates in the closing direction (S60), and an angle the door 20 rotates is less than or equal to a certain angle (S64), capturing photos with the camera 70 may be terminated.

To obtain information about food stored in the storage compartment 22 from the photos captured by the camera 70, interference with the door 20 and a basket installed at the door 20 should not occur. Accordingly, in the case that the door 20 is about to be closed, it may be suggested that the door 20 and other relevant constituents are not shown in the photos captured by the camera 70.

FIG. 47 is a control flowchart illustrating a variation of the example of FIG. 46. Hereinafter, a description will be given of some details different from those of FIG. 46 with reference to FIG. 47.

Referring to FIG. 47, the direction of rotation of the door 20 is not determined unlike the example of FIG. 46.

When it is determined in S12 that the door has rotated an angle greater than or equal to a certain angle, it suggests that the door 20 rotates in the opening direction at that time. Accordingly, when the user rotates the door 20 again, and thus the door 20 reaches a certain angular position, it may mean that the user is closing the door 20.

Accordingly, in this example, step S62 of FIG. 46 is not performed. Once it is determined in S20 that the drawer is not open, step S64 of determining whether the door has rotated an angle less than or equal to a certain angle is immediately performed.

FIG. 48 is a control flowchart illustrating another variation of the example of FIG. 45. Hereinafter, a description will be given with reference to FIG. 48.

FIG. 48 describes a control flow of sensing movement of the drawer 50 through the marker. For simplicity of description, details same as those discussed above will not be described, and only features different from those of the example of FIG. 45 will be described.

S20 and S30 of the previous example may be divided into S22, S24 and S26.

After photos are stored in the storage unit 18 as in S16, the camera 70 determines whether the marker is recognized (S22).

Since the camera 70 captures photos, facing downward from the upper side of the inner case 12, the marker may not be exposed to the camera 70. That is, in the case that the handle of the drawer 50 is not shown at the front edge of the shelf 40, i.e. in the case that the drawer 50 is not withdrawn, the marker may not be recognized.

In the case that the marker is recognized in a photo captured by the camera 70, it may be determined whether the marker is stopped (S24). At this time, the movement path of the marker may be identified in one photo. Then, the path may be divided into the first section and the second section and movement of the marker may be determined only in the second section.

Since the camera 70 captures a plurality of photos at predetermined time intervals, whether the marker moves may be determined by comparing the photos. Since the marker is marked on the drawer 50, the drawer 50 may be determined to move when the marker moves.

In addition, it may be determined whether the marker has moved a distance greater than or equal to a certain distance from the position at which the drawer 50 is closed (S26).

In the case that the marker has not moved a distance greater than or equal to a certain distance, the drawer 50 is not sufficiently open, and thus a proper image of the second region 52 may not be acquired. For example, in the case that a photo is captured with the drawer 50 withdrawn by only ⅓ of the overall length of the drawer 50, the inner space of the drawer 50 may not be sufficiently shown in the photo, and the user may not acquire information about the second region 52 from an image acquired from this photo. Herein, the certain distance may be determined based on whether the marker has entered a search range for determination of movement of the marker.

When it is determined that the marker has moved a distance greater than or equal to the certain distance, the determination may mean that the user has terminated access to the second region 52 and finished use of the second region 52.

Accordingly, a photo acquired at the time at which the aforementioned three conditions are met or a time close to this time may include information about the food stored in the second region 52.

FIG. 49 is a view illustrating another variation of the example of FIG. 45.

Hereinafter, a description will be given with reference to FIG. 49.

Unlike FIG. 45, the camera of the example of FIG. 49 is not driven immediately at the time when the door switch 110 determines that the door 20 is open.

When the door switch 110 determines that the door 20 is open, the door sensor 120 is driven.

In addition, the door sensor 120 determines whether the door 20 has rotated an angle greater than or equal to a certain angle (S12). In the case that the door 20 has not rotated an angle greater than or equal to the certain angle, the camera 70 does not capture photos.

When the door 20 rotates an angle greater than or equal to the certain angle, the camera 70 captures photos (S14). At this time, the camera 70 captures photos at predetermined time intervals. For example, the camera 70 captures ten photos per second.

A captured photo includes the first image of the first region 42. Since the door 20 has rotated an angle greater than or equal to a certain angle θ, the basket installed at the door 20 may not interfere with capturing a photo. The basket installed at the door 20 may not appear in the photo.

In S60, the door sensor 120 may sense that the door 20 is about to be closed. When it is said that the door 20 is about to be closed, it may mean that the door 20 rotates in the closing direction, and thus the door 20 forms an angle less than or equal to a certain angle.

The camera 70 captures photos and stops the capturing operation when the door 20 is about to be closed (S69). In FIG. 45, the camera 70 captures photos until the door switch 110 is pressed by the closing door 20. In contrast, in the example of FIG. 49, the camera 70 stops capturing photos when the door sensor 120 determines that the door sensor 120 has rotated to a certain angle. The certain angle may be an angle at which obstruction of the view by the door 20 and the basket installed at the door 20 does not occur in the photo.

FIG. 50 is a control flowchart illustrating another implementation. Hereinafter, a 25 description will be given with reference to FIG. 50. In the control flow of FIG. 50, when it is determined through the door switch 110 that the door 20 is open, the capturing operation may be continuously performed at predetermined time intervals.

First, whether the door 20 is open by an angle greater than or equal to a certain angle θ is determined by the door switch 110 (S100).

When the door 20 is open by an angle greater than or equal to the certain angle, it is determined that the capturing operation is not interfered with by the drawer 50, and the camera 70 captures photos (S110). At this time, the camera 70 may capture one photo.

Then, it is determined whether the drawer has been withdrawn by a distance greater than or equal to a first set distance (S120). Herein, the set distance may be a distance at which food information about the second region 52 is sufficiently acquirable from the photos captured by the camera 70. For example, the first set distance may be ⅔ or ⅓ of the overall length of the drawer 50.

The withdrawn distance of the drawer 50 may be sensed by the drawer sensing unit 130.

When it is determined that the drawer 50 has been withdrawn by a distance greater than or equal to the first set distance, the controller 100 divides the photo into a plurality of images according to the respective regions (S122).

Since the photo is acquired with the drawer 50 withdrawn, the first image and the second image may be acquired from the photo.

The controller 100 may update the first image and the second image (S124).

On the other hand, when it is determined in S120 that the drawer 50 has not been withdrawn by a distance greater than or equal to the first set distance, it may be determined whether the drawer 50 has been withdrawn by a distance less than or equal to a second set distance (S130).

At this time, the second set distance may be a distance at which food information about the third region 62 is sufficiently acquirable from the photos captured by the camera 70. For example, the second set distance may be ⅓ of the overall length of the drawer 50. The second set distance may be set to 0 to select the position of the drawer 50 fully introduced into the space under the shelf as the second set distance.

When it is determined that the drawer 50 has been withdrawn by the second set distance, the controller 100 may divide the photo into a plurality of images according to respective regions (S132).

Since the photo is acquired with the drawer 50 withdrawn, the first image and the third image may be acquired from the photo.

The controller 100 may update the first image and third image (S134).

According to the example of FIG. 50, the control operation is repeated when the door 20 is opened, and is completely terminated when the door 20 shuts the storage compartment 22. When the control operation is terminated, image updating is not performed anymore and thus a final image of the food stored in the storage compartment 22 may be acquired.

FIG. 51 is a view illustrating a process of updating images with two doors for opening and closing the storage compartment and two drawers provided. Hereinafter, a description will be given with reference to FIG. 51.

In describing this example, some of the details identical to those of the previous example will be briefly described.

When electricity is supplied to the refrigerator, the door switches 110 installed at both left and right sides of the refrigerator may individually determine whether the left door or the right door is open (S302 and S303).

When one of the door switches 110 determines the left door or the right door is opened (S303), the camera 70 begins to capture photos (S304).

The camera 70 may capture photos when one of the left door and the right door is opened or both the left door and the right are opened simultaneously or at different times. This is because light is turned on in the refrigerator when it is determined through one of the door switches that a door is opened.

When the drawer disposed on the left side is withdrawn by a distance greater than 130 mm (S310), an image related to the left drawer is captured (S312). The image related to the left drawer may represent the left drawer shown in the captured photo or may represent the whole captured photo.

At this time, the length 130 mm, which may be changed by the manufacturer of the refrigerator or the user, may represent a distance by which the drawer is withdrawn by the user such that the storage space in the drawer is accessible.

When the left drawer is withdrawn by a distance less than or equal to 130 mm (S310), the last image captured by the camera 70 is maintained (S310).

In addition, the left door sensor senses the angle of opening of the left door. At this time, in the case that the left door is opened by an angle less than 80 degrees, an image of the left multi-accommodation space provided in the space under the left drawer in the withdrawn position (S332) is provided/captured.

At this time, 80 degrees may represent an angle at which the left door and several structures installed at the left door do not interfere with the camera 70 when the camera 70 photographs the accommodation space. Depending upon the structure or size of the refrigerator, the angle may change.

When the left door is opened by an angle greater than 80 degrees, the last photo captured by the camera 70 may be maintained (S336).

In addition, the door switch 110 may sense that the left door is closed (S334).

For the left drawer and left door, the same control flow as described above with respect to the left drawer and left door may be implemented. That is, the descriptions given above is equally applicable to steps S320 to S324 and steps S340 to S346, and thus the steps will not be described in detail.

When the right or left door is closed, a captured image may be processed by the controller 100 and the processed image may be displayed on the display 14 (S350).

Herein, the display may be a constituent installed at the refrigerator.

Then, the camera may stop the photographing operation (S352).

Meanwhile, it is determined whether the refrigerator is connected with Wi-Fi for communication (S354). If communication is possible, the image may be transmitted to an external server (S356).

The server determines whether an application of the terminal used by the user is synchronized (S358). If the application is synchronized, the image may be displayed on the display 14 of the terminal.

Accordingly, the user may receive information about the times stored in the refrigerator through the user's terminal.

In the case that the refrigerator is not connected with Wi-Fi to perform external communication or that the refrigerator is not synchronized with the application of the terminal, the last image is preferably maintained on the display 14 of the user's terminal and provided for the user.

Hereinafter, a description will be given of a constituent provided to capture a photo and acquire the photo at a desired time.

When the door switch senses that the user begins to open the door, the controller drives the camera to photograph the interior of the refrigerator. The camera continuously captures a certain number of frames per second. The user's action of opening the door represents the user's intention to retrieve a desired item from the refrigerator or storing a new item in the refrigerator. Accordingly by continuously photographing the interior of the refrigerator, change of the condition of the storage space in the storage compartment of the refrigerator may be monitored.

The storage compartment is divided by shelves, drawers or baskets to form the storage space. Items are stored in the storage spaces according to the shapes of the items or the vessels or content.

The camera may monitor the storage space divided into a shelf region, drawer region and other storage regions by the shelves. Thereby, the camera allows the user to check the stored condition of the items in the respective region immediately after the user completes the storing or retrieving operation. In the case that two drawers are provided and two other storage regions are disposed in parallel, information allowing the user to check the two drawers and the two storage regions may be provided through the camera.

According to one implementation, the other storage regions are formed at the bottom of the storage compartment, and a space which is positioned in front of the storage region of the drawer and at least partially overlap the drawers when the drawers open is set as an accommodation space to be monitored.

When the door switch senses opening of the door, the controller turns on the door sensor provided to a hinge assembly of the refrigerator to sense movement according to rotation of the door. The door sensor may be kept turned on, or may be turned only when the door switches senses opening of the door.

When the door is opened by an angle greater than or equal to a certain angle, the controller determines that the door is substantially opened to allow the user to access the storage compartment to store or retrieve an item, and determines the storing condition of the shelf region as an object to be upgraded.

In addition, the drawer sensing unit senses the degree of opening of the drawer. In the case that the drawer is open, it determines the storing condition of the drawer region as an object to be upgraded. In the case that the drawer is not open, it determines the accommodation region as an object to be upgraded.

According to one implementation, the door sensor senses a certain angle that the door passes when the door is opened or closed and then sends relevant information to the controller. Herein, the door sensor may also sense the direction of rotation of the door, i.e. the closing direction or the opening direction.

According to one implementation, when an ON signal of the door switch is sensed, the controller turns on the door sensor. The door sensor in turn senses the time at which the door passes a certain angle and sends the time to the controller. Then, the controller determines that the door is open at this time.

Specifically, the door has rotated the certain angle and is in the open state.

When the user finishes retrieving or storing an item with the door open, the user closes the door. When the door passes by the door sensor, the door sensor sends a signal to the controller. Then, the controller determines, based on this signal, that the user completes the storing or retrieving operation and the door is about to be closed. Specifically, the door is open by the certain angle at this time and rotates to be closed.

Hereinafter, a process of capturing photos of the interior of the refrigerator during opening or closing of the door and updating the photos immediately after the user completes storing or retrieving of an item according to one implementation will be described in detail.

When the door switch is turned on with the door closed, the controller turns on the camera and the door sensor. This means that the camera is switched from the standby mode to the drive mode and the door sensor is switched to a mode in which the door sensor is capable of determining the angle of opening of the door.

The camera may continuously photograph the interior of the refrigerator at a predetermined number of frames per unit time. The captured photo is sent to the controller, and the controller temporarily buffers the transmitted photo as an image including the entire interior of the refrigerator.

In this specification, the term "picture (or photo)" may be distinguished from the term "image."

Specifically, the term "picture (or photo)" may represent raw data transmitted immediately after being captured, and the term "image" may represent data obtained by buffering, correcting or transmitting a picture (or photo), which is raw data, through the controller.

When the door switch is turned on the controller determines that the door is open according to a certain angle of opening of the door, the controller determines which region the whole image shows as storing items, according to opening of the drawer.

For example, in the case that the drawer is open, the controller determines that the stored whole image shows items stored in a region (shelf region) over a shelf of the refrigerator and a drawer storage region (drawer region) in the drawer. On the other hand, when it is determined that the drawer is closed, the controller determines that the stored whole image shows items stored in the shelf region of the refrigerator and an internal region of the accommodation space which is formed at the front edge of the drawer and overlaps the drawer when the drawer is opened.

In a photo of the entirety of the storage compartment captured and transmitted by the camera, the storage compartment is divided into three different storage spaces. The shelf region is always contained in the photo, while the drawer region and the accommodation region are selectively contained in the photo according to the opening/closing state of the drawer. The drawer region and the accommodation region do not coexist in the photo.

Accordingly, one whole photo transmitted from the camera contains at least two regions. One of the two regions is the shelf region and the other storage region is determined by the opening/closing state of the drawer.

The present invention is directed to providing the user with information about the latest stored condition of items by capturing two different storage spaces including at least the inner space of the drawer with a camera. Therefore, photographing only the drawer region and the shelf region and updating the corresponding photo may be one implementation, and photographing only the drawer region and the accommodation space and updating the corresponding photo may be another implementation.

Meanwhile, dividing a whole photo of the storage compartment constructing one independent insulated space in the refrigerator into the storage regions in the storage compartments may be determined the number of the doors that opens and closes the storage compartment. For example, in the case of a refrigerator having a storage compartment that is opened and closed by one door, a captured photo can be divided into two or three storage regions. In the case that the storage compartment is opened and closed by left and right doors, a captured photo may be divided into four or six storage regions.

In this case, each of the drawer region and the accommodation region may be vertically divided such each of them are shown in two divided areas in a whole photo, and the shelf region may be shown in one area. In this case, one whole photo may include five divided areas.

The storage spaces of the shelf region facing the left and right doors are connected to each other. In the shelf region, goods, food items or vegetables may be laterally arranged from the left side to the right side of the shelf region. In this case, items may be stored in or retrieved from the shelf region by access opening only one of the left and right doors. Accordingly, the whole shelf region in a whole captured image needs to be replaced with latest data when at least one of the two doors is open. In this context, the whole shelf region may be updated when at least one of the left and right doors is open.

More specifically, when it is determined that the drawer is opened with the door open, the controller separates the shelf region and the drawer region from a transmitted photo and temporarily buffers the same. In addition, when the user is about to close the drawer after completing storing or retrieving an item in or from the drawer region and/or the shelf region, that is, when the drawer which has been stopped open begins to move, a necessary part in the drawer region in a photo most recently captured among the temporarily buffered photos is captured or cut and stored in the storage unit as an image showing the latest storage condition of the drawer region. At the same time, in a photo of the interior of the refrigerator displayed on the display, the captured image of the drawer region is upgraded by replacing the image with the latest photo. In addition, the controller transmits the captured image of the drawer region to a server system connected to the refrigerator over a network.

Meanwhile, when access opening of the drawer is not sensed with the door open, and thus it is determined that the drawer is closed, the controller determines that the whole image of the transmitted photo contains the shelf region and the accommodation region. Accordingly, the shelf region and the accommodation region are separated from the whole image and temporarily buffered.

When the user closes the drawer after completing storing or retrieving an item in or from the drawer region and/or the shelf region, the door sensor senses the door when the door passes a predetermined angle and transmits a signal to the controller. The controller in turn determines, based on the signal transmitted from the door sensor, that the door is about to be closed (which means that photographing is about to be obstructed by an obstacle such as the door), and then captures a necessary part in the accommodation region in a photo most recently captured among the temporarily buffered photos and stores the same in the memory as an image showing the latest storage condition of the drawer region. At the same time, in the photo of the interior of the refrigerator displayed on the display, the captured image of the accommodation region is upgraded by replacing the image.

Herein, upgrading may mean replacing an existing image with the latest image. The controller transmits the captured image of the drawer region to the server system connected to the refrigerator over a network.

When the drawer is open or closed, the latest image of the shelf region is captured among the images buffered at the time when it is determined that the door is about to be closed, and then stored in the memory as the image showing the latest stored condition of the items in the shelf region.

Replacing the image displayed on the display of the refrigerator with the captured image (one or all of the latest image of the shelf region and the latest image of the drawer region or the accommodation region) or transmitting the captured image to the server system or a mobile device of the user connected to the refrigerator through wireless communication may be conducted at the same time the captured image is stored in the memory of the refrigerator. Such operations may be conducted all together when there is a request from the user or may be conducted for individual regions according to a request signal from the user.

One photo transmitted from the camera may be buffered as one image by the controller. When it is determined that the image has been captured with the door open, whether the image contains the drawer region or the accommodation region may be determined depending upon whether the drawer is open or closed. According to the determination, a corresponding image is extracted and buffered in a temporary buffer.

When it is determined that the one image has been captured at the time when the drawer begins to be closed, the latest image is stored in the memory among the images which are being temporarily buffered. A new storing or retrieving action is completed by the user, the existing image is replaced with the latest image. In addition, when it is determined that the door is about to be closed, the latest image is stored in the memory among the images of the accommodation region which are being temporarily buffered.

Meanwhile, a portion of the latest image showing the shelf region may be extracted from the latest image before the door is about to be closed among the images of the accommodation region which are being temporarily buffered, and then stored in the memory. A separate temporary buffer for the shelf region may be provided and only the portion showing the shelf region may be extracted and buffered in the separate buffer.

Hereinafter, descriptions will be given of transmitting an image of the interior of the refrigerator to a personal mobile terminal or a server of a server provider with the illustrated various methods to utilize the image according to various examples, with reference to FIGS. 52 to 55.

FIG. 52 is a ladder diagram illustrating a method of operating the refrigerator according to another example.

Referring to FIG. 52, when it is determined that a final photo of a specific region in the refrigerator has been acquired through the steps as described with reference to FIG. 34 (S1101), the controller 100 transmits a final image obtained through correction to the terminal 2 as an event (51103). The terminal 2 may include a smartphone, a person digital assistant (PDA), and a tablet PC. However, examples are not limited thereto. The controller 100 may transmit not only the final image of the interior of the refrigerator but also various kinds of information related to the final image to the terminal 2.

At this time, the controller 100 transmit the final image to the terminal 2 upon acquiring the final image through the final photo, or may store the acquired final image in the storage unit 18 and then transmit a stored image to the terminal 2 on a predetermined cycle as an event. However, implementations of the present invention are not limited thereto.

Subsequently, the terminal 2 displays the final image received according to the user's selection (S1105). For example, the terminal 2 execute an application capable of receiving and displaying the image of the interior of the refrigerator according to the user's selection. Otherwise, the terminal 2 may perform a multimedia service to display the received image of the interior of the refrigerator.

According to this example, the user can check the image of the interior of the refrigerator using a mobile terminal without looking into the refrigerator. Therefore, the user may remotely understand the current condition of the interior of the refrigerator.

FIG. 53 is a ladder diagram illustrating a method of operating the refrigerator according to another example.

Referring to FIG. 53, when it is determined that a final photo of a specific region in the refrigerator has been acquired as described above (S1101), the controller 100 produces images by dividing the final photo according to the respective regions, and then controls the storage unit 18 to store an acquired final image (51303).

Subsequently, when the terminal 2 receives a user input for displaying the final image of the specific region of the refrigerator (S1305), the terminal 2 transmits a request for the final image to the refrigerator (S1307).

In response to the request for the final image, the controller 100 controls communication unit 270 to transmit an image of the interior of the refrigerator most recently captured and stored among the images stored in the storage unit 18 to the terminal 2 (S1309).

According to this example, communication between the mobile terminal and the refrigerator is conducted only when the user desires. Thereby, the communication may become more efficient and economical. Hereinafter, a description will be only given of a case of transmitting an image in response to the request. Transmitting of an image includes transmitting an image as an event as described above with reference to FIG. 35. However, implementations are not limited thereto.

FIG. 54 is a ladder diagram illustrating a method of operating the refrigerator according to another example.

Referring to FIG. 54, when it is determined that a final photo of a specific region in the refrigerator has been acquired as described above (S1501), the controller 100 controls the storage unit 18 such that a final image acquired from the final photo is stored in the storage unit 18 (S1503).

Subsequently, when a server of a server provider such as a market server 3 receives a user input for displaying a current image of the interior of the refrigerator (S1505), the market server 3 transmits a request for the final image to the refrigerator (S1507). At this time, the market server 3 may transmit a request for the final image on a predetermined cycle without the user input.

Then, the controller 100 performs a control operation in response to the image request such that the final image of the interior of the refrigerator most recently captured and stored among the images stored in the storage unit 18 is transmitted to the market server 3 (S1509).

Upon receiving the final image of the interior of the refrigerator, the market server 3 analyzes the final image (S1511). By analyzing the final image, the market server 3 may identify items currently stored in the refrigerator and items currently not present in the refrigerator and analyze the items previously stored but currently not present in the refrigerator to extract information necessary for provision of a service.

The market server 3 transmits a list of inadequate items extracted by analyzing the final image to the refrigerator (S1513).

FIG. 55 is a ladder diagram illustrating a method of operating the refrigerator according to another example.

Referring to FIG. 55, when it is determined that a final photo of a specific region in the refrigerator has been acquired as described above (S1701), the controller 100 controls the storage unit 18 such that a final image acquired by correcting the final photo is stored in the storage unit 18 (S1703).

Subsequently, when a server of a server provider such as a broadcasting station server 4 receives a user input for displaying the final image of the interior of the refrigerator (S1705), the broadcasting station server 4 transmits a request for the final image to the refrigerator (S1707). At this time, the broadcasting station server 4 may transmit a request for the final image on a predetermined cycle without the user input.

Then, the controller 100 performs a control operation in response to the request for the final image such that the final image of the interior of the refrigerator most recently captured and stored among the images stored in the storage unit 18 is transmitted to the broadcasting station server 4 (S1709).

Upon receiving the final image of the interior of the refrigerator, the broadcasting station server 4 analyzes the final image (S1711). By analyzing the final image, the broadcasting station server 4 may identify items currently stored in the refrigerator and to extract information necessary for provision of a service, for example, by analyzing dishes which may be prepared using the currently stored items.

Through the analysis of the final image, the broadcasting station server 4 transmits, to the refrigerator, information about a recipe of a dish which may be prepared using the currently stored items (S1713).

The controller 100 displays the information about the recipe of a dish received to from the broadcasting station server 4 on the display 14 installed at the refrigerator.

According to this example, an involved provided may accurately identify the condition of the interior of the refrigerator positioned at home or a business and provide a refrigerator-related proper service for the home or business.

FIGS. 56A and 56B are views illustrating operation of a heater of the camera, and FIGS. 57A and 57B are views illustrating a result of an experiment on dew condensation occurring on a transparent window of the camera according to temperatures. Hereinafter, a description will be given with reference to FIGS. 56A and 56B. FIGS. 56A and 56B depicts the result based on the heater of the type described with reference to FIGS. 14 to 17.

FIG. 56A is a graph depicting discontinuously driving the heater 84 with power discontinuously supplied thereto, and FIG. 56B is a graph depicting continuously driving the heater 84 with power supplied continuously thereto.

In FIG. 56A, the temperature of the transparent window 80 is not controlled in normal times, but remains balanced with the temperature of the storage compartment 22. At the time when photographing the refrigerator with a camera is needed, high power is instantaneously applied. Particularly, the heater 84 may be driven to remove dew from the transparent window 80 immediately before photographing is performed.

When the door 20 is opened, the transparent window 80 may contact moisture contained in external warm air introduced through the door 20. At this time, the transparent window 80 is at a low temperature relative to the external air, and accordingly moisture contained in the external air may be condensed on the transparent window 80, thereby causing dew condensation.

In the case that the heater 84 is instantaneously driven to remove dew formed by being condensed, time may be taken until the dew on the transparent window 80 is to eliminated. Accordingly, in the case that the time to capture a photo is earlier than the time at which the dew is removed, dew may be present on the transparent window 80 at the time when photographing is performed.

On the other hand, in FIG. 56B, the heater 84 is continuously driven to supply heat to the transparent window 80. Since the transparent window 80 is constantly maintained at a temperature greater than the temperature at which dew condensation occurs, dew condensation does not occur on the transparent window 80. Accordingly, even if the door 20 is opened and thus the transparent window 80 contacts the external air, the moisture contained in the external air is not condensed on the transparent window 80. Therefore, dew is prevented from being present on the transparent window 80 at the time when the camera 70 instantaneously captures a photo.

In driving the heater 84, the dew condensation should be prevented from affecting the photo quality. Also, rapid increase of power consumed by the heater 84 should be prevented. In addition, heat supplied from the heater 84 should be preferably prevented from affecting the internal temperature of the refrigerator.

It has been found that the amount of time for which the heat is turned off needs to be increased to minimize the power consumption of the heater and prevent the heat from affecting the interior of the refrigerator. However, considering that increasing the time for which the heater is turned off may result in dew condensation, experiments have been conducted by setting a target temperature of the transparent window of the camera under the condition that the temperature of the air outside the refrigerator is 32° C., and relative humidity is 85% (i.e., under that condition that the temperature of the dew point is between about 29° C. and about 30° C.) (see FIGS. 57A and 57B). In FIG. 57A, the y-axis represents the amount of condensed dew. In FIG. 57B, the y-axis represents the amount of dew actually condensed at the corresponding temperature, which is expressed in percentage relative to the current amount of vapor.

The On/Off cycle of the heater derived from repeated experiments may deteriorate the quality of photos captured by the camera, under a special temperature condition.

Even if a proper cycle to turn on/off the heater is found, the pattern of use of the refrigerator by the user may unexpectedly vary for the time for which the heater is turned off.

For example, in the case that the user leaves the door open for a long time, a large amount dew may be formed on the surface of a cover glass (the transparent window or other types of windows placed at the front edge of the camera lens) of the camera. In this case, a lot of time is taken to cause evaporation even if the cover glass is heated by driving the heater. Accordingly, the quality of a photo captured at this time may be low. In addition, evaporation the dew formed on the cover glass takes a lot of power as well as a large amount of time.

Moreover, in the case that the storage compartment is the fresh food storage compartment, the temperature of the interior of the storage compartment is usually maintained between 0° C. and 7° C., and the internal volume of the storage compartment is greater than the surface area of the cover glass. A large portion of the heat supplied from the heater may be exposed to the cooled air in the storage compartment. Accordingly, a large amount of heat needs to be applied in a short time to evaporate the dew formed on the cover glass. To intensively supply heat in a short time, a heat having a large capacity may need to be used. However, in this case, the power that is instantaneously used may be greatly increased, and thus various problems may be caused when supply of power is not smooth.

Accordingly, the amount of dew condensed on the cover glass is preferably controlled consistently not to become greater than or equal to a certain amount from the earliest stage. In some implementations, power is applied to the heater such that the heater is constantly driven without an On/Off cycle.

In applying a constant power to the heater, the heater of the camera may be configured to receive power upon application of the power. Alternatively, power may be controlled through the controller of the refrigerator such that constant power is applied to the heater while the storage compartment is normally operated.

Next, the temperature of the heated cover glass will be described. When the qualities of sample photos obtained at different temperature ranges were evaluated, it was found that any significant problem with the quality of the sample photos does not occur until the temperature of the central portion of the cover glass reaches half the dew point. Having no problem with the photo quality may mean that the kinds and quantities of the items stored in the storage compartment can be identified.

Particularly, in FIG. 57B, a photo sample obtained at a third point, which indicates 13.5° C. has an allowable quality. Power may be supplied to the heater such that the temperature of the heated cover glass, which may be maintained to be greater than or equal to the dew point, is maintained between about 13° C. and about 30° C.

In the result of the experimentation, it has been found that the heating temperature of the cover glass varies with the outer size of the cover glass, but the thickness of the cover glass little varies, under the condition that the same power is supplied. Since the photo quality was satisfactory at a temperature which is half the dew point when the size of the cover glass is constant, this temperature may be set to be the lower limit, and the upper limit may be preferably set in the aspect of consumed power (or applied power) of the heater.

In heating the cover glass, the power applied at a temperature close to the dew point (29.2° C.) was 0.45 W, and the power applied at a temperature (17.7° C.) about 0.58 times the dew point was 0.27 W. When the heating temperature is about 0.5 to 0.7 times the dew point, the consumed power is also about 0.5 times the power consumed at the dew point. Therefore, power consumption has been effectively reduced in this range of temperature.

Under a condition of external air, which is usually changeable, the range of temperature that is about half the dew point may be determined to be between about 12° C. and about 17° C. Accordingly, electrical current allowing the central portion of the transparent window to be maintained at a temperature between about 12° C. and about 17° C. is preferably applied to the heater.

That is, in this example, power consumed by the heater may be reduced by maintaining the cover glass not at the dew point but at a temperature lower than the dew point FIG. 58 is a cross-sectional view illustrating a transparent window. Hereinafter, a description will be given with reference to FIG. 58.

Hydrophilic coating may be applied to the transparent window 80. The transparent window 80 may be the cover 90 as described above.

Even if dew is instantaneously formed on the transparent window 80, the contact angle of water may be formed to be within 15 degrees by the hydrophilic coating, as shown in FIG. 58. When the hydrophilic coating is applied to a surface, the surface tension of water on the surface is weakened. Accordingly, water may be spread wide on the surface of the transparent window 80. Thereby, the camera may be fixed to the surface of the ceiling of the storage compartment such that the angle between the transparent window and the surface of the ceiling of the storage compartment is between about 10 degrees and about 20 degrees.

Therefore, it may be possible to minimize distortion of a captured photo resulting from water formed on the transparent window 80. In addition, once the hydrophilic coating is applied, additional control such as supplying electricity is not needed thereafter. Accordingly, it may have an advantage in the aspect of energy efficiency.

FIGS. 59A to 60B are views schematically illustrating installation of the camera at the inner case. FIGS. 59A and 60A show views of the storage compartment seen from one lateral side, and FIGS. 59B and 60B show views of the inner case seen from a position below the inner case. Hereinafter, a description will be given with reference to FIGS. 59A to 60B. In the examples of FIGS. 59A to 60B, a path along which the external air reaches the cover 90 may be arranged in a detouring manner to minimize condensation occurring on the cover 90.

The camera 70 may be installed at a protrusion protruding downward from the ceiling of the inner case 12. Herein, the protrusion 500 may be a portion of the inner case 12 protruding downward relative to the other portion of the inner case 12. Such protrusion 500 may be formed by the camera housing as described above.

As shown in FIGS. 59A and 59B, the camera 70 is installed inside the protrusion 500 such that it faces an inner sidewall of the storage compartment 22. The camera 70 may capture a photo of the interior of the storage compartment 22 through the cover 90. Accordingly, the cover 90 is disposed at a position on the protrusion 500 facing the rear wall of the storage compartment 22.

When the cover 90 contacts moisture contained in the external air, the moisture is cooled and thus dew is formed on the cover 90.

However, the cover 90 is disposed facing the rear wall of the storage compartment 22, and thus the external may take a long path to reach the cover 90.

That is, for the external air passing by the door 20 to pass through the storage compartment 22 and contact the cover 90, the external air needs to takes the path as shown in FIGS. 59B and 60B. At this time, some of the moisture contained the external air may be condensed on a portion of the storage compartment 22 as the external air contacts the cooled air in the storage compartment 22. Accordingly, the external air may reach the cover 90 while the amount of the moisture therein is gradually reduced.

That is, when the door 20 is opened, the interior of the storage compartment 22 may be maintained at a lower temperature than the exterior of the storage compartment 22, and the temperature thereof may not be immediately changed to the temperature of the external air. Accordingly, heat exchange with the external air occurs as the external air enters the storage compartment 22.

In other words, in the case that the cover 90 is disposed at a portion where it is relatively difficult for the cover 90 to contact the external air, the amount of dew formed on the cover 90 may be reduced, and dew may be formed later.

First, as the external air enters the refrigerator, it contacts the front surface 501 of the protrusion 500. At this time, the external air contacting the front surface 501 is introduced further into the refrigerator along the path curve to the left and right sides of the protrusion 500. Such external air may reach the cover 90 while contacting the side surface of the protrusion 500. Accordingly, a large amount of moisture may be condensed before the external air reaches the cover 90.

In addition, the cover 90 is mounted at a place surrounded by the front surface 501, side surfaces 502 and the lower surface 503 such that the cover 90 is inclined. Thereby, the cover 90 is not arranged perpendicular to the path of the external air. Accordingly, the external air may be prevented from being rapidly condensed when it reaches the cover 90.

Particularly, the width of the protrusion 500, specifically, the lateral width of the front surface 501 may be greater than the width of the camera 70.

The example illustrated in FIGS. 60A and 60B, in which the camera is mounted facing vertically downward, is very similar to the example of FIGS. 59A and 59B. Accordingly, the example of FIGS. 60A and 60B may have the same effect as that of the example of FIGS. 59A and 59B.

In addition, the protrusion 500 may include a rear surface 504. Preferably, the vertical length of the front surface 501 is greater than the vertical length of the rear surface 504. That is, the front surface 501 may protrude farther downward of the inner case 12 than the rear surface 504.

Accordingly, the path along which the external air reaches the cover 90 is elongated in the horizontal direction by the width of the protrusion 500 and elongated in the vertical direction by the protruding height of the protrusion 500.

Prevention of dew condensation on the cover 90 through such structure of the protrusion 500 or the mounting structure of the camera is closely related the position at which the camera is installed. That is, the camera may be installed to be inclined rearward at a predetermined angle within a certain range with respect to a vertical line extending vertically downward from the ceiling of the storage compartment. Accordingly, the introduction path of the external air may be effectively detoured while the entire regions in the storage compartment are effectively photographed.

In conventional art, the camera is mounted to a sidewall of the storage compartment of the cabinet, an outer upper end of the cabinet, the door or the upper portion of the door.

According to the conventional art, in the case that the camera is mounted to a sidewall of the storage compartment, a recessed portion capable of accommodating the camera is provided to the sidewall, and the camera is mounted to the recessed portion. That is, the camera does not protrude into the storage compartment. This structure may not cause user inconvenience when a shelf of the storage compartment or an item is retrieved from the storage compartment.

In contrast, in some implementations, the camera is installed at the ceiling of the inner case 12. Thereby, the user is not obstructed by the camera when the user uses the storage compartment 22. This is because the camera is not positioned in the path of movement of the shelves and thus collision with the camera is prevented when the user desires to retrieve an item from the storage compartment.

Further, in some implementations, the cover 90 of the camera 70 is disposed to face in the rearward direction. Thereby, the path along which the external air reaches the cover 90 may be elongated.

In FIG. 59A, the cover 90 is disposed to face in the rearward direction, and the protrusion 500 protrudes downward. Accordingly, for the external air to reach the cover 90, the external air needs to follow a three-dimensional path of movement and thus the path of movement of the external air is elongated.

In FIG. 60A, the cover 90 is disposed to face downward, and the protrusion 500 is provided with a front surface 504 disposed in parallel with the access opening and side surfaces 508 disposed perpendicular to the front surface 504. Herein, the front surface 504 and the side surfaces 508 are installed to protrude further downward such that the path along which the external air reaches the transparent window 80 may be elongated.

That is, the high-temperature air introduced from the outside of the access opening of the storage compartment does not straightly reach and contact the cover 90, but reaches the protrusion 500 by detouring leftward, rightward and downward along the protrusion 500. Accordingly, as the external air exchanges heat with the cooled air in the refrigerator, it is cooled and thus has a reduced amount of saturated water vapor. Thereby, the water vapor contained in the external air is condensed and thus mixed with the cooled air in the refrigerator. When the external air finally reaches the cover 90, it may be sufficiently evaporated by the heater which heats the cover 90 since the external air contains a reduced amount of water vapor.

Accordingly, the power to be provided to the heater 84 may decrease, and thus the overall power consumption of the refrigerator may be improved.

In the examples illustrated in FIGS. 59A to 60B, the refrigerator may include a cabinet provided therein with a storage compartment configured with an access opening formed in the front surface of the storage compartment and formed by an upper wall, a lower wall, both sidewalls and a rear wall which are formed of an insulating material, the storage compartment including a shelf region divided by a plurality of shelves and a drawer region having at least one drawer, at least one door closely contacting the front surface of the storage compartment to open and close the storage compartment, and a camera device installed at the upper wall of the storage compartment between the access opening of the storage compartment and a front edge of the shelves installed in the refrigerator.

The camera device may include a camera module part configured to receive a camera lens and electrical components needed to drive a camera and provided with a transparent window spaced a certain distance from the camera lens, and a camera housing part configured to seat and fix the camera module part at a determined position in the camera housing part.

The camera housing part may include a fixing surface adjoining the upper wall of the storage compartment, a front surface formed to face the access opening of the storage compartment, both side surfaces connecting the front surface to the rear surface, and a top surface provided with an opening allowing a camera window of the camera module to be exposed therethrough. The front surface of the camera housing part is formed at a higher position than the opening formed in the top surface of the camera housing part.

The top surface of the camera housing may be inclined at a certain angle with respect to the surface of the upper wall of the storage compartment to face away from the opening of the storage compartment.

The camera housing part may further include a rear surface at a position opposing the front surface and facing the rear wall of the storage compartment. The height of the front surface may be greater than the height of the rear surface.

The opening in the top surface of the camera housing part may be formed at a lower position than the side surface of the camera hosing part.

The refrigerator may further includes a housing installation part having a recessed portion corresponding to a recessed space recessed inward of the upper wall of the storage compartment.

The housing installation part is installed at the upper wall of the storage compartment when the refrigerator is filled with an insulating material, and the camera housing part may be fixed to the housing installation part.

The camera module part fixed to the camera housing part may be accommodated in the recessed portion formed at the housing installation part.

The camera module part accommodated in the recessed portion of the housing installation part may be fixed to the camera housing part such that a gap is formed between the camera module part and the inner surface of the housing installation part.

The front surface and side surfaces of the camera housing part may be formed at a higher position than the opening in the top surface of the camera housing part.

A portion of the top surface of the camera housing part close to the opening of the storage compartment may be farther apart from the surface of the upper wall of the storage compartment than the other portion of the top surface close to the rear wall of the storage compartment.

The camera module may include a front portion provided with the camera window and a rear portion opposing the front portion. At least one of the front portion and the rear portion may be provided with at least one flat surface.

A receiving portion to receive the camera module part may be formed at an inner side of the camera housing part. The receiving portion may include a seating part inclined at a certain angle with respect to the surface of the upper wall of the storage compartment to allow the flat surface formed at the camera module part to be placed thereon.

The recessed portion of the housing installation part may include a seating part inclined at a certain angle with respect to the surface of the upper wall of the storage compartment to allow the flat surface formed at the camera module part to be placed thereon.

A flat surface may be formed around the camera window of the front portion of the camera module part. The flat surface may be formed approximately at the same level as the central portion of the camera lens.

FIG. 61 is a view illustrating a refrigerator according to another implementation. Hereinafter, a description will be given with reference to FIG. 61.

The refrigerator shown in FIG. 61 is a side-by-side refrigerator having different storage compartments laterally disposed. That is, the left storage compartment may be a freezer compartment, and the right storage compartment may be a fresh food storage compartment.

The camera 70 may be installed at the ceiling of the storage compartment 22 such that the camera 70 faces the lower portion of the storage compartment 22.

In addition, a drawer 50 configured to store food and adapted be withdrawn and introduced may be installed in the storage compartment 22.

Other details are the same as those described in the previous examples, and thus they will be described.

FIG. 62 is a view illustrating a screen provided for the user from the refrigerator of FIG. 61. Hereinafter, a description will be given with reference to FIG. 62.

An image of the items stored in the drawer 50 and 51 and an image of the items stored at the upper side of the shelf 40 may be provided for the user. The refrigerator may be provided with one drawer 50. Accordingly, an image of one drawer may be provided in the example of FIG. 62. Otherwise, two drawers 50 and 51 arranged in a vertical direction may be provided as shown in FIG. 61. In this case, images of the interior of the respective drawers may be provided.

In the example illustrated in FIG. 2, the drawers are laterally arranged. In contrast, in FIG. 62, the drawers may be vertically arranged. Accordingly, two drawer regions may be provided, and the lower drawer 50 may protrude farther forward than the upper drawer 51. In this case, each of the drawers 50 and 51 may be provided with a marker.

Thereby, information about food items stored in a plurality of shelf regions, a plurality of drawer regions may be easily understood through one camera.

The method of upgrading an image provided on the user screen is identical to that for the refrigerator as previously described, and thus a description thereof will not be given.

FIG. 63 is a view illustrating a method of adjusting a picture captured with a camera of the refrigerator of FIG. 61. Hereinafter, a description will be given with reference to FIG. 63.

Generally, only one drawer is provided or two drawers are vertically disposed. Accordingly, in the refrigerator of a type shown in FIG. 61, one adjustment line 15 may be provided. Two horizontal adjustment lines may be provided to divide two drawers.

Additionally, two vertical adjustment lines may be disposed in parallel and the positions thereof may be adjusted. The horizontal adjustment line may only be used to select a desired image without using the vertical adjustment line, unlike the example of FIG. 63.

Limit lines 16 indicating the limit range of movement of the adjustment line 15 may be provided for the user. In this case, the limit lines 16 may be disposed in parallel and space a predetermined distance from each other.

Correction of an error through the adjustment line 15 may be identical or similar to the correction in a previous example.

Various examples have been described in the best mode for carrying out the invention.

INDUSTRIAL APPLICABILITY

The present invention provides a refrigerator allowing the user obtain information about food stored in the refrigerator without opening the door of the refrigerator. Thereby, leakage of cooled air from the storage compartment may be prevented. Accordingly, unnecessary loss of cooled air may be prevented and the energy efficiency of the refrigerator may be improved.

In addition, the latest information about the food stored in the refrigerator may be provided for the user. Therefore, reliability of the information about the stored food provided for the user may be enhanced.

Further, information about food items stored in various positions may be provided by a single camera. Accordingly, a structure allowing installation of only one camera is added, and thus designing of the refrigerator may be facilitated. Particularly, costs incurred by use of a camera may be reduced.

Dew condensation on a camera installed in the refrigerator may be prevented. Accordingly, an image captured by the camera may be stably provided for the user.

The user may remotely figure out the current internal situation of the refrigerator and receive necessary information about food from an outside provider.

The refrigerator may provide a screen of a photo of the interior of a drawer captured by a camera which is similar to what the user actually sees when the user uses the refrigerator.

The refrigerator may provide the user with planar images of spatially overlapping and invisible locations on one screen.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

A number of methods, techniques, systems, and apparatuses have been described. Nevertheless, various modifications may be made without departing from the scope of this disclosure.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

The foregoing implementations and advantages are merely examples and are not to be considered as limiting the present disclosure. The present teachings can be readily applied to other types of apparatuses. This description is intended to be illustrative, and not to limit the scope of the claims. Many alternatives, modifications, and variations will be apparent. The features, structures, methods, and other characteristics of the implementations described herein may be combined in various ways to obtain additional and/or alternative implementations.

What is claimed is:

1. A refrigerator comprising:
   a cabinet in which a storage compartment is defined by a fixed insulation wall, the storage compartment configured to store food and having an access opening;
   a door rotatably provided at the cabinet and configured to open and close the access opening of the storage compartment;
   a drawer provided in the storage compartment;
   a shelf provided in the storage compartment and arranged above the drawer;
   a camera disposed in the storage compartment and configured to take a photo of an interior of the storage compartment; and
   at least one processor configured to divide the photo taken by the camera into a plurality of images corresponding to a plurality of regions inside the refrigerator,
   wherein the plurality of regions is defined by at least one of the shelf or the drawer in the storage compartment.

2. The refrigerator according to claim 1, wherein the plurality of regions comprises an internal space of the drawer and an external space of the drawer, and
   wherein the external space of the drawer is inside of the cabinet and outside of the drawer.

3. The refrigerator according to claim 1, wherein the plurality of regions comprises a first region for storing food defined in an external space of the drawer in the storage compartment, and a second region for storing food defined in an internal space of the drawer, and
   wherein the external space is inside of the cabinet and outside of the drawer.

4. The refrigerator according to claim 3, wherein the plurality of regions further comprises a third region defined under the drawer, the third region vertically overlapping with the drawer in a state in which the drawer is withdrawn.

5. The refrigerator according to claim 4, wherein at least two regions among the plurality of regions are arranged at different heights from each other in the storage compartment.

6. The refrigerator according to claim 4, wherein the first region, the second region, and the third region are arranged sequentially along a vertical direction.

7. The refrigerator according to claim 4, wherein the camera is configured to take the photo of the interior of the storage compartment by taking a photo that captures the plurality of regions inside the refrigerator.

8. The refrigerator according to claim 7, wherein the camera is configured to take the photo that captures the plurality of regions inside the refrigerator by taking a photo that captures the first region and the second region.

9. The refrigerator according to claim 8, wherein the at least one processor is configured to divide the photo taken by the camera into the plurality of images corresponding to the plurality of regions inside the refrigerator by:
   dividing the photo taken by the camera into a first image and a second image corresponding to the first region and the second region, respectively.

10. The refrigerator according to claim 7, wherein the camera is configured to take the photo that captures the plurality of regions inside the refrigerator by taking a photo that captures the first region and the third region.

11. The refrigerator according to claim 10, wherein the at least one processor is configured to divide the photo taken by the camera into the plurality of images corresponding to the plurality of regions inside the refrigerator by:

dividing the photo taken by the camera into a first image and a third image corresponding to the first region and the third region, respectively.

12. The refrigerator according to claim 7, further comprising a display, wherein the at least one processor is further configured to control the display to display at least one of the first region, the second region, or the third region.

13. The refrigerator according to claim 12, wherein the at least one processor is further configured to control the display to simultaneously display the first region, the second region, and the third region.

14. The refrigerator according to claim 12, wherein the at least one processor is further configured to control the display to display one among the first region, the second region, or the third region.

15. The refrigerator according to claim 4, wherein the third region is located at a bottom of the storage compartment and is exposed to the external space of the drawer in a state in which the drawer is inserted.

16. The refrigerator according to claim 4, wherein the third region is configured to store food.

17. The refrigerator according to claim 4, further comprising a barrier arranged below the drawer and extending horizontally in the storage compartment to partition the storage compartment, the barrier defining a recessed portion configured to store food, wherein the third region includes the recessed portion.

18. The refrigerator according to claim 17, wherein the barrier is arranged to partition the storage compartment into a freezer compartment and a fresh food compartment.

19. The refrigerator according to claim 12, wherein the at least one processor is further configured to control the display to display the third region together with the second region regardless of the drawer being in the withdrawn state.

20. The refrigerator according to claim 1, wherein the at least one processor is configured to replace the plurality of images with updated images individually.

* * * * *